US008773584B2

(12) United States Patent
Sasaki et al.

(10) Patent No.: US 8,773,584 B2
(45) Date of Patent: Jul. 8, 2014

(54) PLAYBACK APPARATUS, PLAYBACK METHOD, INTEGRATED CIRCUIT, BROADCAST SYSTEM, AND BROADCAST METHOD USING A BROADCAST VIDEO AND ADDITIONAL VIDEO

(75) Inventors: Taiji Sasaki, Osaka (JP); Hiroshi Yahata, Osaka (JP); Tomoki Ogawa, Osaka (JP); Yasushi Uesaka, Hyogo (JP); Kazuhiro Mochinaga, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/824,581

(22) PCT Filed: Aug. 9, 2012

(86) PCT No.: PCT/JP2012/005088
§ 371 (c)(1),
(2), (4) Date: Mar. 18, 2013

(87) PCT Pub. No.: WO2013/021656
PCT Pub. Date: Feb. 14, 2013

(65) Prior Publication Data
US 2013/0235270 A1 Sep. 12, 2013

Related U.S. Application Data

(60) Provisional application No. 61/522,393, filed on Aug. 11, 2011.

(51) Int. Cl.
*H04N 7/12* (2006.01)
*H04N 7/00* (2011.01)
*H04N 7/16* (2011.01)

(52) U.S. Cl.
USPC ... 348/426.1; 348/36; 348/432.1; 375/240.26

(58) Field of Classification Search
USPC ............... 348/588, 564, 565, 43, 51, 36, 584,
348/589, 600, 385.1, 426.1, 429.1, 432.1,
348/434.1, 435.1, 473–479, 218.1, 383,
348/904; 375/240.26; 463/40, 42; 725/59,
725/141, 133, 153; 345/629, 634, 635
See application file for complete search history.

(56) References Cited

U.S. PATENT DOCUMENTS 5,025,309 A * 6/1991 Isnardi .................... 375/240.25
(Continued)

FOREIGN PATENT DOCUMENTS

| JP | 2007-104540 | 4/2007 |
| JP | 2010-258707 | 11/2010 |
| JP | 2011-91578 | 5/2011 |

OTHER PUBLICATIONS

International Search Report issued Oct. 16, 2012 in corresponding International Application No. PCT/JP2012/005088.

(Continued)

*Primary Examiner* — Victor Kostak
(74) *Attorney, Agent, or Firm* — Wenderoth, Lind & Ponack, L.L.P.

(57) ABSTRACT

The present invention provides a playback apparatus for playing back one combination video by combining a broadcast video with any additional video not determined by a fixed position relative to the broadcast video. The playback apparatus comprises: a first receiving unit that receives, via a broadcast wave, a broadcast video composed of broadcast images, each broadcast image being a portion of a frame image among a plurality of frame images constituting the original video; a second receiving unit that receives an additional video composed of remaining images, each remaining image being the remaining portion of the frame image; an arrangement information acquiring unit that acquires arrangement information indicating an arrangement of the broadcast image and the remaining image in the frame image; and a playback unit that reproduces and plays back the frame images by arranging the broadcast images and the remaining images based on the arrangement information.

13 Claims, 40 Drawing Sheets

(56) References Cited

U.S. PATENT DOCUMENTS

| | | | |
|---|---|---|---|
| 5,430,486 A * | 7/1995 | Fraser et al. | 348/426.1 |
| 5,633,683 A * | 5/1997 | Rosengren et al. | 375/240.01 |
| 5,768,539 A * | 6/1998 | Metz et al. | 709/249 |
| 6,020,931 A * | 2/2000 | Bilbrey et al. | 348/584 |
| 6,025,882 A * | 2/2000 | Geshwind | 375/240.26 |
| 7,023,495 B2 * | 4/2006 | Miki et al. | 348/584 |
| 7,164,714 B2 * | 1/2007 | Martin | 375/240.01 |
| 7,206,352 B2 * | 4/2007 | Birru et al. | 375/265 |
| 7,911,536 B2 * | 3/2011 | Dunton | 348/556 |
| 7,965,311 B2 * | 6/2011 | Oura | 348/38 |
| 2003/0163832 A1 * | 8/2003 | Tsuria et al. | 725/135 |
| 2003/0184675 A1 * | 10/2003 | Campisano et al. | 348/445 |
| 2006/0083301 A1 * | 4/2006 | Nishio | 375/240.08 |
| 2006/0195868 A1 * | 8/2006 | Townsend et al. | 725/59 |
| 2010/0149412 A1 * | 6/2010 | Yamashita | 348/443 |
| 2010/0325667 A1 * | 12/2010 | Lee et al. | 725/51 |
| 2011/0228057 A1 * | 9/2011 | Kobayashi | 348/51 |
| 2013/0089166 A1 * | 4/2013 | Nakajima | 375/316 |

OTHER PUBLICATIONS

Kinji Matsumura et al., "Hybridcast™ No Gaiyou To Gijutsu", NHK STRL R&D, No. 124, pp. 10-17, Nov. 2010.

* cited by examiner

| Rectangle ID | Stream region information | | | | | Synthesis position information | |
|---|---|---|---|---|---|---|---|
| | Stream identification information | x position | y position | Width | Height | X position | Y position |
| 0 | 0 (= Broadcasting) | 0 | 0 | b - a | d | a | 0 |
| 1 | 1 (= Communications) | 0 | 0 | a | d | 0 | 0 |
| 2 | 1 (= Communications) | a | 0 | c - b | d | b | 0 |

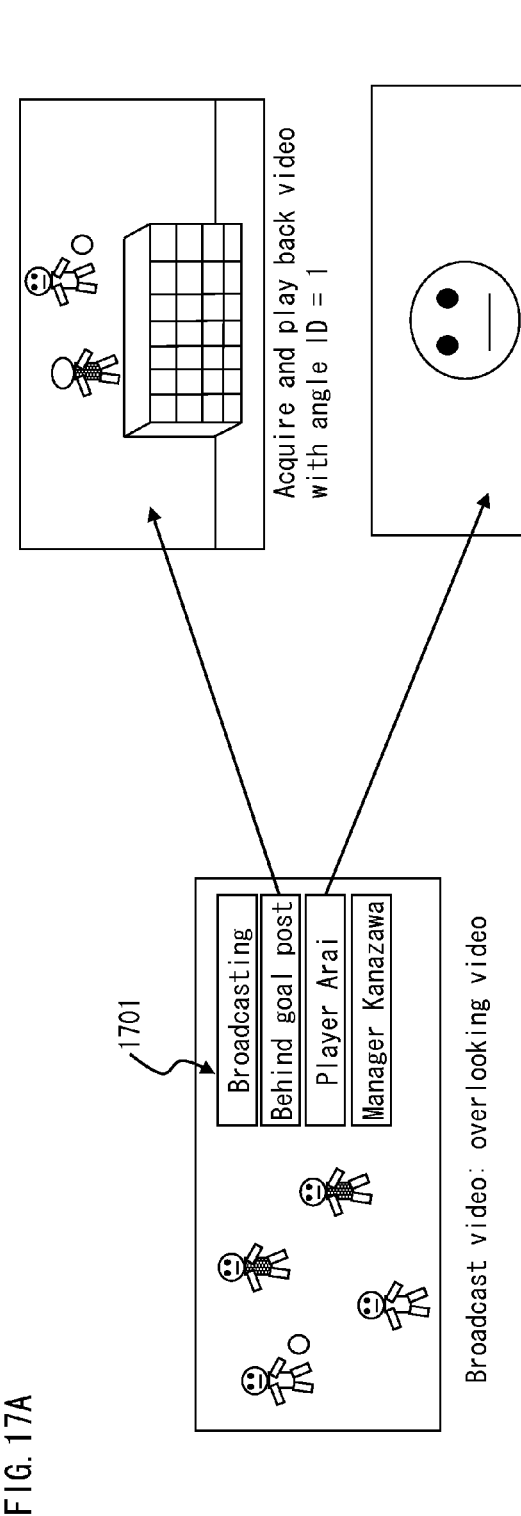

FIG. 18

| Angle ID | Stream type | Content |
|---|---|---|
| 0 | Video: Broadcast PID = X<br>Audio: Broadcast PID = Z | Broadcast video |
| 1 | Video: http://fcvento. ··· /angle1.ts PID=A<br>Audio: Broadcast PID = Z | FC. Vento video from behind goal post |
| 2 | Video: http://fcvento. ··· /angle2.ts PID=B<br>Audio: http://fcvento. ··· /angle2.ts PID=Y | FC. Vento video following player Arai |
| 3 | Video: http://fcvento. ··· /angle1.ts PID=C<br>Audio: Broadcast PID = Z | FC. Vento video from viewpoint of manager Kanazawa |

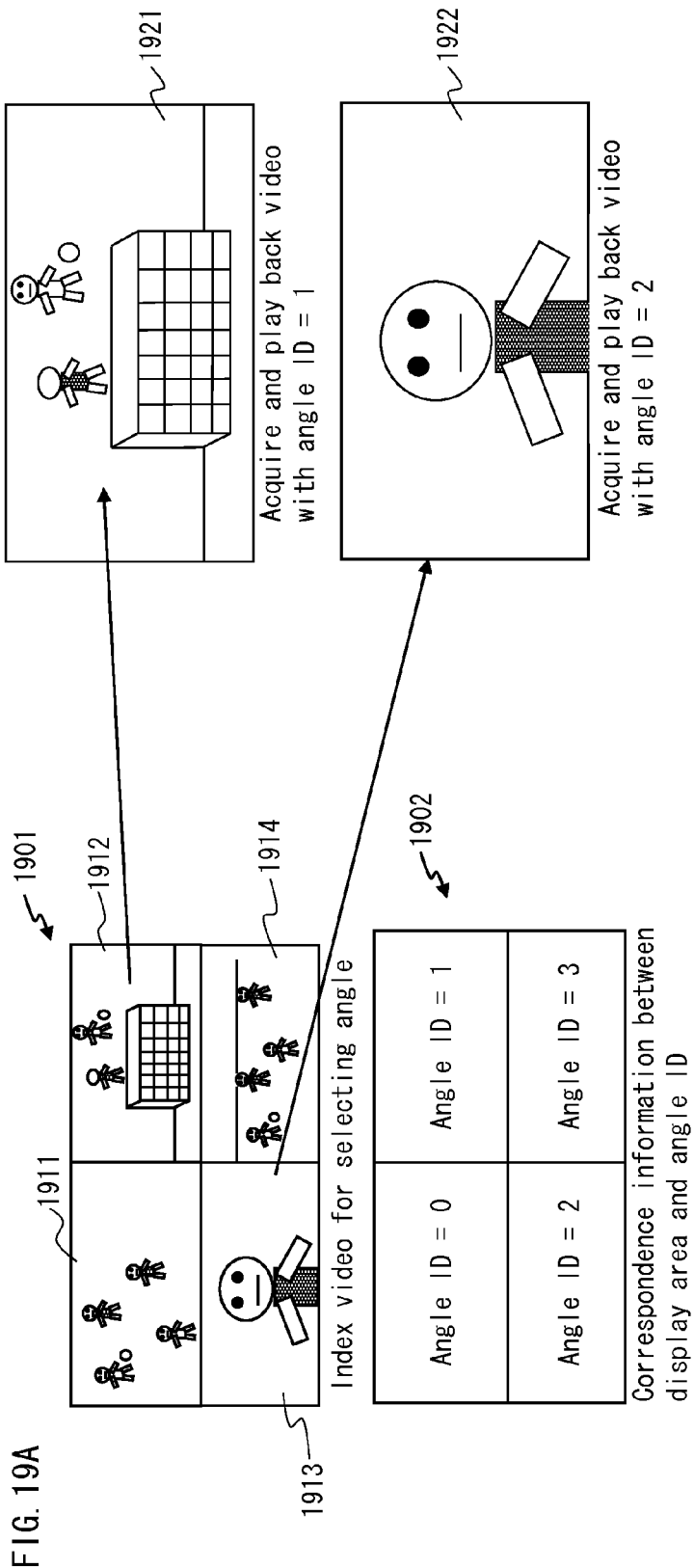

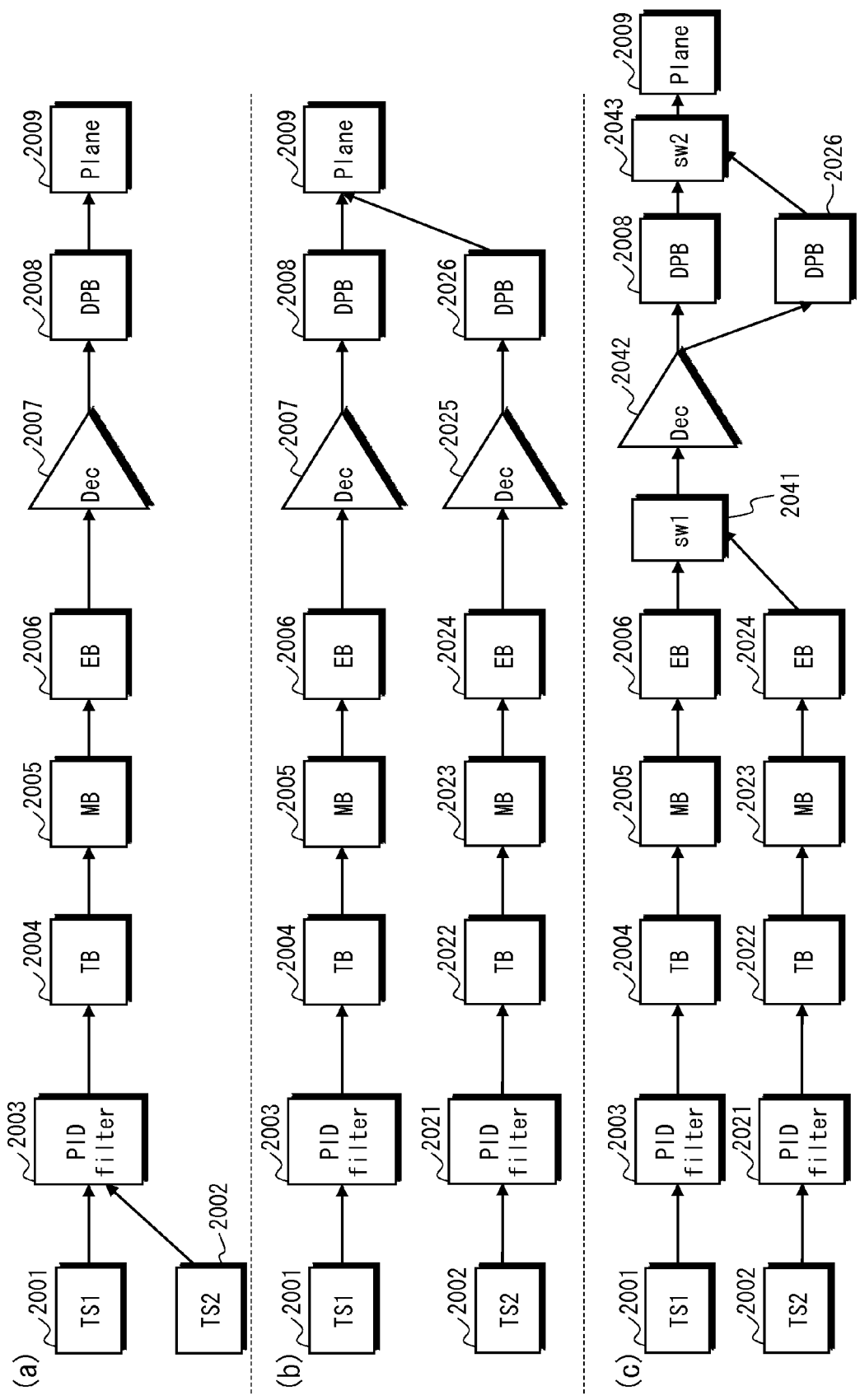

PLAYBACK APPARATUS, PLAYBACK METHOD, INTEGRATED CIRCUIT, BROADCAST SYSTEM, AND BROADCAST METHOD USING A BROADCAST VIDEO AND ADDITIONAL VIDEO

This application is the National Stage of International Application No. PCT/JP2012/005088, filed Aug. 9, 2012, which claims the benefit of U.S. Provisional Application No. 61/522,393, filed Aug. 11, 2011.

TECHNICAL FIELD

The present invention relates to a technology of combining a video received via a broadcast wave and a video received via a network to display the videos as a single video.

BACKGROUND ART

In recent years, a broadcasting organization and the like are considering a hybrid service of combining broadcasting and communications networks (hereinafter, referred to as communications) from the standpoint of enhancing a broadcast service by utilizing communications. As an example of a technology for providing such a hybrid service, Non-Patent Literature 1 discloses the following technology called Hybridcast™. Hybridcast uses a receiver that receives broadcast programs transmitted via a broadcast wave and contents transmitted via a network, and synchronizes and presents the received programs and contents.

With this technology, the receiver receives a broadcast video transmitted by broadcasting and an additional video transmitted via a network, and displays a single combined video by arranging the broadcast video on the right and the additional video on the left. As a result, it is possible to display the video that is wider than the video transmitted by broadcasting, for example. Further, compatibility with receivers that do not support the above technology (hereinafter, such receivers are referred to as "legacy receivers") can be maintained since the legacy receivers can receive and display a video transmitted via a broadcast wave.

CITATION LIST

Non-Patent Literature

[Non-Patent Literature 1]
Kinji Matsumura, Yasuaki Kanatsugu, "Hybridcast™ No Gaiyou To Gijutsu", NHK STRL R&D, No. 124, 2010.

SUMMARY OF INVENTION

Technical Problem

A broadcast video is also played back by legacy receivers and in many cases, the broadcast video is an important video including important objects. For example, in the case of soccer broadcasted live, a broadcast video is a video showing a scene around the soccer ball.

On the other hand, a view range of an additional video might be determined by a fixed position relative to the broadcast video, e.g., an additional video is a video placed to the left of the broadcast video, and the degree of importance of the additional video might be low. For example, in the case of soccer broadcasted live, if the broadcast video shows a scene around the soccer goal post that is positioned on the left when viewed from the viewer, the additional video shows only the seats for the audience positioned further leftward when viewed from the viewer.

In this case, in a combined video formed by combining the broadcast video and the additional video, the ratio of an area having a low degree of importance also increases.

The present invention has been achieved in view of the above problem, and an aim thereof is to provide a playback apparatus capable of reproducing and playing back a single combination video by combining a broadcast video and any additional video that is not determined by a fixed position relative to the broadcast video.

Solution to Problem

In order to solve the above problem, a playback apparatus according to the present invention is a playback apparatus for reproducing and playing back an original video, comprising: a first receiving unit that receives, via a broadcast wave, a broadcast video composed of a plurality of broadcast images, each broadcast image being a portion of a frame image among a plurality of frame images constituting the original video; a second receiving unit that receives an additional video composed of a plurality of remaining images, each remaining image being the remaining portion of the frame image; an arrangement information acquiring unit that acquires arrangement information indicating an arrangement of the broadcast image and the remaining image in the frame image; and a playback unit that reproduces and plays back the frame images by arranging the broadcast images and the remaining images based on the arrangement information.

Advantageous Effects of Invention

With the above described structure, a playback apparatus according to the present invention is capable of playing back an original video by using a broadcast video and any additional video that is not determined by a fixed position relative to the broadcast video.

BRIEF DESCRIPTION OF DRAWINGS

FIG. 17A shows an example of a multi-angle service and FIG. 17B shows an example of different viewpoint video information, both pertaining to Modification of the present invention.

FIG. 18 shows the different viewpoint video information pertaining to Modification of the present invention.

FIG. 19A is a view for illustrating selection of different viewpoint videos with an index video and FIG. 19B shows an example of the different viewpoint video information, both pertaining to Modification of the present invention.

FIGS. 20A-20C show the structures of an additional stream decoding unit pertaining to Modification of the present invention. FIG. 20A shows a structure 1, FIG. 20B shows a structure 2, and FIG. 20C shows a structure 3.

DESCRIPTION OF EMBODIMENT

1. Outline

The following explains a broadcast content receiving system pertaining to Embodiment of the present invention.

The broadcast content receiving system includes a broadcast system and a playback apparatus.

The broadcast system transmits contents by broadcasting (hereinafter, contents transmitted by broadcasting are referred to as "broadcast contents"), and transmits contents relevant to the broadcast contents (hereinafter, these relevant contents are referred to as "additional contents") by using network communications. In the present embodiment, videos are used as an example of contents. That is, the broadcast contents are a broadcast video, and the additional contents are an additional video.

The playback apparatus receives the broadcast video and the additional video, combines the two videos, and plays back the combined video.

The broadcast content receiving system is formed by taking into account compatibility with playback apparatuses that do not have a function of receiving and playing back the additional video (such apparatuses are referred to as legacy apparatuses). To be specific, the broadcast system transmits the broadcast video in a format that can be received and played back by the legacy apparatuses.

Figure 32:
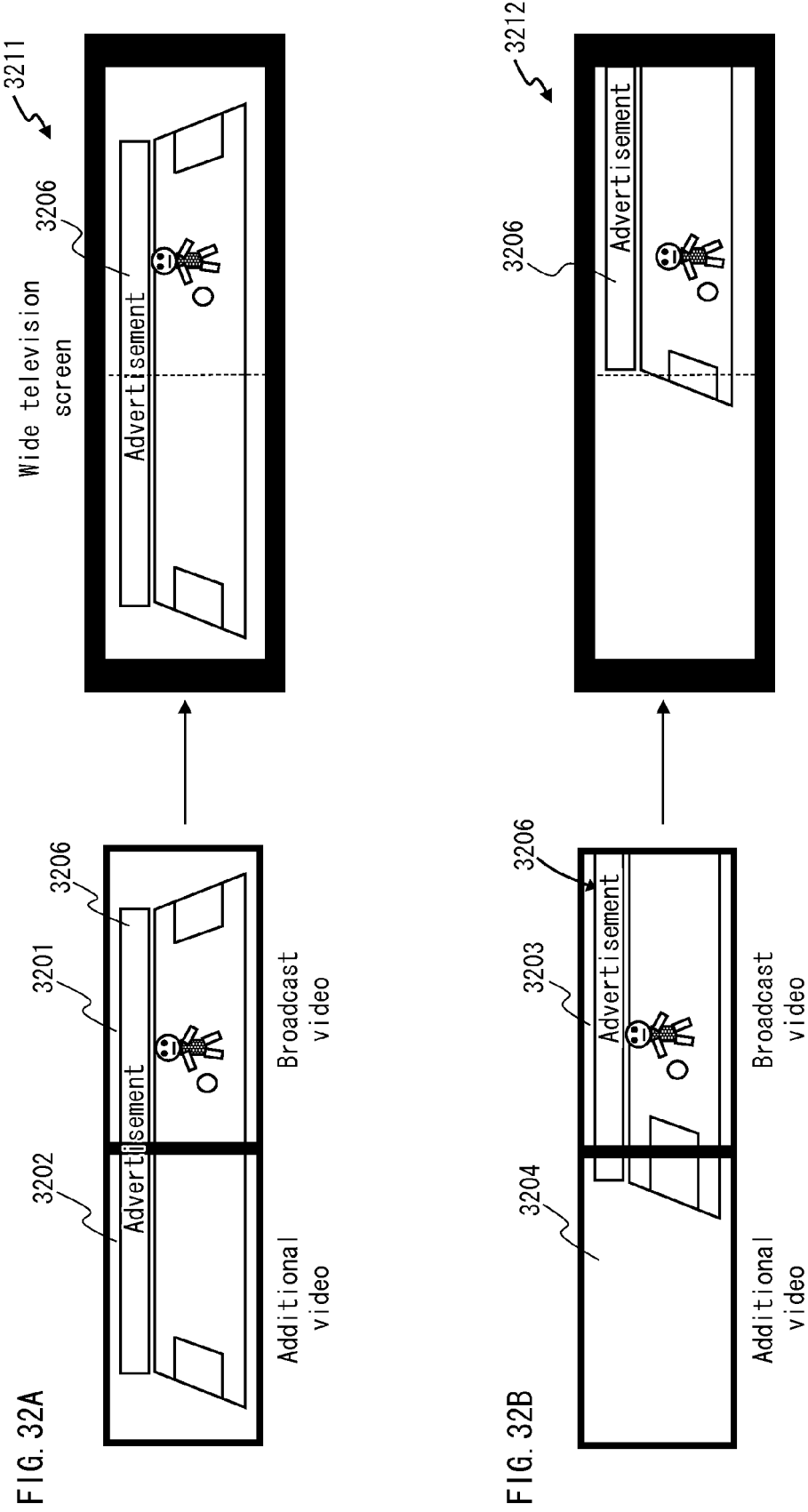
FIGS. 32A and 32B are each a view for illustrating the case of simply combining a broadcast video and an additional video.

The following describes the case of simply combining a broadcast video and an additional video, with reference to FIGS. 32A and 32B.

Each of FIGS. 32A and 32B shows a soccer field where a soccer game is played. In the present embodiment, when a soccer field is filmed and broadcasted, "soccer ball" is the highest in terms of the degree of importance as an object, and "advertisement" is the second highest because of the sponsorship, etc. However, this is an example and the present embodiment is not limited to this.

FIG. 32A schematically shows the case of simply connecting an image from an additional video 3202 to the left edge of an image from a broadcast video 3201 to generate an image from a video 3211.

The image of the broadcast video 3201 shows a scene around the soccer ball having the highest degree of importance. The image of the video 3211 shows the scene around the soccer ball having the highest degree of importance, and the entire portion of an advertisement 3206 having the second highest degree of importance.

Here, the case where the soccer ball moves to the vicinity of the soccer goal post positioned on the left side of the court, as shown in FIG. 32B, is considered.

In this case, an image from a broadcast video 3203 shows a scene around the soccer ball having the highest degree of importance. Further, an image from an additional video 3204 shows a scene positioned to the left of the image of the broadcast video 3203. The playback apparatus combines the broadcast video 3203 with the additional video 3204 to play back a video 3212.

This causes an image from the video 3212 to show only a part of the advertisement 2306 having the second highest degree of importance. That is, it is impossible to avoid an increase in the ratio of an area having a low degree of importance.

The present invention solves problems caused when only a video determined by a fixed position relative to the broadcast video can be used as the additional video, e.g., a problem that the video having the second highest degree of importance cannot be displayed.

Figure 3:
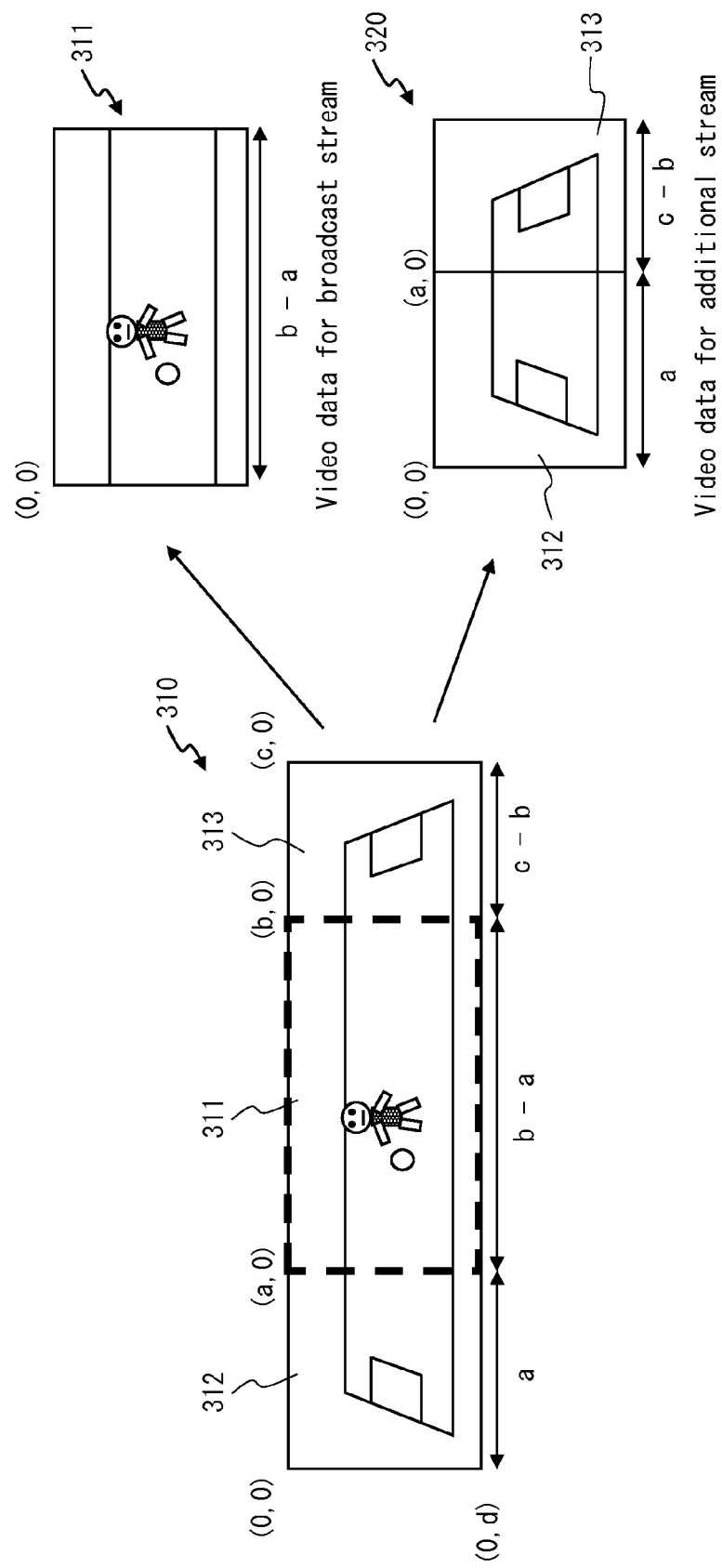
FIG. 3 is a view for illustrating processing of separating a video.

In the present embodiment, as shown in FIG. 3 as an example, a super-wide video 310 is filmed as an original video. Any portion of the super-wide video 310 is selected as a broadcast video 311 and transmitted as a broadcast stream. In the present embodiment, a super-wide video is wider and has higher resolution than a video transmitted via a broadcast wave.

Also, an additional video 320 is formed by combining, with each other, the remaining portions of the super-wide video 310 from which the broadcast video 311 has been extracted (hereinafter, such remaining portions are referred to as remaining videos 312 and 313). The additional video 320 is transmitted as an additional stream via a network. This makes it possible to use videos other than the video determined by a fixed position relative to the broadcast video, as the additional video.

The playback apparatus can reproduce and play back the super-wide video 310 by using the broadcast video 311 and the additional video 320.

The following describes the present embodiment in detail.

2. Broadcast System 100

<2-1. Structure>

Figure 1:
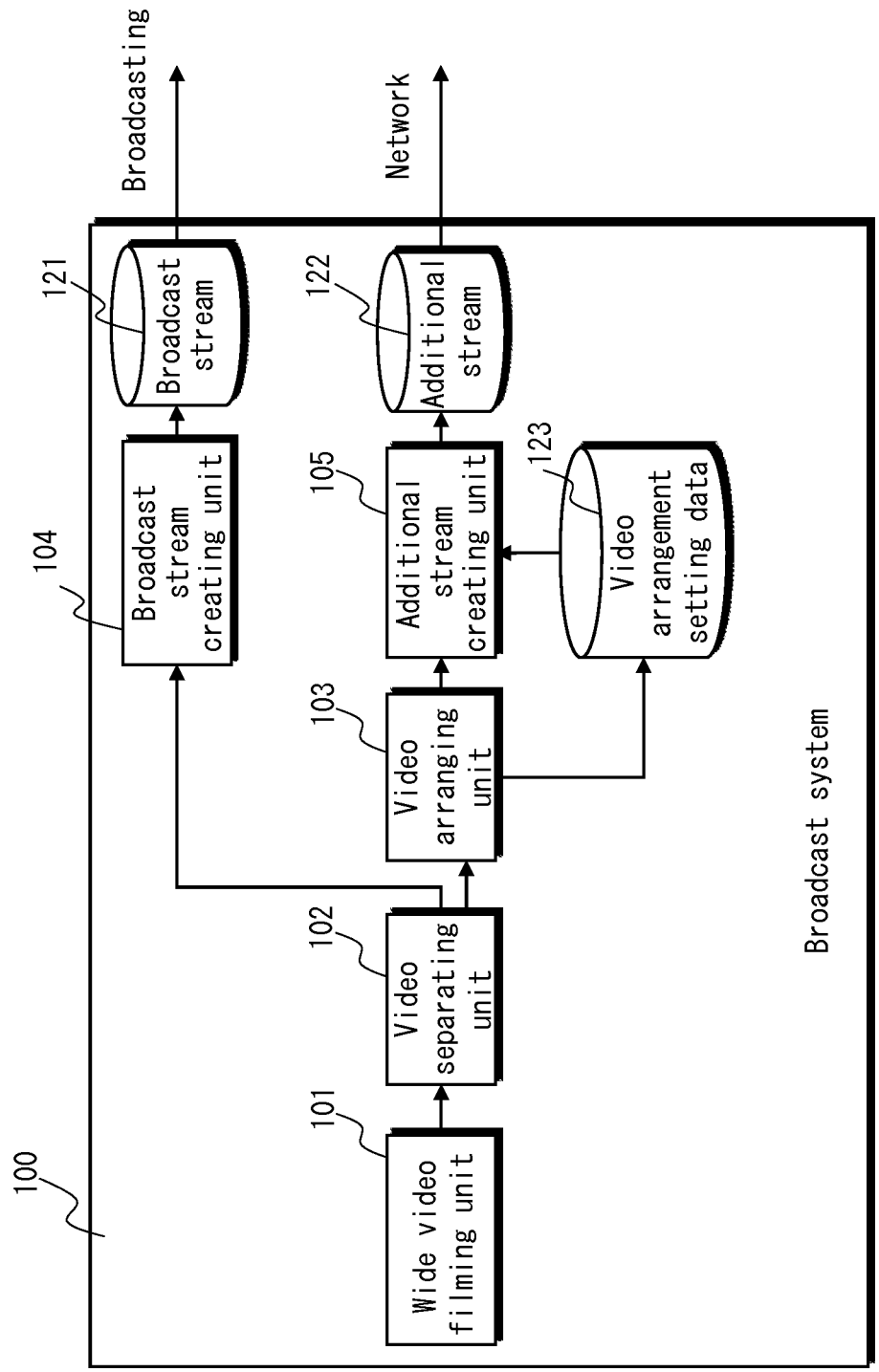
FIG. 1 is a block diagram showing the structure of a broadcast system pertaining to Embodiment of the present invention.

FIG. 1 is a block diagram showing the structure of a broadcast system 100.

The broadcast system 100 includes a wide video filming unit 101, a video separating unit 102, a video arranging unit 103, a broadcast stream creating unit 104 and an additional stream creating unit 105, as shown in FIG. 1.

The broadcast system 100 additionally includes a processor and a memory. The processor executes programs stored in the memory to realize the functions of the wide video filming unit 101, the video separating unit 102, the video arranging unit 103, the broadcast stream creating unit 104 and the additional stream creating unit 105.

<Wide Video Filming Unit 101>

The wide video filming unit 101 includes a video camera filming a super-wide video that is wider and has higher resolution than a video transmitted via a broadcast wave. The wide video filming unit 101 outputs video data pertaining to the filmed super-wide video to the video separating unit 102.

In the present embodiment, the video transmitted via a broadcast wave is a full HD video with a resolution of 1920× 1080 pixels, and the super-wide video is a video with a resolution of 3820×1080 pixels.

<Video Separating Unit 102>

The video separating unit 102 has the function of receiving the video data pertaining to the super-wide video from the wide video filming unit 101 to separate the super-wide video into a video to be transmitted via a broadcast wave (hereinafter, referred to as "broadcast video") and the other video (hereinafter, such a function is referred to as "video separation function").

(Video Separation Function)

The video separation function is realized by separating each of frame images constituting a video into a plurality of images.

The video separation function consists of selection range acquisition function and image separation function.

(1) Selection Range Acquisition Function

The following describes the selection range acquisition function with reference to FIG. 3.

The super-wide video 310 in FIG. 3 has c pixels in width and d pixels in height.

The video separating unit 102 acquires an instruction indicating a view range within the super-wide video 310 that is to be transmitted as a broadcast video (hereinafter, such a range is referred to as "selection range"). The selection range is designated by a user operation using an input device such as a remote controller (unillustrated), for example.

In an example of FIG. 3, a selection range is designated as an area surrounded by a dashed line in an image from the super-wide video 310. Specifically, the selection range is a rectangle whose top left coordinates are (a, 0), and has (b−a) in width and d in height.

Note that in the following description, when coordinates of videos, images, etc., are denoted by (x, y), for example, these coordinates are supposed to be located in the coordinates system having the origin (0, 0) at the top left pixel of each of the videos, images, etc.

(2) Image Separation Function

The following describes the image separation function with reference to FIG. 3.

The video separating unit 102 extracts the video 311 within the selection range from the super-wide video 310. An image from the video 311 is a rectangular-shaped image having b−a in width and d in height.

The video separating unit 102 acquires the remaining videos 312 and 313 as a result of extraction of the video 311 from the super-wide video 310.

The video separating unit 102 outputs selection range information indicating the selection range to the video arranging unit 103.

The selection range information includes the top left coordinates of the selection range in the wide video and the width and height of the selection range.

<Video Arranging Unit 103>

The video arranging unit has video arrangement function.

The video arrangement function consists of additional video creation function and video arrangement setting data creation function.

(1) Additional Video Creation Function

The additional video creation function is a function of creating a video to be transmitted by communications as an additional video, based on videos remaining after the broadcast video is separated from the super-wide video by the video separating unit 102.

The remaining video may be one, or more than one.

For example, the video separating unit 102 creates the video 320 by combining the video 312 and the video 313 that are not to be transmitted via a broadcast wave.

Here, an image from the video 312 is a rectangular-shaped image whose top left coordinates are (0, 0), whose width is a, and whose height is d. An image from the video 313 is a rectangular-shaped image whose top left coordinates are (b, 0), whose width is c−b, and whose height is d.

An image from the additional video 320 is formed by combining the image of the video 312 and the image of the video 313, and is a rectangular-shaped image having a+(c−b) in width and d in height.

Note that the reason why each of the frame images constituting the additional video has a rectangular shape is that a video is normally constituted by rectangular frame images, and accordingly the additional video can be handled in a similar manner to a normal video in transmission, compression encoding, and decoding.

(2) Video Arrangement Setting Data Creation Function

The video arrangement setting data creation function is the function of creating video arrangement setting data.

The video arrangement setting data contains information indicating how to arrange the broadcast video and the remaining videos to reproduce the super-wide video.

The following describes the video arrangement setting data creation function based on a specific example.

The video separating unit 102 refers to the selection range information to create the video arrangement setting data.

The video arrangement setting data indicates how to arrange the broadcast video 311 and the remaining videos 312 and 313 so as to reproduce the super-wide video 310, for example.

Figure 4:
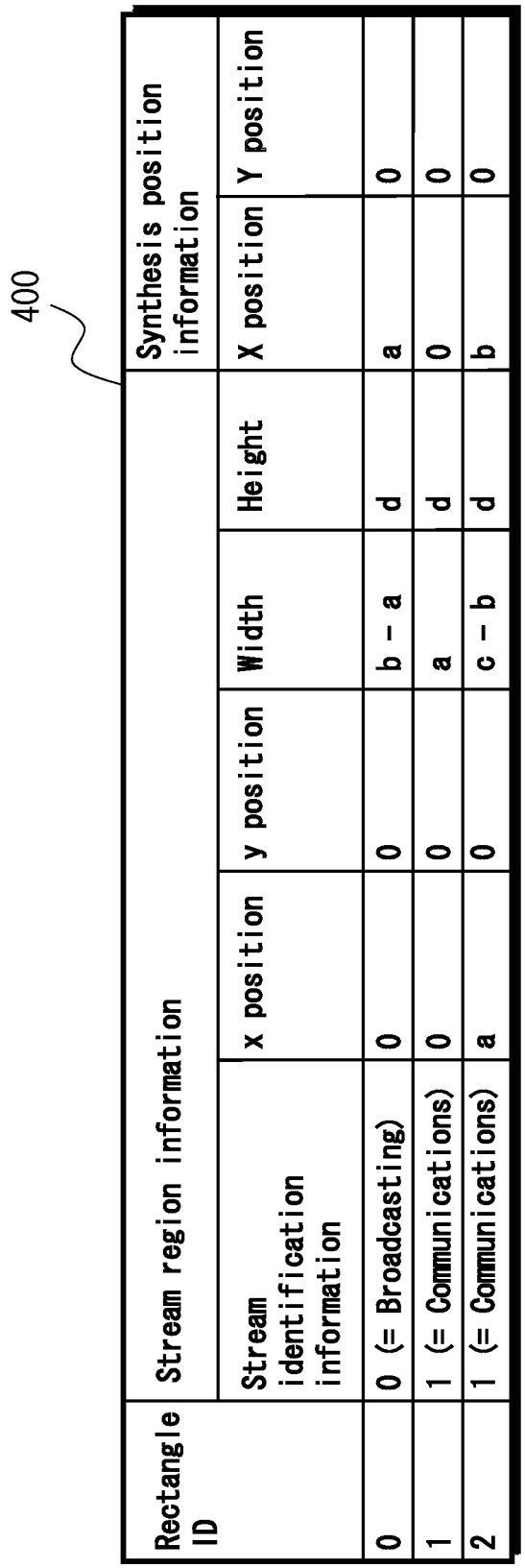
FIG. 4 shows an example of video arrangement setting data.

FIG. 4 shows an example of video arrangement setting data.

The video arrangement setting data 400 includes a set of a rectangle ID, stream region information and synthesis position information for each of the broadcast video and the remaining videos that have been created by the video separating unit 102 separating a video.

Each rectangle ID is an ID for identifying a video created by the video separating unit 102 separating a video.

In an example of FIG. 4, the broadcast video 311 is assigned the rectangle ID "0", the video 312 is assigned the rectangle ID "1", and the video 313 is assigned the rectangle ID "2".

The stream region information is composed of stream identification information, x position, y position, width and height.

The stream identification information indicates either broadcasting or communications as the method used for transmitting the video identified by the rectangle ID. The stream identification information has a value "0" when transmitted by broadcasting, and has "1" when transmitted by communications.

The x and y positions indicate x and y positions of the video identified by the rectangle ID in either the broadcast video or the additional video. Whether the video identified by the rectangle ID is included in the broadcast video or the additional video can be determined by the stream identification information. To be specific, when the stream identification information indicates broadcasting, the identified video is included in the broadcast video, and when the stream identification information indicates communications, the identified video is included in the additional video.

The width and height indicate the width and height of the video identified by the rectangle ID.

The synthesis position information is composed of an X and Y positions.

The X and Y positions indicate x and y positions of the video identified by the rectangle ID in the wide video.

The video separating unit 102 sets, regarding the broadcast video 311, "0" to the rectangle ID, "0" to the stream identification information, which indicates broadcasting, "0" to the x position, "0" to the y position, "b−a" to the width, "d" to the height, "a" to the X position, which is the x coordinate in the super-wide image, and "0" to the Y position, which is the y coordinate in the super-wide image.

Additionally, the video separating unit 102 sets, regarding the broadcast video 313, "2" to the rectangle ID, "1" to the stream identification information, which indicates communications, "a" to the x position, which is the x coordinate in the additional video, "0" to the y position, which is the y coordinate in the additional video, "c−b" to the width, "d" to the height, "b" to the X position, which is the x coordinate in the super-wide video, and "0" to the Y position, which is the y coordinate in the super-wide video.

Note that although it is explained above that the video arrangement setting data is created for each super-wide video, the video arrangement setting data is actually created for one or more frame images constituting the super-wide video. This allows for separation and combination in units of frame images.

<Broadcast Stream Creating Unit 104>

The broadcast stream creating unit 104 has the function of converting the format of the broadcast video into a format transmittable via a broadcast wave to output the broadcast video (hereinafter, this function is referred to as "broadcast stream creation function").

As the broadcast stream creation function, the broadcast stream creating unit 104 creates a video stream by compressing and encoding the broadcast video by a certain video codec such as Moving Picture Experts Group-2 (MPEG-2) and MPEG-4 AVC.

Further, in terms of sounds, the broadcast stream creating unit 104 creates an audio stream by compressing and encoding the broadcast video by a certain audio codec such as Audio Code number 3 (AC3) and Advanced Audio Coding (AAC).

The broadcast stream creating unit 104 creates one system stream such as an MPEG-2 TS by multiplexing a video stream, an audio stream, a subtitle stream, data for a data broadcast, etc.

The system stream that is created as above and broadcasted is hereinafter referred to as "broadcast stream" (121).

Note that since sounds have little relation with the present invention, a specific explanation is not provided except when necessary.

<Additional Stream Creating Unit 105>

The additional stream creating unit 105 has the functions of converting the format of the additional video into a format transmittable by communications to output the additional video (hereinafter, this function is referred to as "additional stream creation functions").

As the additional stream creation functions, the additional stream creating unit 105 creates a video stream by compressing and encoding the additional video created by the video arranging unit 103 by a certain video codec such as MPEG-2 and MPEG-4 AVC. The additional stream creating unit 105 creates one system stream such as an MPEG-2 TS by multiplexing a video stream, an audio stream, a subtitle stream, data for a data broadcast, etc.

The system stream that is created as above and transmitted by communications is hereinafter referred to as "additional stream".

Figure 5:
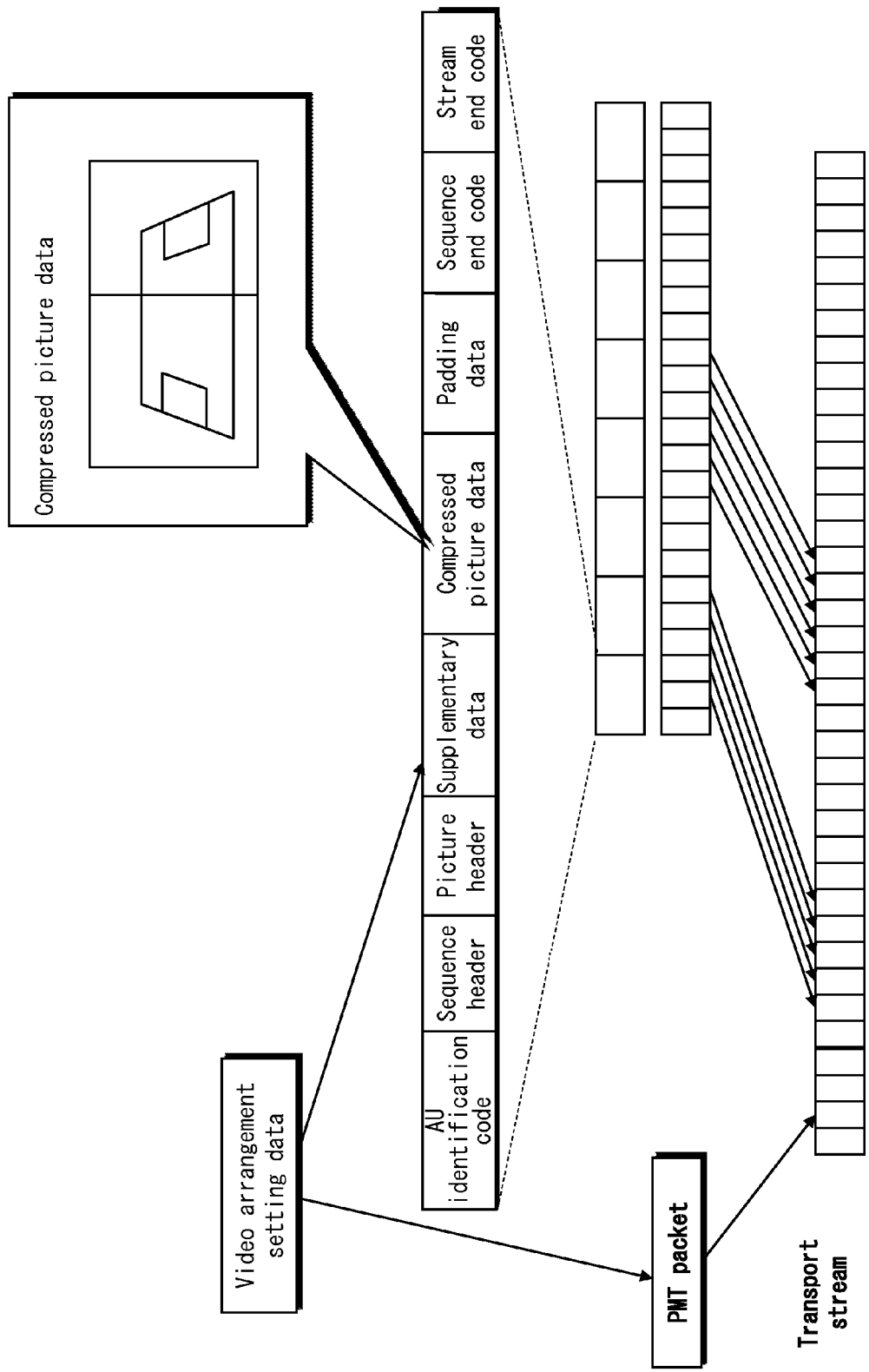
FIG. 5 is a view for illustrating storing the video arrangement setting data in a transport stream.

Further, as one of the additional stream creation functions, the additional stream creating unit 105 stores the video arrangement setting data 123 created by the video arranging unit 103 in the additional stream 122. For example, as shown in FIG. 5, the additional stream creating unit 105 stores the video arrangement setting data 123 in the video stream as part of supplementary data, or as part of a descriptor such as PMT (Program Map Table).

<Other Structure>

While not shown in FIG. 1, the broadcast system 100 has a transmitting unit composed of an OFDM modulating unit, a frequency converting unit and an RF transmitting unit each for transmitting a broadcast stream via a broadcast wave. The transmitting unit is the same as that of a general digital broadcast system.

This transmitting unit transmits a broadcast stream created by the broadcast stream creating unit 104 to the playback apparatus 200, etc. via a broadcast wave.

Further, while not shown in FIG. 1, the broadcast system 100 includes a network interface for transmitting/receiving data via a network.

This network interface transmits the additional stream created by the additional stream creating unit 105 to the playback apparatus 200 via a network.

<2-2. Operation>

Figure 6:
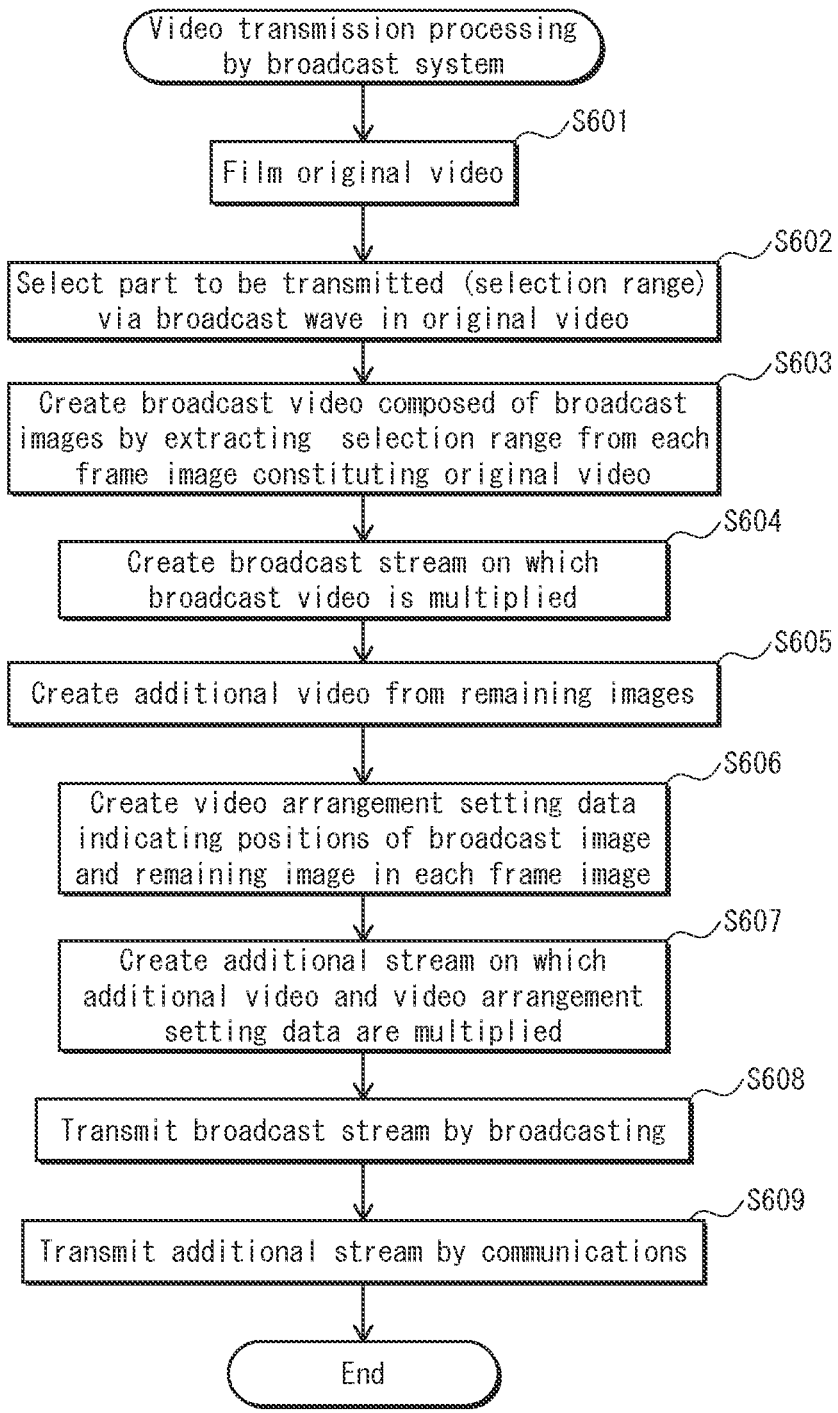
FIG. 6 is a flowchart showing a procedure of video transmission processing performed by the broadcast system.
Figure 7:
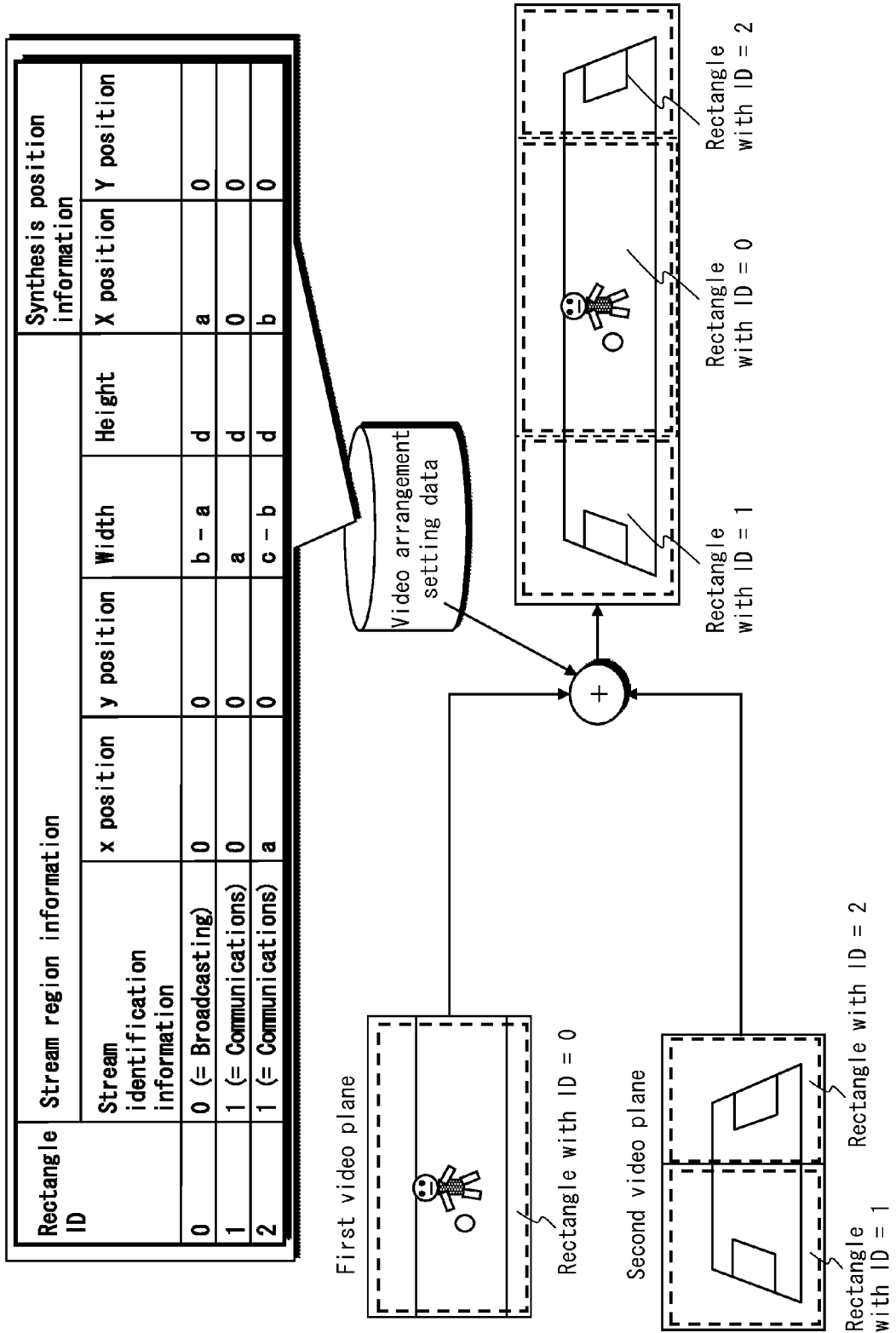
FIG. 7 is a view for illustrating synthesis of videos performed by the playback apparatus.

FIG. 6 is a flowchart showing a procedure of video transmission processing performed by the broadcast system 100.

In the broadcast system 100, the wide video filming unit 101 first films a super-wide video (super-wide video 310, for example) as an original video (S601).

Subsequently, the video separating unit 102 acquires a selection range in the filmed super-wide video by using the selection range acquisition function (S602).

Next, the video separating unit 102 extracts the selection range from each frame image constituting the original video, and creates a broadcast video consisting of the extracted selection ranges (S603).

Next, the broadcast stream creating unit 104 creates a broadcast stream by multiplying the broadcast video by using the broadcast stream creation function (S604).

Subsequently, the video arranging unit 103 creates additional images based on images remaining after the selection range is extracted from each frame image constituting the super-wide video, and creates the additional video consisting of the created additional images (S605).

Further, the video arranging unit 103 creates video arrangement setting data by using the video arrangement setting data creation function (S606).

Subsequently, the additional stream creating unit 105 creates an additional stream by multiplexing the additional video and the video arrangement setting data by using the additional stream creation functions (S607).

The broadcast stream creating unit 104 then transmits the broadcast stream via a broadcast wave (S608).

Further, the additional stream creating unit 105 transmits the additional stream to the playback apparatus 200 by communications (S609).

3. Playback Apparatus 200

<3-1. Structure>

Figure 2:
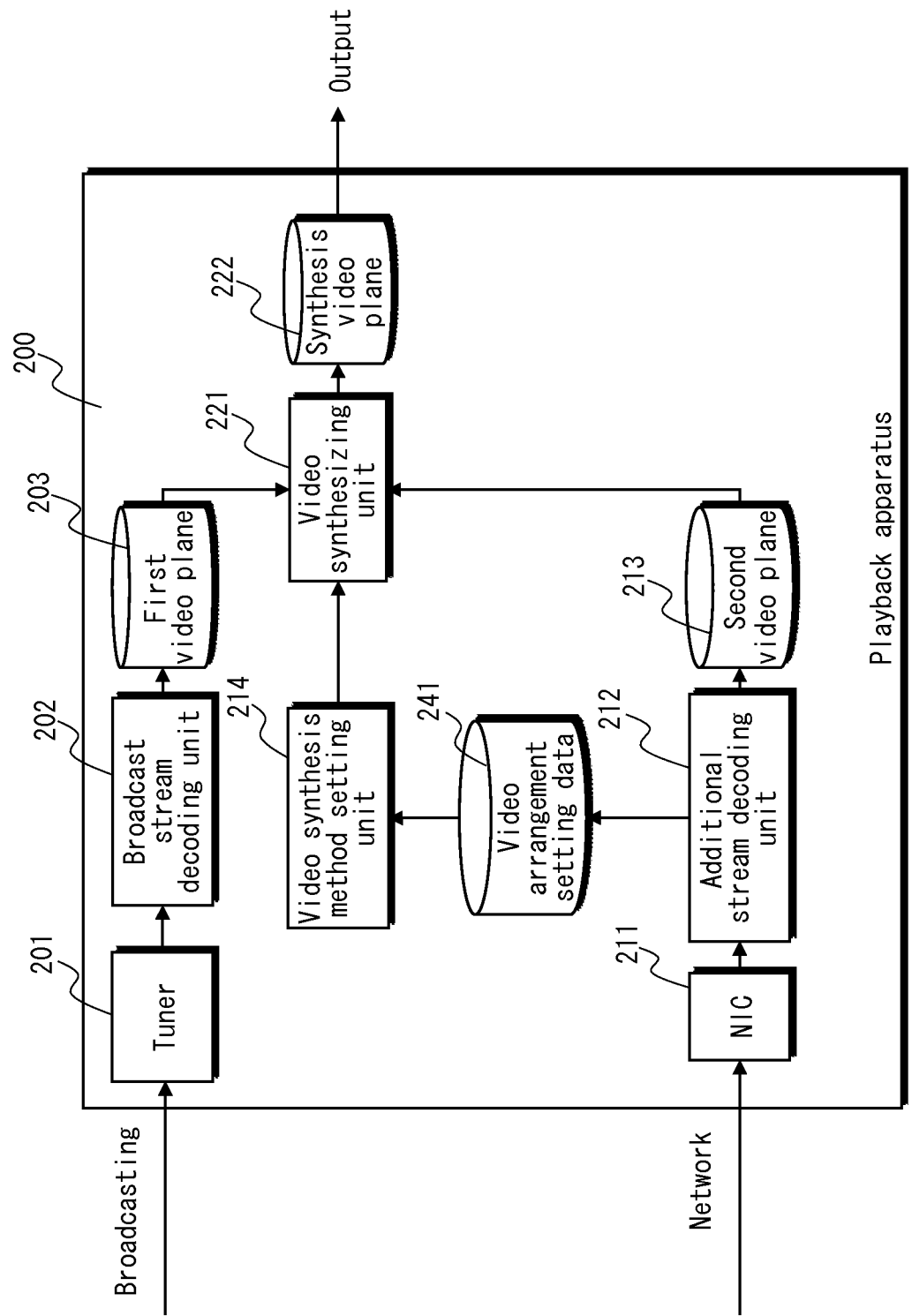
FIG. 2 is a block diagram showing the structure of a playback system pertaining to Embodiment of the present invention.

FIG. 2 is a block diagram showing the structure of a playback apparatus 200.

The playback apparatus 200 includes a tuner 201, a broadcast stream decoding unit 202, a first video plane 203, an network interface card (NIC) 211, an additional stream decoding unit 212, a second video plane 213, a video synthesis method setting unit 214, a video synthesizing unit 221 and a synthesis video plane 222, as shown in FIG. 2.

Further, the playback apparatus 200 includes a processor and a memory. The processor executes programs stored in the memory to realize the functions of the tuner 201, the broadcast stream decoding unit 202, the NIC 211, the additional stream decoding unit 212, the video synthesis method setting unit 214, and the video synthesizing unit 221.

<Tuner 201>

The tuner 201 is realized by a tuner LSI including a digital tuner, an Orthogonal Frequency Division Multiplexing (OFDM) demodulating unit, an error correcting unit, a demultiplexing unit, etc.

The tuner 201 receives a broadcast wave, extracts a signal regarding a certain channel (service ID) designated by a user using a remote controller (unillustrated) and the like, extracts TS packets regarding videos, sounds and subtitles from the extracted signal, and outputs the extracted TS packets.

Since the processing from reception of the broadcast wave to extraction of the TS packets regarding videos, sounds, data broadcast, etc., are known, the explanation thereof is omitted.

<Broadcast Stream Decoding Unit 202>

The broadcast stream decoding unit 202 is realized by an AV signal processing LSI, and has the function of reproducing video frames by receiving and decoding TS packets pertaining to a video to output the reproduced video frames at a timing indicated by a PTS (Presentation Time-Stamp).

In the present embodiment, the broadcast stream decoding unit 202 receives TS packets from the tuner 201 and writes the reproduced video frames (hereinafter, referred to as "broadcast video frames") in the first video plane 203.

<First Video Plane 203>

The first video plane 203 is composed of a frame memory. The first video plane 203 stores therein broadcast video frames created by the broadcast stream decoding unit 202.

Note that the first video plane 203 is assigned the plane ID=1.

<NIC 211>

The NIC 211 is composed of an LSI for communications, and has the function of transmitting/receiving data via a network.

When receiving an additional stream via a network, the NIC 211 outputs the received additional stream to the additional stream decoding unit 212.

<Additional Stream Decoding Unit 212>

The additional stream decoding unit 212 is realized by an AV signal processing LSI, and has the function of decoding a video stream included in the additional stream.

As the function of decoding a video stream, to be specific, the additional stream decoding unit 212 receives an additional stream from the NIC 211, reproduces video frames (hereinafter, referred to as "additional video frames") by decoding a video stream included in the additional stream, and writes the reproduced video frames in the second video plane 213. Further, the additional stream decoding unit 212 extracts the video arrangement setting data 241 stored in the additional stream.

<Second Video Plane 213>

The second video plane 213 is composed of a frame memory. The second video plane 213 stores therein the additional video frames reproduced by the additional stream decoding unit 212.

Note that the second video plane 213 is assigned the plane ID=2.

<Video Synthesis Method Setting Unit 214>

The video synthesis method setting unit 214 has a synthesis instruction function of referring to the video arrangement setting data 241, synthesizing the broadcast video frames stored in the first video plane 203 and the additional video frames stored in the second video plane 213, and outputting a synthesis instruction with parameters of synthesis information for reproducing frame images constituting a super-wide video.

(Synthesis Instruction Function)

The synthesis instruction function of the video synthesis method setting unit 214 is explained by using a specific example.

The video synthesis method setting unit 214 acquires the video arrangement setting data 241 corresponding to PTSs of the broadcast video frames stored in the first video plane 203 and of the additional video frames stored in the second video plane 213.

As an example, the video arrangement setting data 241 is the video arrangement setting data 400 shown in FIG. 4.

First, the video synthesis method setting unit 214 counts the number of rectangle IDs (the number of images) in the video arrangement setting data 400 and outputs the counted number to the video synthesizing unit 221.

The video synthesis method setting unit 214 reads the first line of the video arrangement setting data 400 (rectangle ID=0).

Since the stream identification information is 0 (=broadcasting), the video synthesis method setting unit 214 determines that an image whose rectangle ID is 0 is read from the first video plane 203.

Subsequently, based on the description of the first line of the video arrangement setting data 400, the video synthesis method setting unit 214 outputs, to the video synthesizing unit 221, a synthesis instruction with parameters such as the plane ID (=1), x position (=0), y position (=0), width (=b−a), height (=d), X position (=a) and Y position (=0) (for the sake of convenience, this synthesis instruction is referred to as "synthesis instruction 1").

The video synthesis method setting unit 214 reads the second line of the video arrangement setting data 400 (rectangle ID=1).

Since the stream identification information is 1 (=communications), the video synthesis method setting unit 214 determines that an image whose rectangle ID is 1 is read from the second video plane 213.

Subsequently, based on the description of the second line of the video arrangement setting data 400, the video synthesis method setting unit 214 outputs, to the video synthesizing unit 221, a synthesis instruction with parameters such as the plane ID (=2), x position (=0), y position (=0), width (=a), height (=d), X position (=0) and Y position (=0) (for the sake of convenience, this synthesis instruction is referred to as "synthesis instruction 2").

The video synthesis method setting unit 214 reads the third line of the video arrangement setting data 400 (rectangle ID=2).

Since the stream identification information is 1 (=communications), the video synthesis method setting unit 214 determines that an image whose rectangle ID is 2 is read from the second video plane 213.

Subsequently, based on the description of the third line of the video arrangement setting data 400, the video synthesis method setting unit 214 outputs, to the video synthesizing unit 221, a synthesis instruction with parameters such as the plane ID (=2), x position (=a), y position (=0), width (=c−b), height (=d), X position (=b) and Y position (=0) (for the sake of convenience, this synthesis instruction is referred to as "synthesis instruction 3").

Similarly, the video synthesis method setting unit 214 reads the $N^{th}$ line if it exists (N is a natural number equal to or more than 4).

Subsequently, the video synthesis method setting unit 214 determines whether the stream identification information of the $N^{th}$ line of the video arrangement setting data 400 is 0 or 1. When the stream identification information is 0, the video synthesis method setting unit 214 determines that the image is read from the first video plane 203 (plane ID=1), and when the stream identification information is 1, the video synthesis method setting unit 214 determines that the image is read from the second video plane 213 (plane ID=2).

Further, based on the description of the $N^{th}$ line of the video arrangement setting data 400, the video synthesis method setting unit 214 outputs, to the video synthesizing unit 221, a synthesis instruction with parameters such as the plane ID, x position, y position, width, height, X position and Y position (for the sake of convenience, this synthesis instruction is referred to as "synthesis instruction N").

<Video Synthesizing Unit 221>

The video synthesizing unit 221 is realized by an AV signal processing LSI.

The video synthesizing unit 221 has a video synthesis function of synthesizing videos in accordance with the synthesis instructions 1-N notified by the video synthesis method setting unit 214 to reproduce a super-wide video. A super-wide video is reproduced by reproducing each of frame images constituting the super-wide video.

As an example, in accordance with the synthesis instructions 1-3, the video synthesizing unit 221 synthesizes the frame image (ID=0) of the broadcast video stored in the first video plane 203 and the frame images (ID=1 and 2) of the additional video stored in the second video plane 213 to reproduce frame images of a super-wide video, and outputs the reproduced frame images to the synthesis video plane 222.

The video synthesizing unit 221 outputs the frame images constituting the super-wide video stored in the synthesis video plane 222 to a screen (unillustrated) at the timing of the PTS. As a result of this, the super-wide video is played back.

(Video Synthesis Function)

The following explains the video synthesis function with use of a specific example.

The video synthesizing unit 221 acquires the number of images from the video synthesis method setting unit 214. The number of images corresponds to the number of videos to be combined with each other for reproducing the super-wide video.

The video synthesizing unit 221 initializes the synthesis video plane 222.

The video synthesizing unit 221 acquires the synthesis instruction from the video synthesis method setting unit 214. Subsequently, the video synthesizing unit 221 writes an image that is in a video plane identified by the plane ID and has the top left coordinates (x position, y position) and the width and the height indicated by the synthesis instruction to a location whose top left coordinates are (X position, Y position) in the synthesis video plane 222. The plane ID is included in the synthesis instruction as a parameter, and identifies the first video plane 203 or the second video plane 213.

To be specific, when receiving the above-described synthesis instruction 1, the video synthesizing unit 221 reads an image that is b−a in width and d in height from a location (0, 0) in the first video plane 203 and writes the read image to a location (a, 0) in the synthesis video plane 222.

Similarly, when receiving the above-described synthesis instruction 2, the video synthesizing unit 221 reads an image that is a in width and d in height from a location (0, 0) in the second video plane 213 and writes the read image to a location (0, 0) in the synthesis video plane 222.

Further, when receiving the above-described synthesis instruction 3, the video synthesizing unit 221 reads an image that is c−b in width and d in height from a location (a, 0) in the second video plane 213 and writes the read image to a location (b, 0) in the synthesis video plane 222.

Through the above processing, a super-wide image (super-wide image 310 in FIG. 3, for example) is reproduced in the synthesis video plane 222.

<Synthesis Video Plane 222>

The synthesis video plane 222 is composed of a frame memory. The synthesis video plane 222 stores therein a wide video frame output from the video synthesizing unit 221.

<3-2. Operation>

Figure 8:
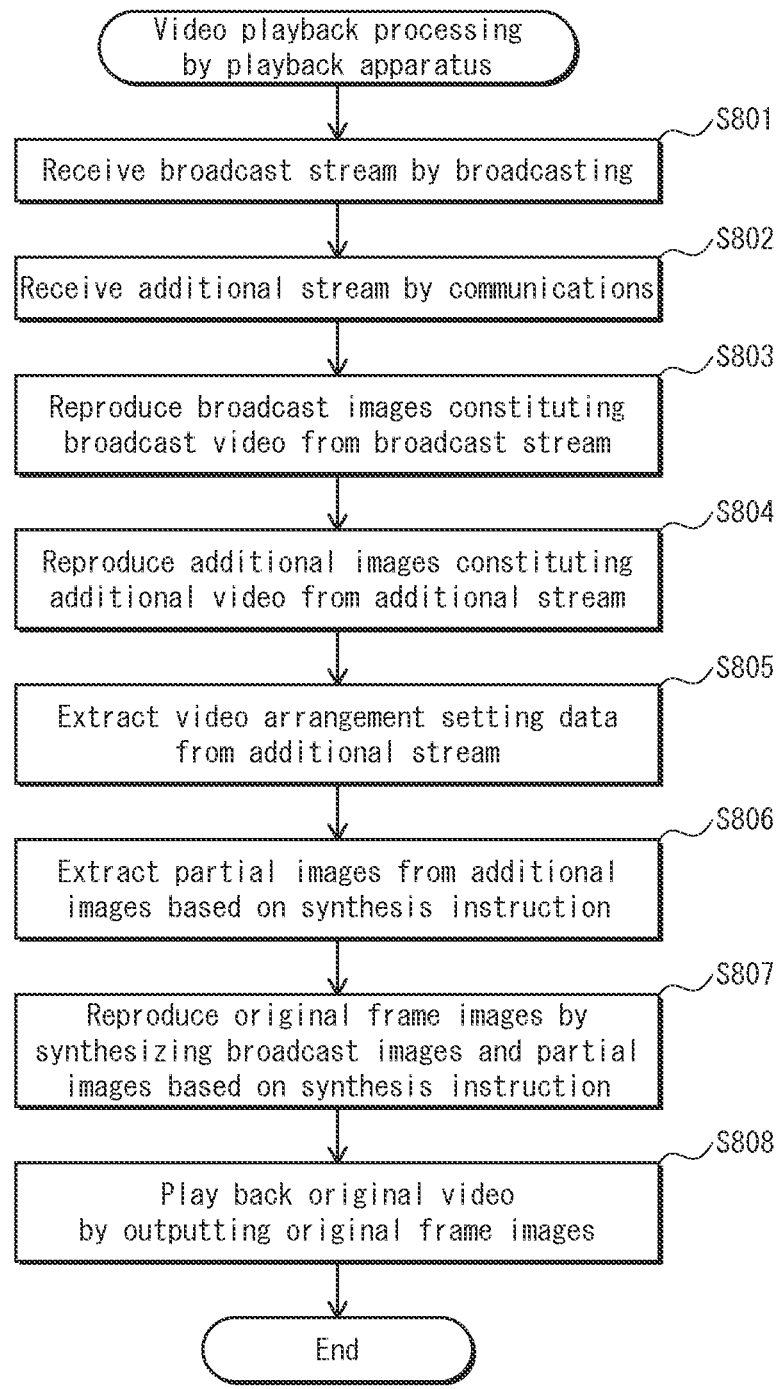
FIG. 8 is a flowchart showing a procedure of video playback processing performed by the playback apparatus.

FIG. 8 is a flowchart showing a procedure of video playback processing performed by the playback apparatus 200.

The playback apparatus 200 receives a broadcast stream with the tuner 201 (S801), and then receives an additional stream with the NIC 211 (S802).

Subsequently, the broadcast stream decoding unit 202 decodes the broadcast stream to reproduce broadcast images constituting a broadcast video (S803). The additional stream decoding unit 212 decodes the additional stream to reproduce additional images constituting an additional video (S804). The additional stream decoding unit 212 extracts the video arrangement setting data from the additional stream (S805).

Further, with the synthesis instruction function, the video synthesis method setting unit 214 outputs a synthesis instruction to the video synthesizing unit 221 based on the video arrangement setting data.

The video synthesizing unit 221 extracts a plurality of small images (hereinafter, referred to as "partial images") from the additional images based on the synthesis instruction (S806).

The video synthesizing unit 221 synthesizes the broadcast image and the plurality of partial images based on the synthesis instruction to reproduce a frame image constituting a super-wide video as an original video, and stores the reproduced frame images in the synthesis video plane 222 (S807).

The video synthesizing unit 221 plays back the original video by outputting each frame image stored in the synthesis video plane 222 in accordance with the PTS (S808).

4. Modification

The embodiment of the broadcast content receiving system pertaining to the present invention has been described above. However, the following modifications may also be applied, and the present invention should not be limited to the broadcast content receiving system according to the embodiment described above.

(1) In the above embodiment, the additional stream creating unit 105 stores the video arrangement setting data (123) in a descriptor such as a PMT. Alternatively, it is only necessary to transmit the video arrangement setting data to the playback apparatus 200.

For example, the video arrangement setting data may be stored in the Service Information Table (SIT).

Further, the video arrangement setting data may be stored in supplementary data and the like of each frame in the video stream.

Alternatively, the video arrangement setting data may be stored only in an access unit at the head of a Group of Pictures (GOP) and may be valid in the GOP.

Further, when the video arrangement setting data is stored in the descriptor, the video stream may have a section in which the video arrangement setting data is valid, and the video arrangement setting data may be stored along with time information such as a PTS of the beginning time of the section and a PTS of the ending time of the section.

Further, the video arrangement setting data may be assigned a PID, and multiplexed into a stream.

Also, the video arrangement setting data may be stored not in the additional stream but in the broadcast stream.

Additionally, when a selection range of a frame group is invariable, one piece of the video arrangement setting data may be created not for each frame but for the frame group.

(2) In the above embodiment, in the processing of acquiring the selection range, the selection range in the super-wide video 310 is designated by a user operating an input device such as a remote controller. Alternatively, it is only necessary to specify a selection range.

For example, a selection range may be determined as follows: a user touches a touch screen showing an image from the super-wide video 310 so as to select an area (specify a rectangle, for example); the video separating unit 102 acquires information indicating the selected area; and the area is determined as a selection range.

Alternatively, an important object is detected in the super-wide video 310 through image recognition processing, etc., and an area within a predetermined range centering on the important object may be determined as a selection range. As an example, a selection range may be determined as follows: image processing is performed on an image from the super-wide video 310 showing a soccer field on which a soccer game is played, so as to recognize a position of a soccer ball; and an area in which the soccer ball comes to the center is automatically selected as a selection range.

(3) In the above embodiment, a video transmitted by using the broadcast stream and the additional stream is the super-wide video. However, the present invention is not limited to this, and another video formed by improving the quality of the broadcast stream may be transmitted.

As an example of a video whose quality has been improved, a high resolution image formed from the broadcast video may be transmitted.

Figure 9:
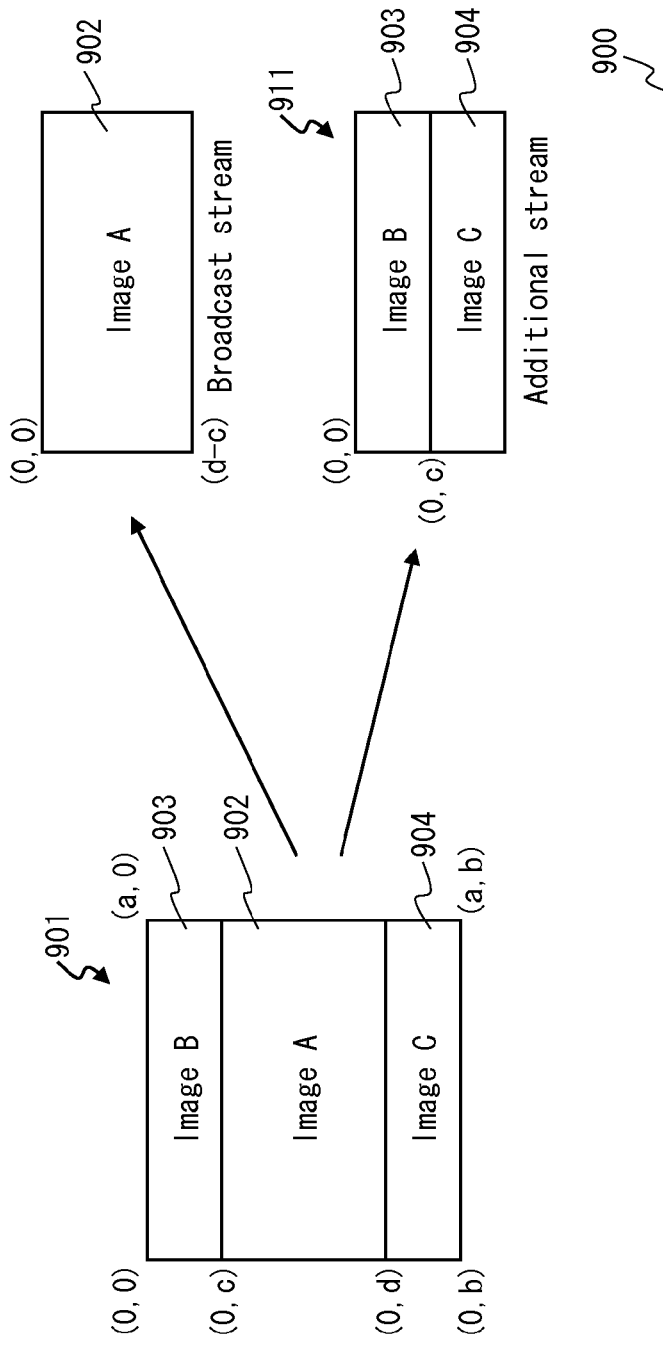
FIG. 9A shows separation and synthesis of images and FIG. 9B shows video arrangement setting data, both pertaining to Modification of the present invention.

FIGS. 9A and 9B are views for illustrating an example in which a high-resolution original video is transmitted by using the broadcast stream and the additional stream.

An image 901 in FIG. 9A is one frame image among frame images constituting the original video.

In the present modification, the video separating unit 102 of the broadcast system 100 separates the image 901 into three images 902-904. The image 902 is a broadcast image.

Other frame images constituting the original video are separated in a similar manner to the case of the image 901.

The broadcast stream creating unit 104 multiplexes the broadcast image (image 902, etc.) as a part of the broadcast stream, and transmits this broadcast stream via a broadcast wave.

Further, the video arranging unit 103 vertically combines images 903 and 904 that remain after the image 902 is extracted from the image 901 to create an image 911 as an additional image constituting the additional video.

The video arranging unit 103 creates video arrangement setting data indicating an arrangement of the images 902-904 in the image 901.

The additional stream creating unit 105 multiplexes the additional image (image 911, etc.) as part of the additional stream. The additional stream creating unit 105 multiplexes the video arrangement setting data as part of the additional stream.

The additional stream creating unit 105 transmits the additional stream by using network communications.

The following describes an example of the video arrangement setting data pertaining to the present modification.

FIG. 9B shows video arrangement setting data 900 pertaining to the image 901.

The explanation of the details of the video arrangement setting data 900 is omitted since it is the same as the above-described video arrangement setting data 400 in structure and differs only in values.

The playback apparatus 200, which is a receiver, receives the broadcast stream and the additional stream, combines the images 902, 903 and 904 based on the video arrangement setting data included in the additional stream, and restores the high resolution image 901. The playback apparatus 200 restores other frame images other than the image 901 to restore frame images in a similar manner, and plays back the original video.

(4) In addition to the above modification (3), a high-resolution widened video formed from the broadcast video may be transmitted as the original video by using the broadcast stream and the additional stream.

Figure 10:
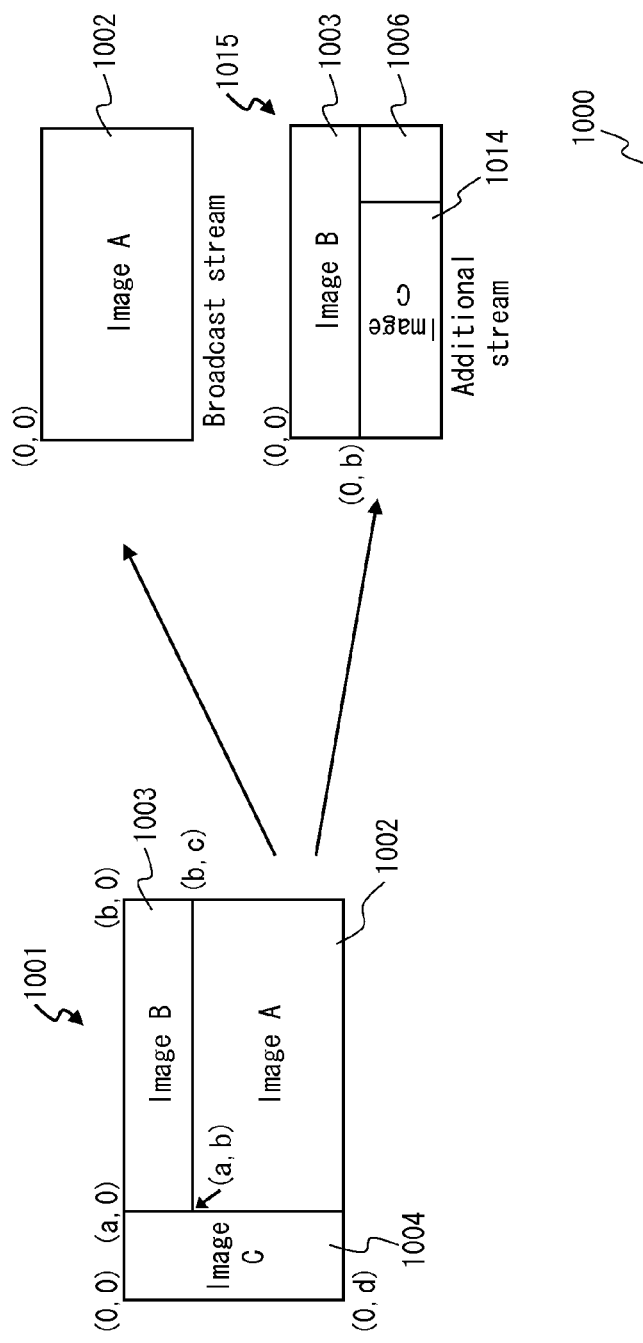
FIG. 10A shows separation and synthesis of images and FIG. 10B shows video arrangement setting data, both pertaining to Modification of the present invention.

FIGS. 10A and 10B are views for illustrating an example in which an original video is transmitted by using the broadcast stream and the additional stream.

An image 1001 in FIG. 10A is one frame image among frame images constituting the original video.

In the present modification, the video separating unit 102 of the broadcast system 100 separates the image 1001 into three images 1002-1004. The image 1001 is a frame image constituting the original video. The image 1002 is a broadcast image.

Other frame images constituting the original video are separated in a similar manner to the case of the image 1001.

The broadcast stream creating unit 104 multiplexes the broadcast image (image 1002, etc.) as part of the broadcast stream, and transmits this broadcast stream via a broadcast wave.

Here, since the image 1004 is longer than it is wide, even if the images 1003 and 1004, which remain after the image 1002 is extracted from the image 1001, are combined with each other without change, the combined image does not have a rectangular shape, unlike the above-described modification (3) (the image 911, for example).

Therefore, the image 1004 is rotated clockwise 270 degrees to be an image 1014, and the image 1014 is connected to the lower edge of the image 1003 to create an image 1015. Since the image 1003 and the image 1014 differ in width, an empty image 1006 for causing the image 1015 to have a rectangle shape is provided to the right of the image 1014 (for example, the empty image is entirely black).

The video arranging unit 103 creates video arrangement setting data indicating an arrangement of the images 1002-1004 in the image 1001.

The additional stream creating unit 105 multiplexes the image 1015 as part of the additional stream. The additional stream creating unit 105 multiplexes the video arrangement setting data as part of the additional stream.

The additional stream creating unit 105 transmits the additional stream by using network communications.

The following describes an example of the video arrangement setting data pertaining to the present modification.

FIG. 10B shows video arrangement setting data 1000 pertaining to the image 1001.

The video arrangement setting data 1000 is the same as the above-described video arrangement setting data 400 in structure, but an item "rotational angle" for indicating a rotational angle is added for each image.

To be specific, the image 1014 (rectangle ID=2) is instructed to be rotated clockwise 90 degrees.

The playback apparatus 200, which is a receiver, receives the broadcast stream and the additional stream, and combines the images 1002, 1003 and 1014 based on the video arrangement setting data included in the additional stream to restore the image 1001. In restoring the image 1001, the image 1014 is used after being rotated clockwise 90 degrees, as indicated by "rotational angle", so as to change its orientation. Note that the image 1014 becomes the image 1004 after the orientation of the image 1014 is changed.

Note that the video arrangement setting data may be expanded so as to indicate the magnification ratios in the horizontal and vertical directions for scaling each image.

Figure 11:
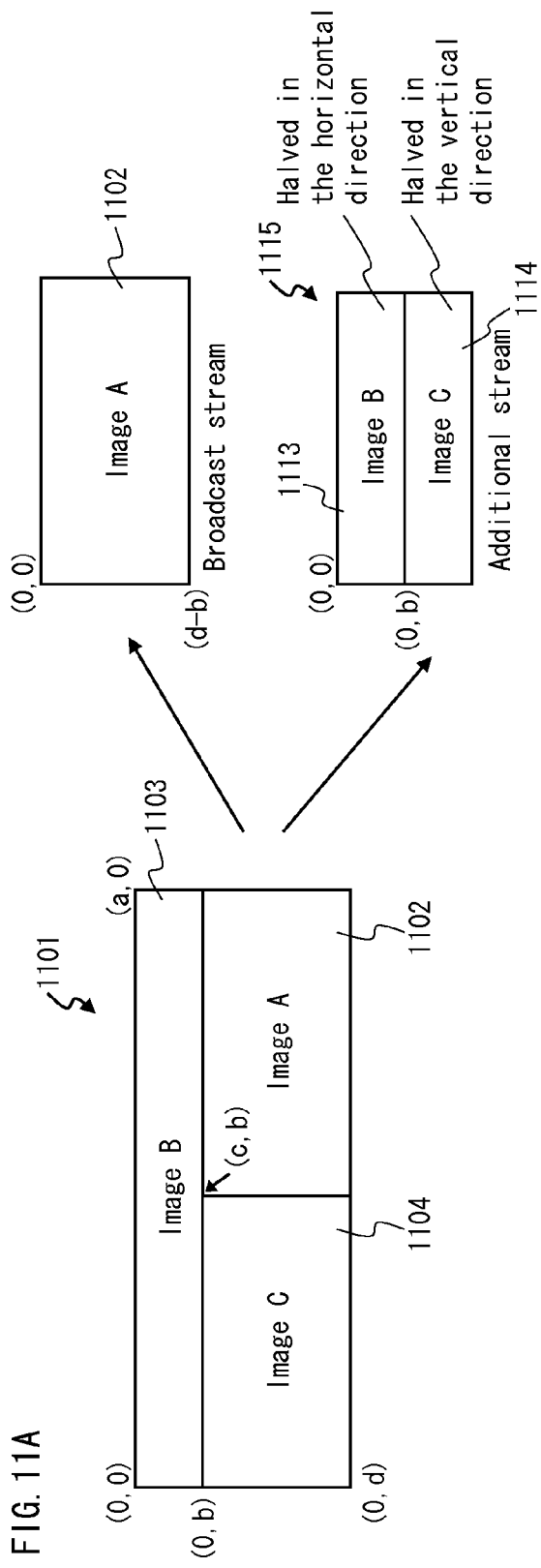
FIG. 11A shows separation and synthesis of images and FIG. 11B shows video arrangement setting data, both pertaining to Modification of the present invention.

FIGS. 11A and 11B are views for illustrating the case of performing scaling when combining a plurality of images with each other to create the additional image.

An image 1101 in FIG. 11A is one frame image among frame images constituting the original video.

In the present modification, the video separating unit 102 of the broadcast system 100 separates the image 1101 into three images 1102-1104. The image 1102 is a broadcast image.

Other frame images constituting the original video are separated in a similar manner to the case of the image 1101.

The broadcast stream creating unit 104 multiplexes the broadcast image (image 1102, etc.) as part of the broadcast stream, and transmits this broadcast stream via a broadcast wave.

Since the images 1103 and 1104 differ from each other in length in the horizontal and vertical directions, even if the images 1103 and 1104, which remain after the image 1102 is extracted from the image 1101, are combined with each other without change, the combined image does not have a rectangular shape, unlike the above-described modification (3).

Hence, after the image 1103 is halved in size in the horizontal direction (image 1113) and the image 1104 is halved in size in the vertical direction (image 1114), the images 1113 and 1114 are combined to create an additional image 1115.

The video arranging unit 103 creates video arrangement setting data indicating an arrangement of the images 1102-1104 in the image 1101.

The additional stream creating unit 105 multiplexes the image 1115 as part of the additional stream. The additional stream creating unit 105 multiplexes the video arrangement setting data as part of the additional stream.

The additional stream creating unit 105 transmits the additional stream by using network communications.

The following describes an example of the video arrangement setting data pertaining to the present modification.

FIG. 11B shows video arrangement setting data 1100 pertaining to the image 1101.

The video arrangement setting data 1100 is the same as the above-described video arrangement setting data 400 in structure, but items for indicating the magnification ratios in the horizontal and vertical directions are added for each image.

To be specific, the image 1113 (rectangle ID=1) is instructed to become twice as large in size in the horizontal direction. Also, the image 1114 (rectangle ID=2) is instructed to become twice as large in size in the vertical direction.

The playback apparatus 200, which is a receiver, receives the broadcast stream and the additional stream, and combines the images 1102, 1113 and 1114 based on the video arrangement setting data included in the additional stream to restore the image 1101. In restoring the image 1101, the image 1113 is used after becoming twice as large in size in the horizontal direction (image 903) and the image 1114 is used after becoming twice as large in size in the vertical direction (image 904).

(5) In the example of the above-described embodiment, a wide video is broadcasted by using the broadcast stream and the additional stream. However, it is not always necessary to transmit both the broadcast stream and the additional stream. For example, a wide video may not be transmitted in the whole period. There may be a period in which only the broadcast stream, i.e., the broadcast video, is transmitted.

In this case, during the period in which only the broadcast video is transmitted, the video arrangement setting data contains data pertaining to only the broadcast image.

During this period, the playback apparatus 200 also receives only a broadcast wave and plays back only the broadcast video. Since a screen in which a wide video can be displayed displays the broadcast video smaller than the wide video, a single-colored image such as a black image or a predetermined background image may be displayed in an area in the screen other than the area in which the broadcast video is displayed. Alternatively, the broadcast video may be enlarged and displayed on the screen.

(6) In the above embodiment, description has not been provided on the case where a macroblock overlaps the boundary of two separated images. For example, as shown in FIG. 12, when the image 1201 is separated into images 1202 and 1203 to create additional images, a macroblock overlaps the boundary 1210 of the images.

As such, when the macroblock overlaps the boundary (1210), the correlation among pixels in the macroblock decreases, and as a result, compression ratio decreases.

Figure 12:
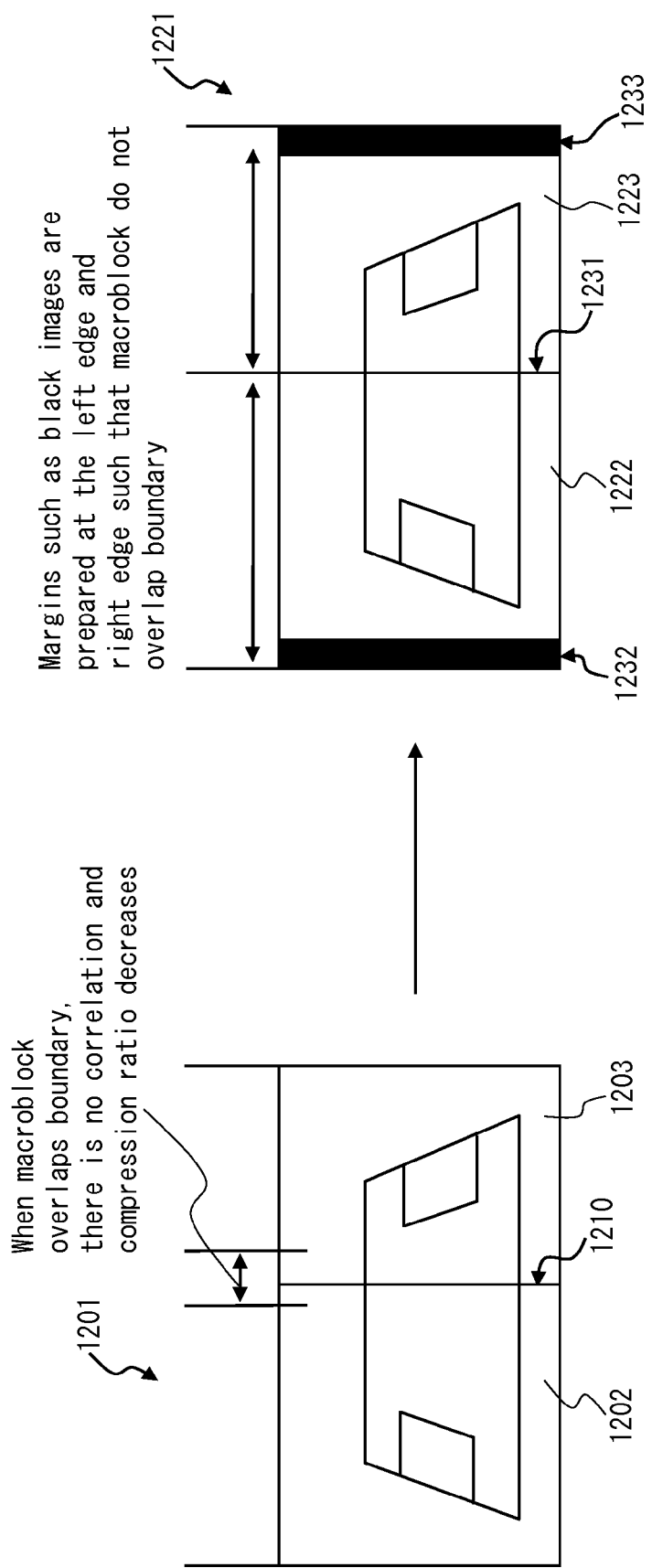
FIG. 12 is a view for illustrating the case where a macroblock overlaps the boundary of two images pertaining to Modification of the present invention.

In order to prevent this, as shown in FIG. 12 as an image 1221, a margin image 1232 and/or a margin image 1233 may be provided at the left edge of the image 1222 and/or at the right edge of the image 1232, such that the macroblock does not overlap the boundary (1231).

(7) In the above embodiment, the broadcast stream and the additional stream are created as independent streams and transmitted through separate paths. Alternatively, it is only necessary to transmit the broadcast video and the additional video.

For example, the broadcast stream and the additional stream may not be created as independent streams, but may be created as streams that are related to each other and may be transmitted through one path. As an example, it is conceivable that a wide video is compressed and encoded by using inter-view reference and transmitted through one path. One compressing and encoding method using inter-view reference is the revised MPEG-4 AVC/H.264 standard, referred to as Multiview Video Coding (MPEG-4 MVC).

Figure 13:
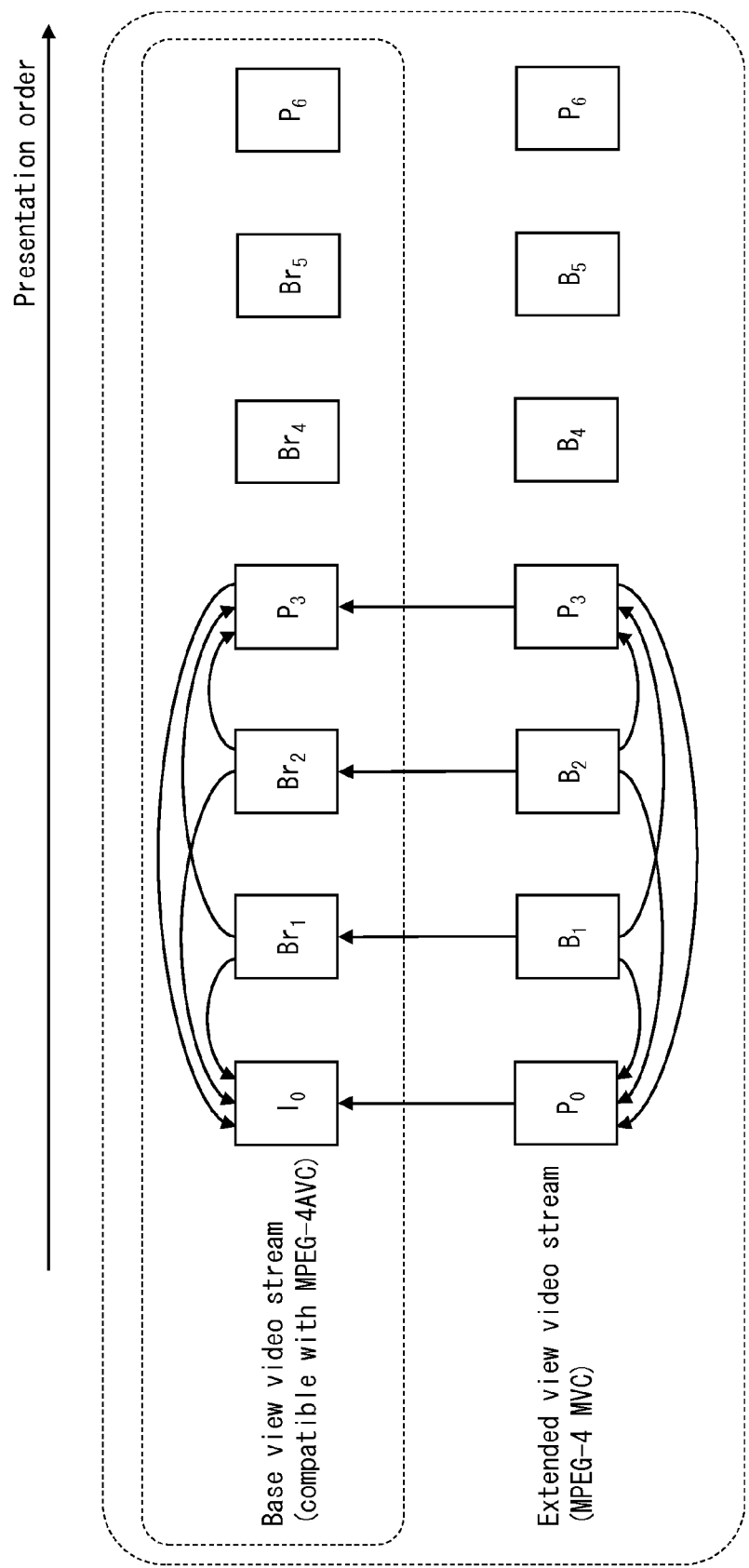
FIG. 13 is a view for illustrating encoding with MPEG-4 MVC.

FIG. 13 is a view for illustrating encoding with MPEG-4 MVC.

Streams according to MPEG-4 MVC standard are composed of "base view video stream" and "extended view video stream". The base view video stream is compatible with the conventional playback apparatus. The extended view video stream realizes playback of a video having a different angle when being processed with the base view video stream at the same time.

In the present modification, the base view video stream is created based on the broadcast stream, and the extended view video stream is created based on the additional stream.

As shown in FIG. 13, the base view video stream is created by compressing a frame (picture) group constituting a video with use of the inter-picture prediction coding that makes use of redundancy in the time-axis direction.

On the other hand, the extended view video stream is created by compressing a frame group constituting a video with use of the inter-picture prediction coding that makes use of the redundancy between perspectives, in addition to the inter-picture prediction coding that makes use of redundancy in the time-axis direction.

Pictures of the base view video stream are compressed with reference to pictures of the extended view video stream that have the same display time (PTS).

Here, the arrows in FIG. 13 show the reference relation.

For example, a P picture ($P_0$), which is the head of the extended view video stream, refers to an I picture ($I_0$) of the base view video stream, a B picture ($B_1$) of the extended view video stream refers to a Br picture ($Br_1$) of the base view video stream, and a P picture ($P_3$), which is the second P picture of the extended view video stream refers to a P picture ($P_3$) of the base view video stream.

Here, the base view video stream can be played back alone since this stream does not refer to the extended view video stream.

In contrast, the extended view video stream cannot be played back alone since this stream refers to the base view video stream.

In the case of a 3D video, the same object is seen from the left-eye and the right-eye perspectives, and accordingly there is a large correlation between the left-eye video and the right-eye video. Therefore, a data amount of the extended view video stream can be reduced more dramatically compared to the base view video stream by performing the inter-picture prediction coding between perspectives when multiplexing the left-eye video into the base view video stream and multiplexing the right-eye video into the extended view video stream.

Figure 14:
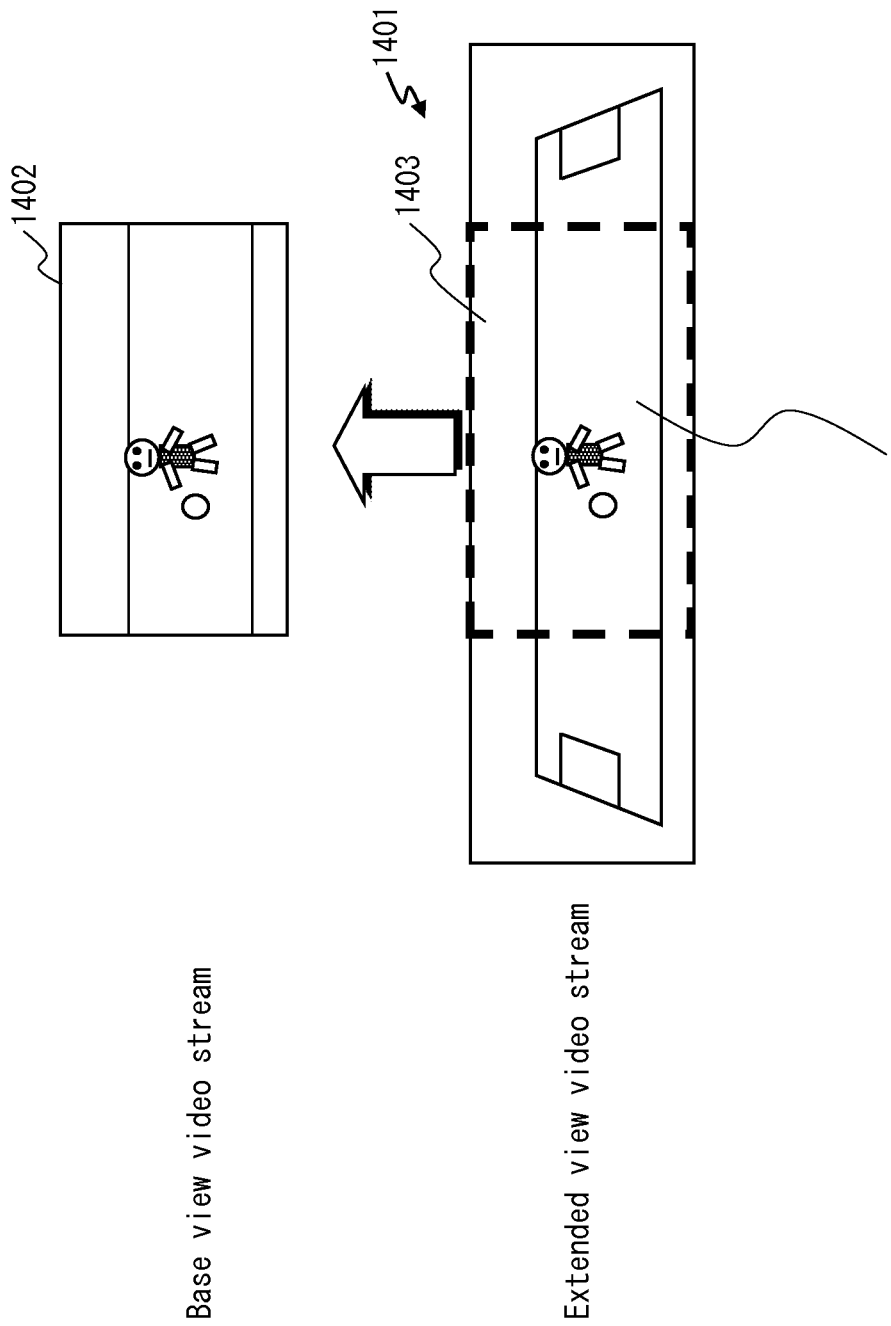
FIG. 14 is a view for illustrating the case where a broadcast video is encoded as a base view video stream and a super-wide video is encoded as an extended view video stream pertaining to Modification of the present invention.

Normally, a pair of videos (images) compressed by using inter-view reference have the same resolution. In the present modification, a stream in MPEG-4 MVC (hereinafter, referred to as "MPEG-4 MVC broadcast stream") is created by encoding a broadcast video 1402 and a super-wide video 1401 as a base view video stream and an extended view video stream, respectively, as shown in FIG. 14.

In this case, when the super-wide video is compressed and encoded as the extended view video stream, part corresponding to the broadcast video 1402 in the super-wide video 1401 (this part is referred to as "part 1403") refers to the base view video stream 1402. Therefore, when the part 1403 is compressed and encoded, a data amount thereof is extremely small.

The broadcast system 100 transmits an MPEG-4 MVC broadcast stream to the playback apparatus 200 by broadcasting.

The playback apparatus 200 receives the MPEG-4 MVC broadcast stream by broadcasting. The playback apparatus 200 then reproduces and plays back the super-wide video 1401 by decoding the extended view video stream while referring to the base view video stream in the MPEG-4 MVC broadcast stream.

Figure 15:
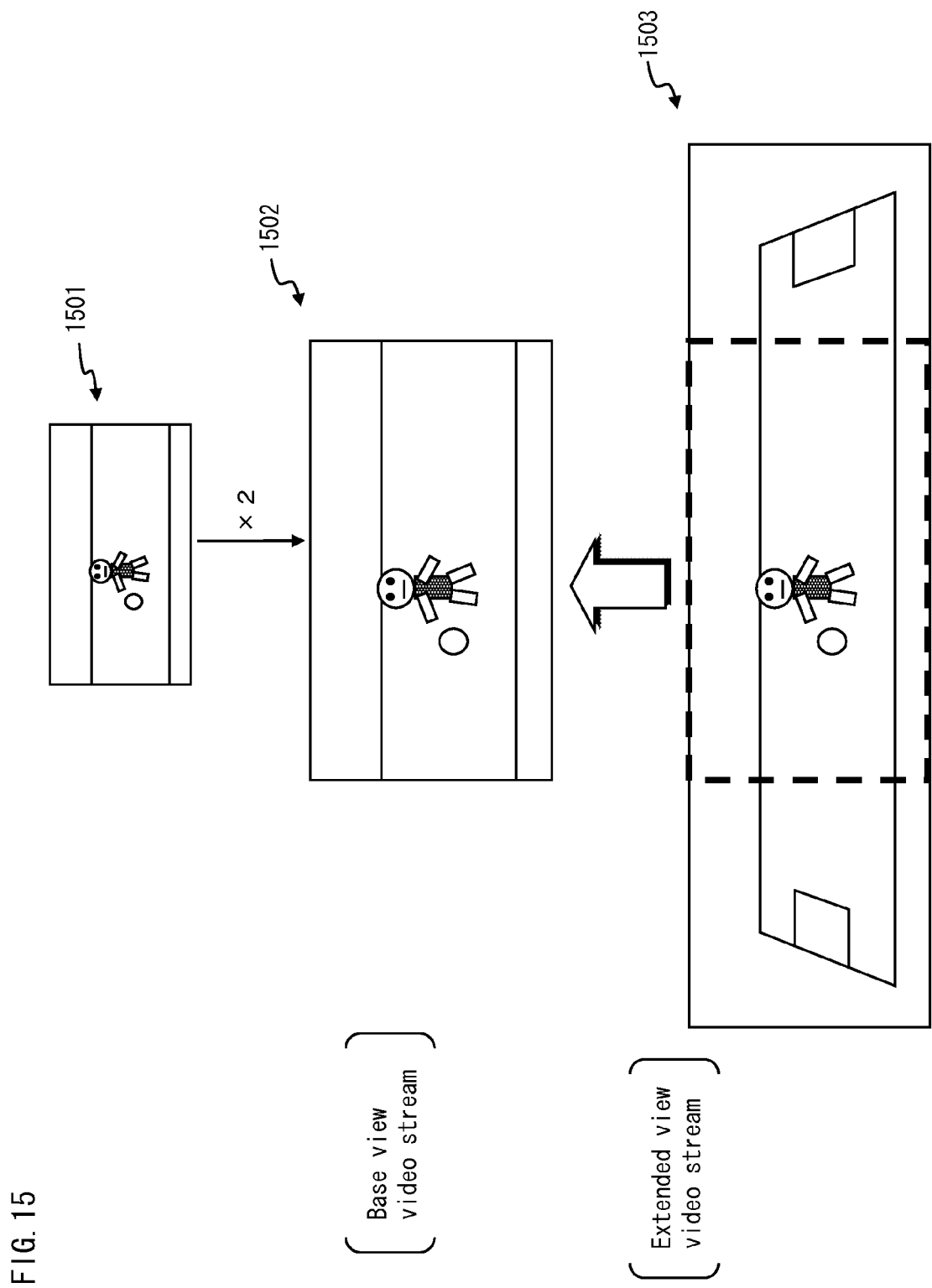
FIG. 15 is a view for illustrating the case where a super-wide video is compressed and encoded by referring to an enlarged broadcast video for inter-view reference pertaining to Modification of the present invention.

As shown in FIG. 15, as the broadcast video including a broadcast video 1501 is compressed and encoded as the base view video stream, the area of the broadcast video 1501 may be doubled to be an enlarged video 1502 and a super-wide video 1503 may be compressed and encoded to be an extended view video stream by performing inter-view reference on the enlarged video 1502.

As a result of the above, it is possible to select resolution other than the resolution of the broadcast images as resolution of a video transmitted from the extended view video stream.

(8) The broadcast content receiving system may realize a service of selecting a video that a user wants from a plurality of different viewpoint videos by using the broadcast stream and the additional stream (hereinafter, this service is referred to as "multi-angle service").

Figure 16:
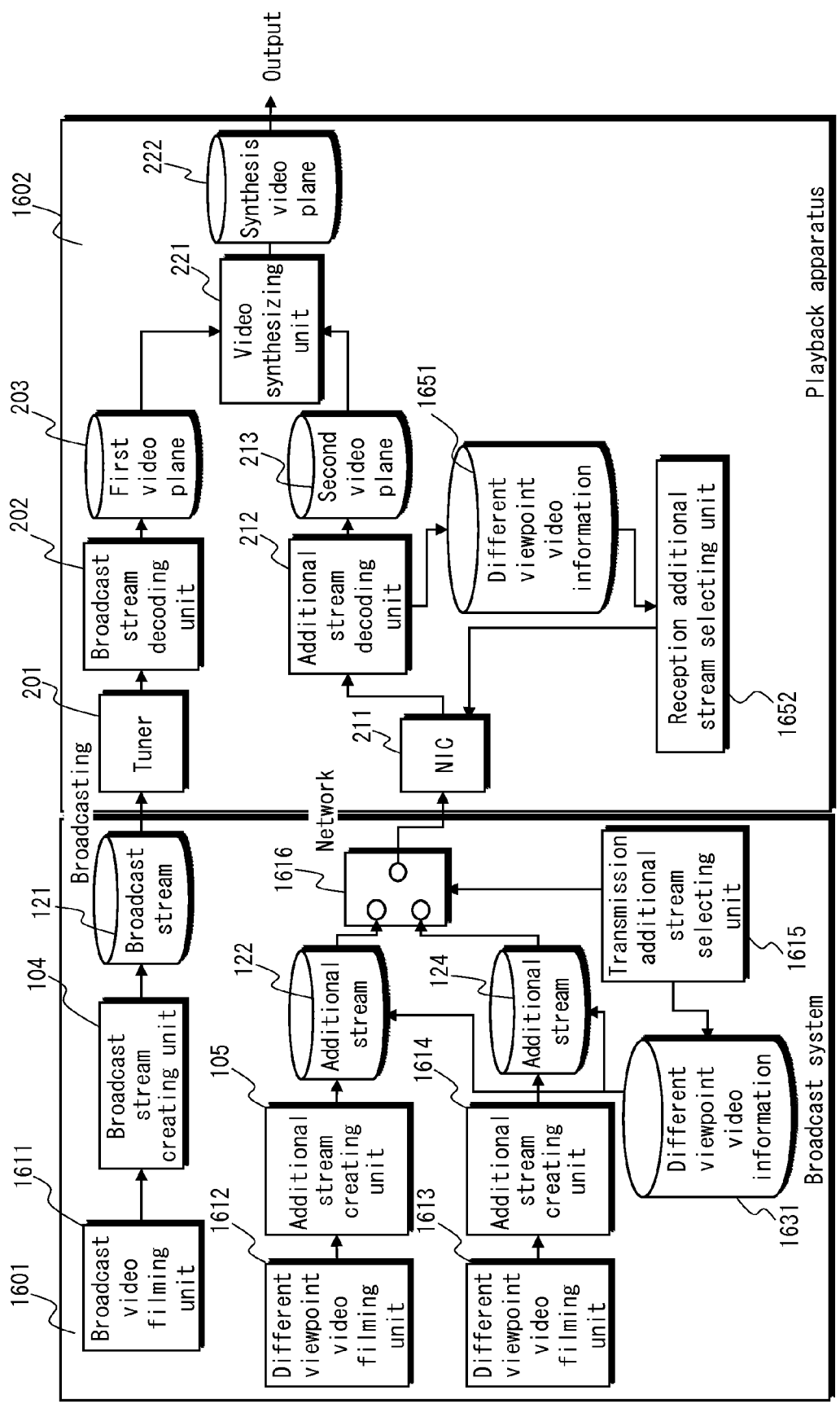
FIG. 16 is a block diagram showing the structure of a system pertaining to Modification of the present invention.

FIG. 16 is a block diagram showing the structure of a system pertaining to the present modification.

The system pertaining to the present modification includes a broadcast system 1601 and a playback apparatus 1602. The broadcast stream is transmitted from the broadcast system 1601 to the playback apparatus 1602 by broadcasting. The additional stream is transmitted from the broadcast system 1601 to the playback apparatus 1602 via a network.

(Broadcast System 1601)

As shown in FIG. 16, the broadcast system 1601 includes a broadcast video filming unit 1611, a broadcast stream creating unit 104, a different viewpoint video filming unit 1612, an additional stream creating unit 105, a different viewpoint video filming unit 1613, an additional stream creating unit 1614, a transmission additional stream selecting unit 1615 and a switch 1616.

The broadcast video filming unit 1611 includes a video camera, and outputs a filmed video (broadcast video) to the broadcast stream creating unit 104.

The broadcast stream creating unit 104 is the same as that described with reference to FIG. 1.

The different viewpoint broadcast video filming unit 1612 includes a video camera, and outputs a filmed video (different viewpoint video 1) to the broadcast stream creating unit 104.

The additional stream creating unit 105 is the same in principle as the unit described with reference to FIG. 1, and creates an additional stream 122 by compressing and encoding the different viewpoint video 1. In addition to this, the additional stream creating unit 105 stores different viewpoint video information 1631 in the additional stream instead of the video arrangement setting data 123.

The different viewpoint broadcast video filming unit 1613 includes a video camera, and outputs a filmed video (different viewpoint video 2) to the broadcast stream creating unit 1614.

The additional stream creating unit 1614 is the same as the above described additional stream creating unit 105, and creates an additional stream 124 by compressing and encoding the different viewpoint video 2. In addition, the additional stream creating unit 105 stores different viewpoint video information 1631 in the additional stream.

The transmission additional stream selecting unit 1615 transmits, to the playback apparatus 1602, one of the additional stream 122 and the additional stream 124, which is requested by the playback apparatus 1602.

Such a request from the playback apparatus 1602 is transmitted in a URL format, for example. The additional stream 122 and the additional stream 124 are assigned different URLs in advance, and the playback apparatus 1602 transmits an access request to the URL corresponding to an additional stream requested to be transmitted.

The transmission additional stream selecting unit 1615 receives the access request, and switches the switch 1616 so as to output an additional stream corresponding to the URL to which the access request was transmitted by the playback apparatus 1602. The transmission additional stream selecting unit 1615 transmits, to the playback apparatus 1602, the additional stream corresponding to the URL to which the access request was transmitted by the playback apparatus 1602.

Additionally, the transmission additional stream selecting unit 1615 creates different viewpoint video information.

FIG. 17B shows an example of different viewpoint video information (different viewpoint video information 1631 and 1651).

The different viewpoint video information is a table storing sets each composed of "angle ID", "stream type" and "content". Each angle ID is a unique ID for identifying a viewpoint (angle). Each stream type indicates a method for identifying a type of a stream and accessing the stream. Each content indicates a content of a video viewed from a certain angle.

The switch 1616 is for switching between the additional stream 122 and the additional stream 124 based on control by the transmission additional stream selecting unit 1615.

(Playback Apparatus 1602)

The playback apparatus 1602 includes a tuner 201, a broadcast stream decoding unit 202, a first video plane 203, an NIC 211, an additional stream decoding unit 212, a second video plane 213, a video synthesizing unit 221, a synthesis video plane 222 and a reception additional stream selecting unit 1652, as shown in FIG. 16.

The tuner 201, the broadcast stream decoding unit 202, the first video plane 203, the NIC 211, the second video plane 213, the video synthesizing unit 221 and the synthesis video plane 222 are the same as those described with reference to FIG. 2.

The additional stream decoding unit 212 is fundamentally the same as that described with reference to FIG. 2, but differs in extracting different viewpoint video information 1651 included in the additional stream and transmitting the extracted information to the reception additional stream selecting unit 1652. Note that the different viewpoint video information 1651 is the same as the different viewpoint video information 1631.

The reception additional stream selecting unit 1652 receives the different viewpoint video information from the additional stream decoding unit 212 and causes a user to select one of a plurality of pieces of different viewpoint videos by displaying a menu, for example. The reception additional stream selecting unit 1652 then requests the broadcast system 1601, via a network, to transmit the additional stream storing the different viewpoint video selected by the user with a remote controller, for example. In response to this request, the NIC 211 receives the additional stream storing the selected different viewpoint video from the broadcast system 1601.

As an example of the above-described displayed menu, the reception additional stream selecting unit 1652 displays a menu 1701 shown in FIG. 17A. The menu 1701 briefly shows the contents of the different viewpoint videos listed in the different viewpoint video information 1651.

A user selects one of the listed "contents" displayed in the menu with a remote controller, etc.

The reception additional stream selecting unit 1652 refers to the different viewpoint video information 1651, and reads "angle ID" corresponding to the selected content, and "stream type" corresponding to the angle ID. The reception additional stream selecting unit 1652 then requests to the broadcast system 1601 to transmit a stream pertaining to the read stream type by using URL described in the stream type.

As described above, it is possible to select a video that a user wants from among the plurality of additional streams with different viewpoints, and to play back the selected video.

Note that the different viewpoint video information 1631 (1651) may be stored not in the additional stream but in the broadcast stream, or may be independent of the streams, as a metadata file.

Note that the different viewpoint video information 1631 (1651) may separately include information for acquiring a video and information for acquiring audio (PID, for example), as shown in FIG. 18, for example.

In the example of FIG. 18, regarding a stream with the angle ID=1, a video is stored in an additional stream provided by communications as a packet with PID=A, and audio is stored in a broadcast stream provided via a broadcast wave as a packet with PID=Z.

Regarding a stream with the angle ID=2, a video is stored in an additional stream provided by communications as a packet with PID=B, and audio is stored in an additional stream provided by communications as a packet with PID=Y.

Thus, according to the modification, it is possible to store information for acquiring additional streams that are in various modes. This allows for an increase in the degree of freedom when creating additional streams.

Note that in the above example, streams are identified by using PID. Alternatively, it is only necessary to identify streams.

For example, streams may be identified by using tags such as reference PID of hierarchical transmission descriptor.

(9) As a user interface (UI) that is used when one of the plurality of different viewpoint videos is selected in the above-described modification (8), an index video displaying a plurality of different viewpoint videos that have been downsized (hereinafter, such videos are referred to as "different viewpoint downsized videos") may be displayed in one screen, and a user may select one different viewpoint video he/she likes from among the plurality of different viewpoint videos.

Here, each of the plurality of different viewpoint videos is identified by an angle ID.

In order to realize such a configuration, an additional stream storing "index video" and "correspondence information between display areas and angle IDs" is used, for example. FIG. 19A shows a video 1901 as an example of the index video.

"Correspondence information between display areas and angle IDs" indicates correspondence between display areas of the index video (video 1901, for example) in which different viewpoint downsized videos are displayed and angle IDs of the different viewpoint downsized videos that are being displayed.

An image 1902 in FIG. 19A is an image showing the contents indicated by the correspondence information. To be specific, the image 1902 visually shows correspondence of four different viewpoint downsized videos displayed in the video 1901 with angle IDs (1902). To be specific, according to the image 1902 in FIG. 19A, an angle ID of the different viewpoint downsized video displayed in the upper left area is 0, an angle ID of the different viewpoint downsized video displayed in the upper right area is 1, an angle ID of the different viewpoint downsized video displayed in the lower left area is 2, and an angle ID of the different viewpoint downsized video displayed in the lower right area is 3.

Further, as shown in FIG. 19B, information on the index video (angle ID=4) is added to the different viewpoint video information.

The playback apparatus 1602 first receives the additional stream including the index video, decodes the stream, and displays the decoded stream on the screen. Further, the playback apparatus 1602 causes a user to select one of the different viewpoint downsized videos (videos 1911-1914 in FIG. 19A, for example) included in the index video.

The playback apparatus 1602 displays the different viewpoint video corresponding to the different viewpoint downsized video selected by the user.

For example, when a user selects the video 1912 (angle ID=1) from the video 1901, the playback apparatus 1602 displays the video 1921 whose angle ID=1 on the screen.

Note that as an UI used for causing a user to select one of the four different viewpoint downsized videos, a menu image formed by making the image 1902 semi-transparent except the areas in which characters are displayed, may be superimposed on the video 1901 and displayed, such that a user may be able to select one of the angle IDs 0-3 by using a remote controller, etc.

Further, when the playback apparatus 1602 is an apparatus having a touch screen such as a tablet terminal, an index video for selecting an angle may be displayed on the touch screen to cause a user to select, by touch, any one of a plurality of different viewpoint downsized videos that are being displayed. In this case, the tablet terminal refers to the stream type corresponding to the angle ID identifying the selected different viewpoint downsized video in the different viewpoint video information, receives the additional stream indicated by the stream type from the broadcast system by communications, and plays back the additional stream. Further, the tablet terminal may have the following structure: another playback apparatus receives and decodes the additional stream so as to convert a format of the additional stream to be displayable by the tablet terminal; the said another playback apparatus transmits the additional stream in the converted format to the tablet terminal by using a wireless LAN; and the tablet terminal receives and displays the additional stream.

(10) In the above-described modification, it is preferred that switching to the different viewpoint video is seamless without interruption. The following describes three examples of the structures for seamlessly switching videos with reference to FIGS. 20A-20C.

FIGS. 20A-20C show examples of the structures of the additional stream decoding unit in detail.

Example 1

FIG. 20A

FIG. 20A shows the structure that is the same as a decoder model of a video stream in an MPEG-2 system.

A PID filter refers to PID of a TS packet, filters the TS packet, and outputs the filtered TS packet to a transport buffer (TB) 2004.

The TS packet input to the TB 2004 is transmitted to an main buffer (MB) 2005 by a certain rate after a TS header is removed from the TS packet. Here, the certain rate indicates a data amount that has to be taken off from the TB 2004 per unit time.

By transmitting data from the TB 2004 to the MB 2005, the MB 2005 stores therein packetized video ES data (video PES data).

When an elementary buffer (EB) 2006 has free area, the video PES data is transmitted from the MB 2005 to the EB 2006 with a certain timing.

Here, as the data moves from the TB 2004 to the MB 2005 and the EB 2006, header information of the system stream such as the TS packet header and the PES header are removed, and the EB 2006 stores therein only an elementary stream of the video.

The decoder (Dec) 2007 has the function of decoding the elementary stream of the video, and to the Dec 2007, data is transmitted from the EB 2006 at the timing of Decoding Time-Stamp (DTS).

Output from the Dec 2007 is stored in the decoding picture buffer (DPB) 2008, and is output to the display plane (Plane) 2009 at the timing of the PTS.

Here, as shown in FIG. 20A, when there is one decoder of the video stream, switching between an additional stream #1

(hereinafter, referred to as TS1) and an additional stream #2 (hereinafter, TS2) has to be performed by switching inputs to the PID filter 2003.

Here, in order to seamlessly switch angles, it is necessary to store a position of a TS packet in the TS1 at the timing of switching the angles (such a position is indicated by time information such as PTS, for example). After that, when a TS packet of the TS2, whose position (PTS) is the same as the position of the TS packet stored for the above-described TS 1, is able to be input to the video decoder, the PID of a packet to be input to the video decoder is switched from the TS 1 to the TS2.

Example 2

FIG. 20B

FIG. 2B shows the structure in which there are a plurality of decoder models of the video stream.

With this structure, when a stream from which images are decoded and stored in the Plane 2009 is switched from the TS1 to the TS2, the decoding of the TS2 starts in parallel with the decoding of the TS1 after the switch from the TS1 to the TS2 is determined. After the display of the TS2 is prepared (i.e., pictures to be displayed are decoded), the input to the Plane 2009 is switched from DPB 2008 to DPB 2026 at the timing of the closest PTS. This seamlessly switches pictures to be stored in the Plane 2009 from pictures created from the TS1 to pictures created from the TS2.

Example 3

FIG. 20C

FIG. 20C shows the structure in which there are a plurality of buffers and there is one core part (Dec 2042 and onward) in the decoder model of the video stream.

With this structure, if the TS1 is switched to the TS2, the decoding of the TS2 starts at a timing when the head of the GOP is detected. When the EB 2024 stores enough data, the input to the Dec 2024 is switched from the EB 2006 of the TS1 to the EB 2024 of the TS2 at the timing of the DTS of the picture at the head of the GOP.

Here, since the timing of the DTS does not coincide with the timing of the PTS, after switch is performed according to the DTS of the TS2 until the timing of the PTS comes, a picture of the DPB of the TS1 is displayed. That is, the sw1 (2041) switches at the timing of the DTS, and the sw2 (2043) switches at the timing of the PTS. This realizes a seamless switch.

Note that if a picture corresponding to the subsequent PTS is not stored in the DPB 2008 of the TS1 at the timing when the sw1 (2041) switches the input to the Dec 2042 to the EB 2024 of the TS2, a picture stored at the timing of the immediately prior PTS in the DPB 2008 of the TS1 may be displayed.

(11) In the above-described embodiment, the wide video is displayed on a wide-screen television. Alternatively, it is only necessary to display a wide video.

For example, a wide video may be separated into two, the right half of the image may be displayed on one television, and the left half of the image may be displayed on another television.

Figure 21:
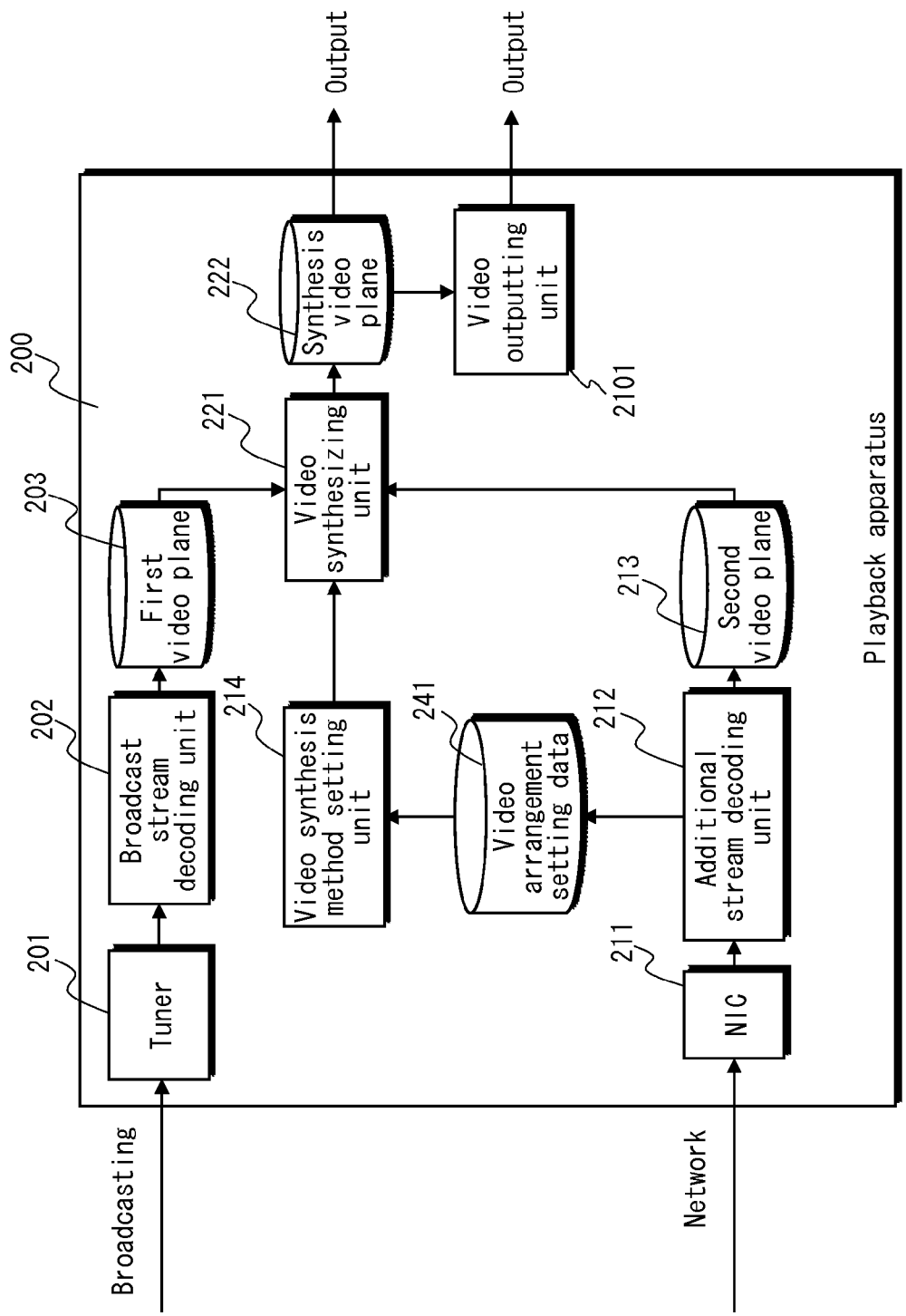
FIG. 21 is a block diagram showing the structure of a playback apparatus pertaining to Modification of the present invention.

In this case, the playback apparatus 200 includes a video output unit 2101 after the synthesis video plane 222, as shown in FIG. 21, for example.

The video output unit 2101 separates a wide video so as to display the separated videos with use of the above-described two televisions. The video output unit 2101 outputs the right half of the video as output 1, and outputs the left half of the video as output 2.

The video output unit 2101 is assumed to acquire in advance information on televisions for separating the wide video into two and displaying the separated videos.

Further, the video arranging unit 103 of the broadcast system 100 may separate a wide video, store, in the video arrangement setting data 123, display instruction information for causing the playback apparatus 200 to display the separated videos on a plurality of screens, and transmit the video arrangement setting data 123 to the playback apparatus 200.

The display instruction information indicates that the right half of the wide video restored by the playback apparatus 200 is displayed on the left screen viewed from a user, and the right half of the wide video is displayed on the right screen viewed from the user, for example.

When the wide video is restored, the playback apparatus 200 refers to the video arrangement setting data, displays the right half of the wide video on the left screen viewed from the user by outputting the right half of the video as the output 1, and displays the right half of the wide video on the right screen viewed from the user by outputting the right half of the video as the output 2.

(12) In the above embodiment, both the broadcast stream and the additional stream are received and played back by the playback apparatus 200. But reception processing and playback processing may be performed by a plurality of apparatuses.

Figure 22:
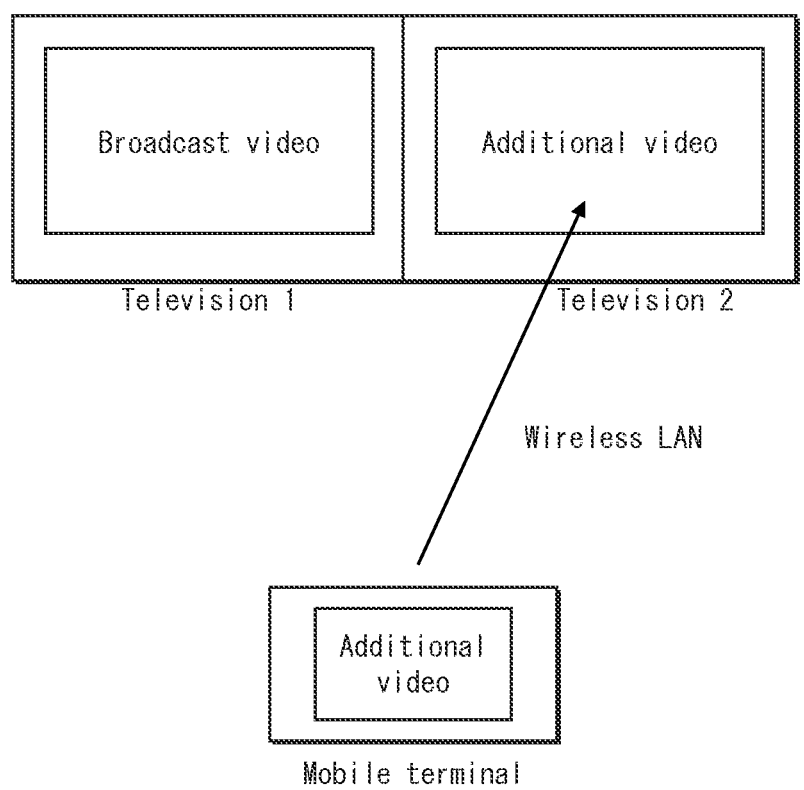
FIG. 22 is a view for illustrating the case where a plurality of apparatuses share processing of receiving and playing back a broadcast video and an additional video.

For example, the broadcast stream is received by a television 1 (corresponding to the playback apparatus 200) via a broadcast wave and the broadcast video is played back by the television 1, as shown in FIG. 22. The additional stream is received by a mobile terminal via a network, and the additional video is played back by the mobile terminal. When playing back the additional video, the mobile terminal transmits the additional video to a television 2 by a wireless Local Area Network (LAN), and the television 2 displays the additional video.

In this case, the video arrangement setting data indicates which television displays the additional video, and this information is stored in the additional stream. The additional stream is transmitted to the mobile terminal from the broadcast system 100.

The above-described structure allows the televisions 1 and 2 to display the broadcast video and the additional video even when the televisions 1 and 2 do not have the function of communicating with the broadcast system 100 via a network, or even when the televisions 1 and 2 are unable to communicate with the broadcast system 100 via a network.

As described above, when the videos of the broadcast stream and the additional stream are displayed on a plurality of televisions, the following methods may be used so as to synchronize the videos: (a) the television 1 and the mobile terminal access a time server to acquire the current time for time synchronization; (b) information for synchronization is added to a signal of a remote controller (unillustrated), and the television 1 and the mobile terminal are caused to acquire the information for time synchronization; (c) the television 1 and the mobile terminal each decode a broadcast wave of the same channel, and videos are synchronized by using PCR; (d) in terms of simultaneous broadcast (normal broadcast wave and one segment broadcast wave) other than the same channel, the television 1 receives and decodes a broadcast wave and the mobile terminal receives and decodes one segment broadcast so as to acquire PCR, for example, and videos are synchronized by using PCR; and (e) when the mobile terminal has the camera function, the mobile terminal decodes one segment broadcast while the mobile terminal is filming a video displayed on the television 1, and the filmed video and the video decoded from one segment broadcast are compared to detect a time lag, and the time lag is corrected for synchronization.

(13) In the above embodiment, the additional stream is transmitted from the broadcast system 100 to the playback apparatus 200 via a network. Alternatively, it is only necessary that the additional stream is transmitted.

For example, the additional stream may be transmitted from the broadcast system 100 to the playback apparatus 200 via a broadcast wave.

Figure 33:
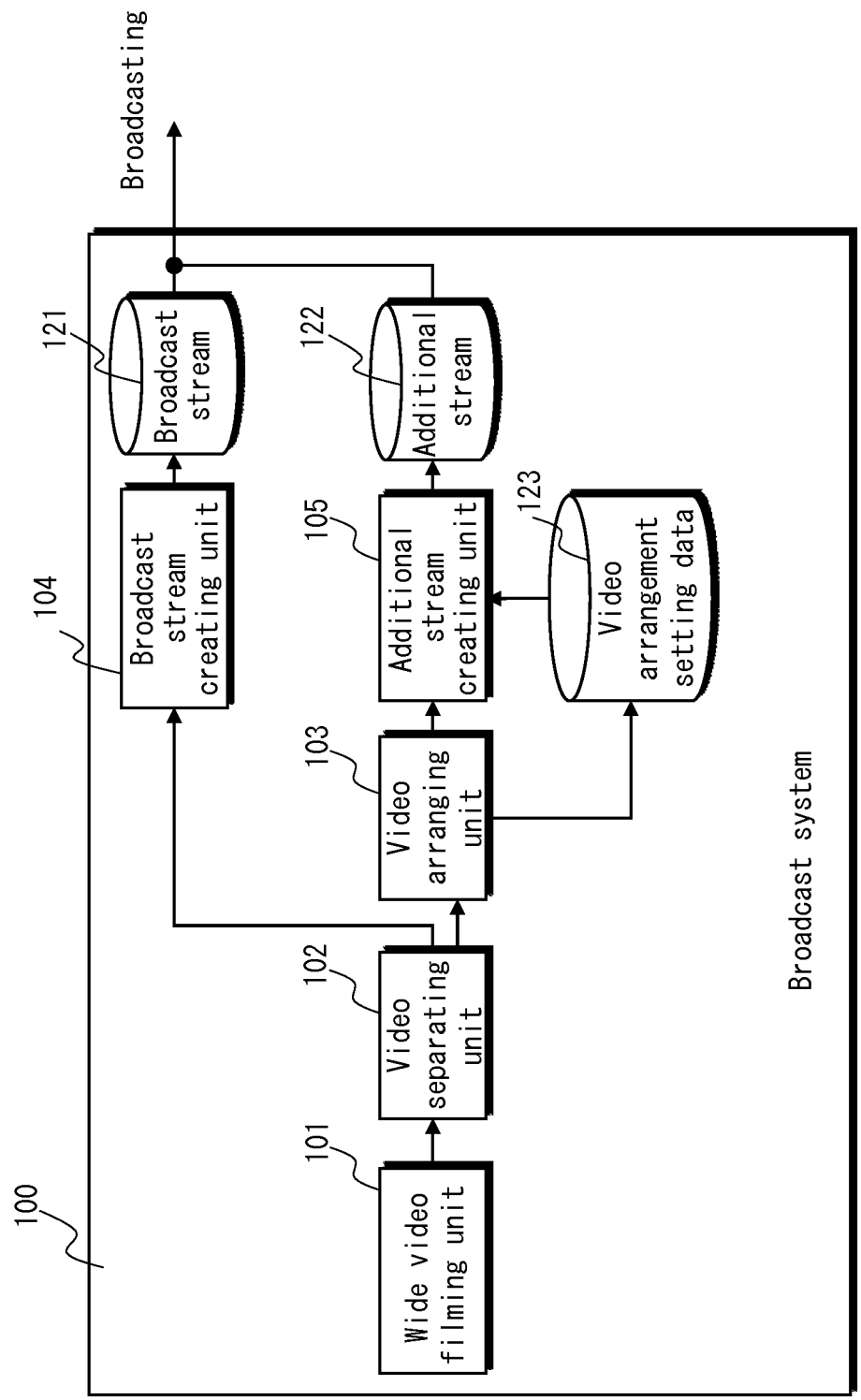
FIG. 33 is a block diagram showing the structure of a broadcast system pertaining to Modification of the present invention.

FIG. 33 is a block diagram showing the structure of the broadcast system 100 pertaining to the present modification.

The broadcast system 100 in FIG. 33 differs from the broadcast system 100 described with reference to FIG. 1 in the following point.

That is, in the broadcast system in FIG. 33, the additional stream creating unit 105 creates an additional video as the additional stream 122 by converting the format of the additional video into a format transmittable not by communications but via a broadcast wave. The unillustrated transmitting unit transmits a stream created by multiplexing the broadcast stream 121 created by the broadcast stream creating unit 104 and the additional stream 122 created by the additional stream creating unit 105, via a broadcast wave.

Figure 34:
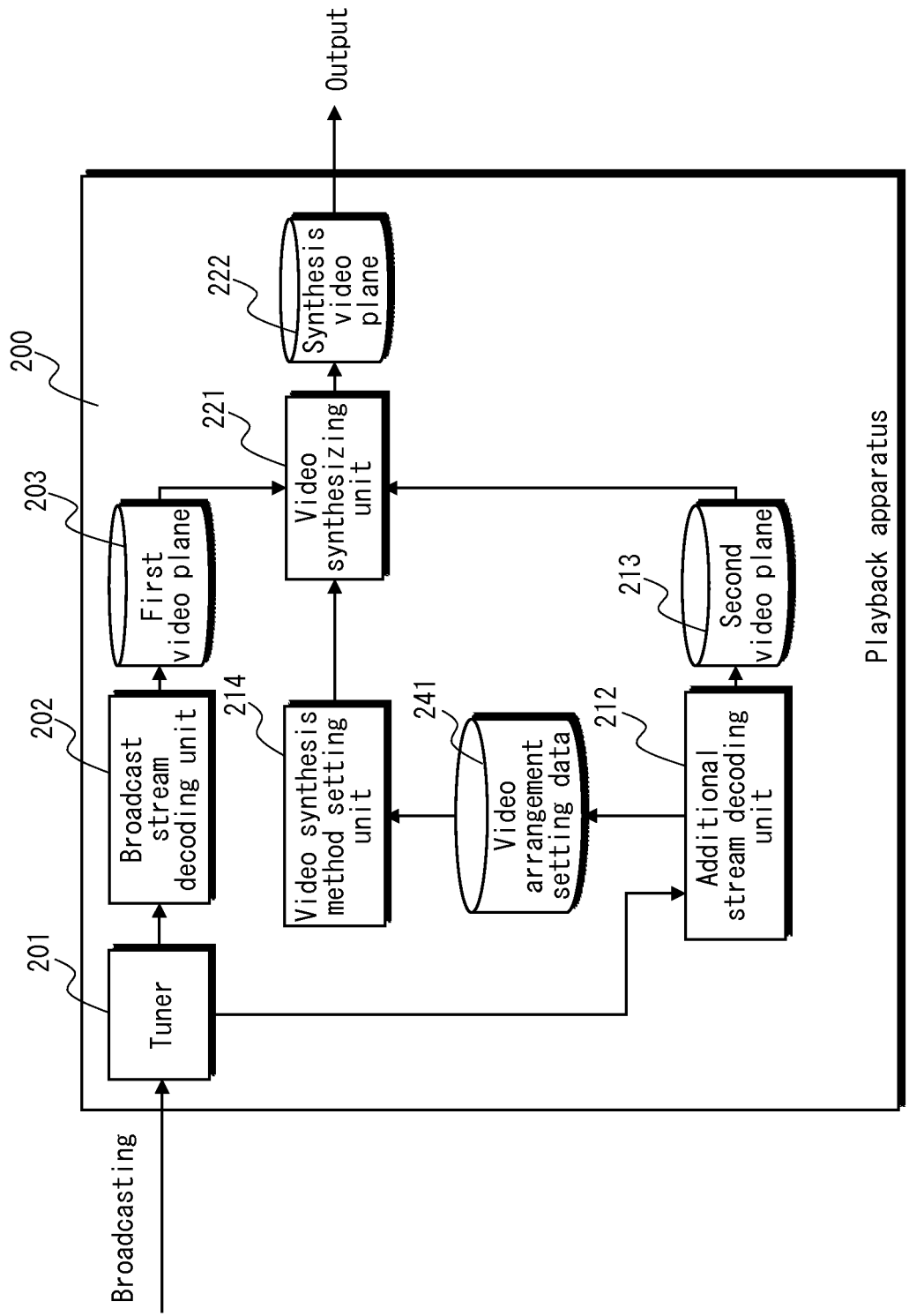
FIG. 34 is a block diagram showing the structure of a playback apparatus pertaining to Modification of the present invention.

FIG. 34 is a block diagram showing the structure of the playback system 200 pertaining to the present modification.

The playback apparatus 200 in FIG. 34 differs from the playback apparatus 200 described with reference to FIG. 2 in the following point.

That is, the playback apparatus 200 in FIG. 34 does not include the NIC 211, and the tuner 201 extracts, from the received broadcast wave, a TS packet pertaining to the broadcast stream 121 and a TS packet pertaining to the additional stream 122. The tuner 201 outputs the TS packet pertaining to the broadcast stream 121 to the broadcast stream decoding unit 202 and outputs the TS packet pertaining to the additional stream 122 to the additional stream decoding unit 212.

As described above, the additional stream can be transmitted from the broadcast system 100 to the playback apparatus 200 via a broadcast wave.

(14) In the system described in the above modification (8), the additional stream may be transmitted from the broadcast system to the playback apparatus via a broadcast wave in the same manner as the above modification (13).

Figure 35:
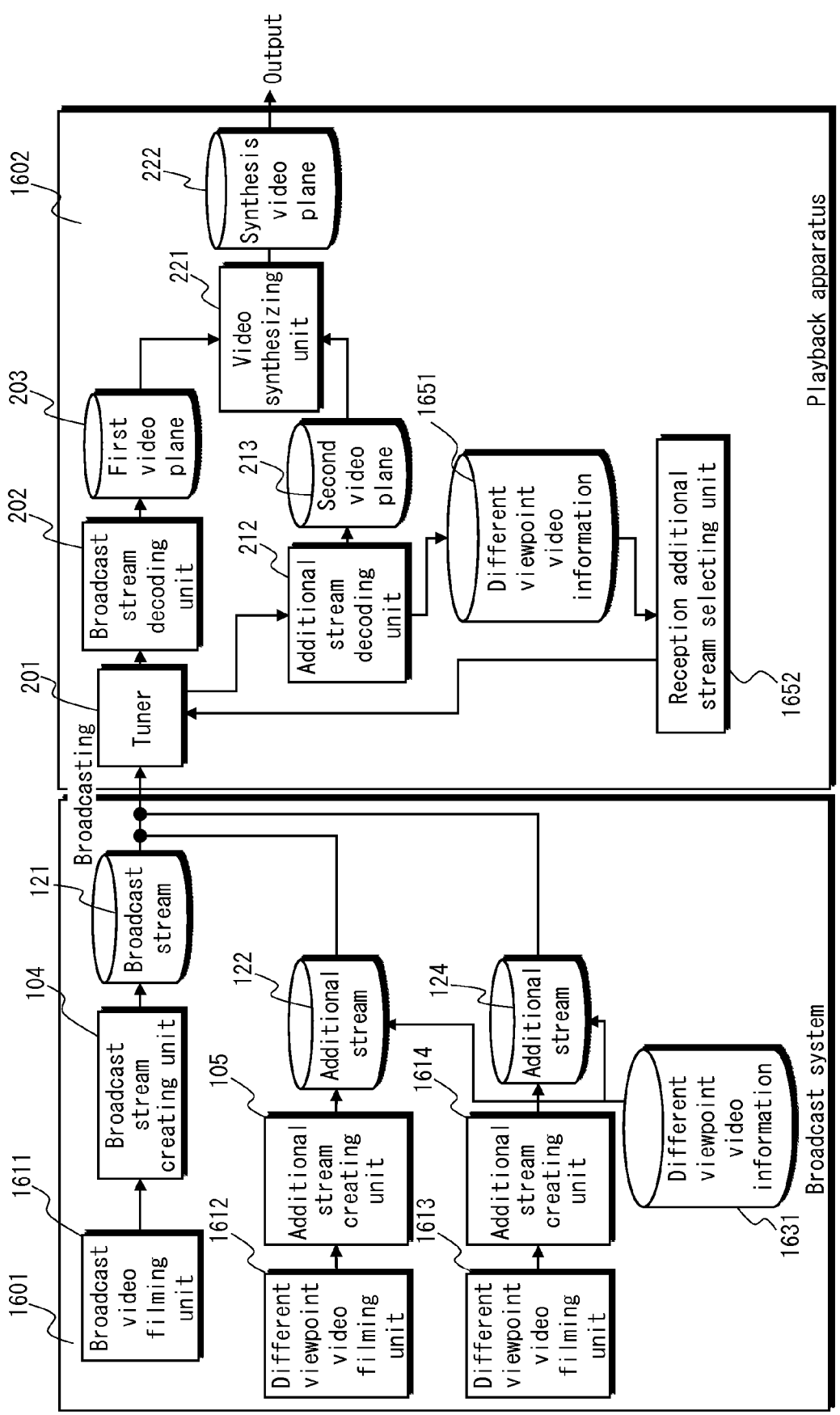
FIG. 35 is a block diagram showing the structure of a system pertaining to Modification of the present invention.

FIG. 35 is a block diagram showing the structure of a system pertaining to the present modification.

The system in FIG. 35 differs from the system described with reference to FIG. 16 in the following point.

In the system in FIG. 35, the additional stream creating unit 105 and the additional stream creating unit 1614 create different viewpoint videos as the additional streams (122 and 124) by converting the format of the different viewpoint videos into a format transmittable not by communications but via a broadcast wave. The unillustrated transmitting unit transmits a stream created by multiplexing the broadcast stream 121, the additional stream 122 and the additional stream 124, via a broadcast wave.

On the other hand, the playback apparatus 1602 in FIG. 35 does not include the NIC 211, and the tuner 201 outputs a TS packet pertaining to the broadcast stream 121 from the received broadcast wave to the broadcast stream decoding unit 202.

Further, the reception additional stream selecting unit 1652 requests the tuner 201 to extract an additional stream storing a different viewpoint video selected by a user with a remote controller, etc.

The tuner 201 extracts a TS packet pertaining to the requested additional stream (122 or 124). The tuner 201 then outputs the TS packet pertaining to the additional stream to the additional stream decoding unit 212.

As described above, the additional stream can be transmitted from the broadcast system 100 to the playback apparatus 200 via a broadcast wave.

(15) In the playback apparatus 200 described in the above modification (11), the additional stream may be transmitted from the broadcast system 100 to the playback apparatus 200 via a broadcast wave in the same manner as the above modification (13).

Figure 36:
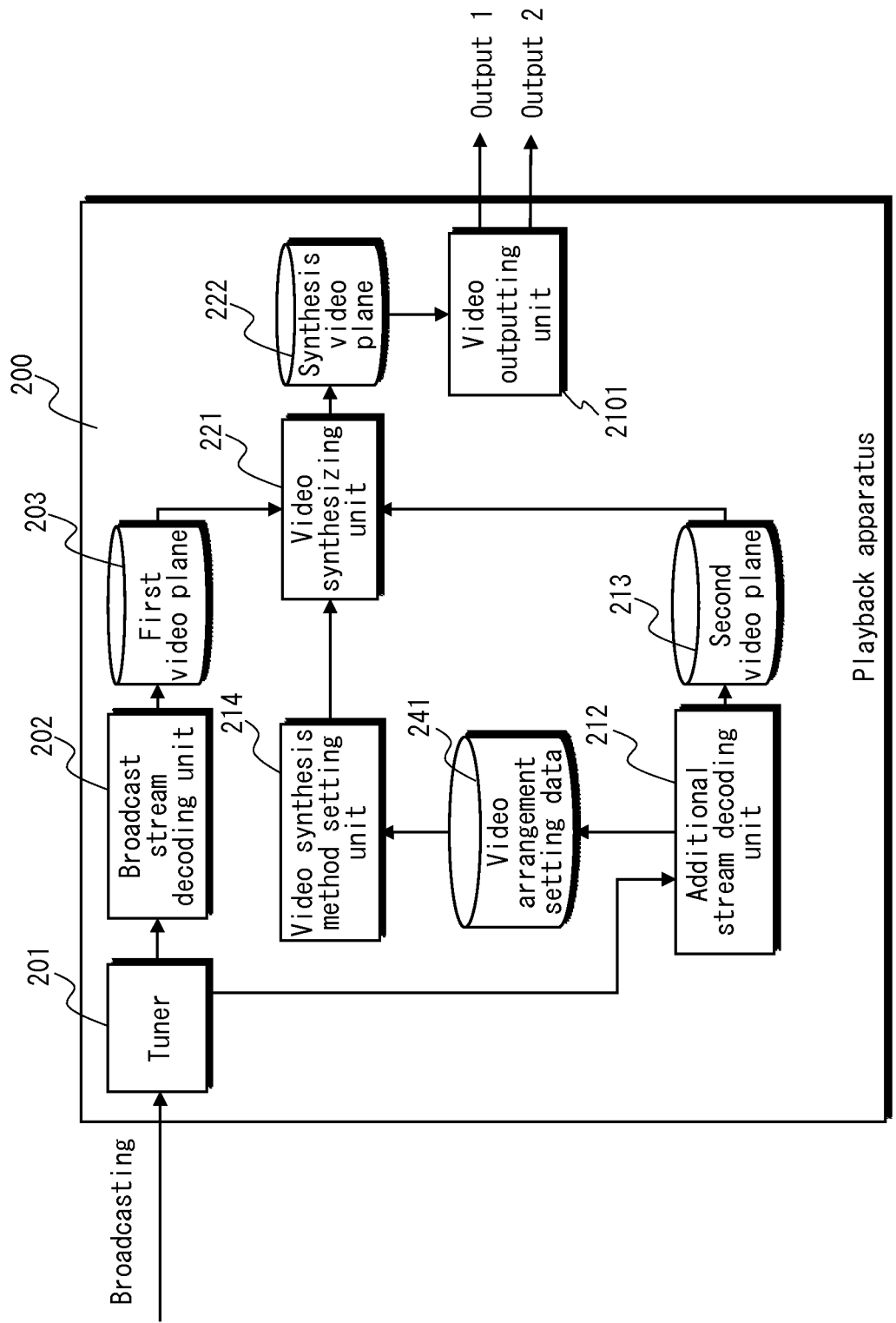
FIG. 36 is a block diagram showing the structure of a playback apparatus pertaining to Modification of the present invention.

FIG. 36 is a block diagram showing the structure of the playback system 200 pertaining to the present modification.

In this case, the playback apparatus 200 in FIG. 36 does not include the NIC 211, and the tuner 201 extracts, from the received broadcast wave, a TS packet pertaining to the broadcast stream 121 and a TS packet pertaining to the additional stream 122 in the same manner as the above modification (13). The tuner 201 outputs the TS packet pertaining to the broadcast stream 121 to the broadcast stream decoding unit 202 and outputs the TS packet pertaining to the additional stream 122 to the additional stream decoding unit 212.

As described above, the additional stream can be transmitted from the broadcast system 100 to the playback apparatus 200 via a broadcast wave.

(16) In the above modifications (13)-(15), the broadcast stream and the additional stream are transmitted from the broadcast system to the playback apparatus via one broadcast wave, but the streams may be transmitted via a plurality of broadcast waves.

For example, the broadcast stream and the additional stream may be transmitted via different broadcast waves.

Figure 37:
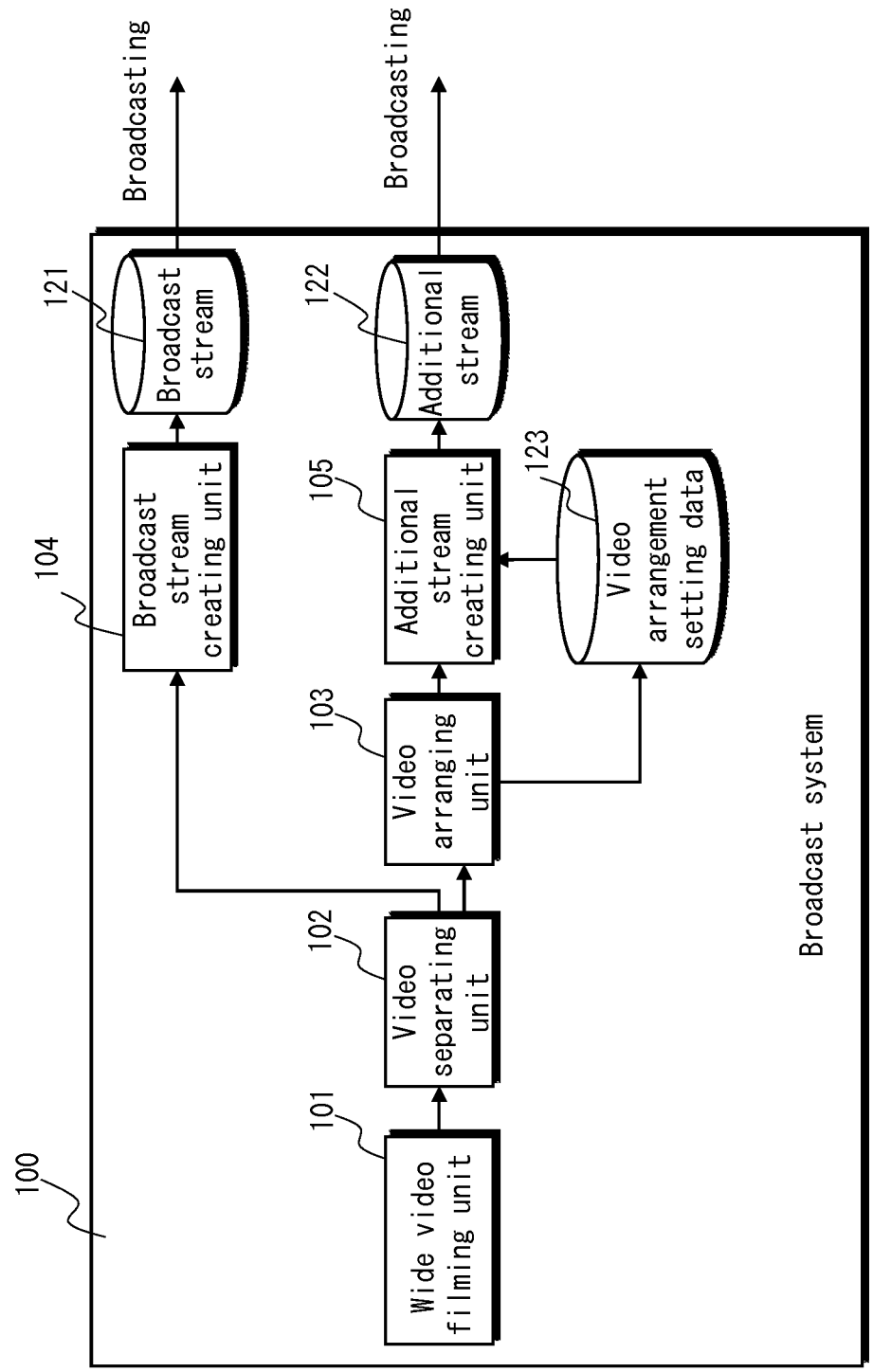
FIG. 37 is a block diagram showing the structure of a broadcast system pertaining to Modification of the present invention.

FIG. 37 shows the structure of the broadcast system 100 pertaining to the present modification.

The broadcast system 100 in FIG. 37 differs from the broadcast system 100 described with reference to FIG. 33 in that the additional stream is transmitted via a broadcast wave.

Figure 38:
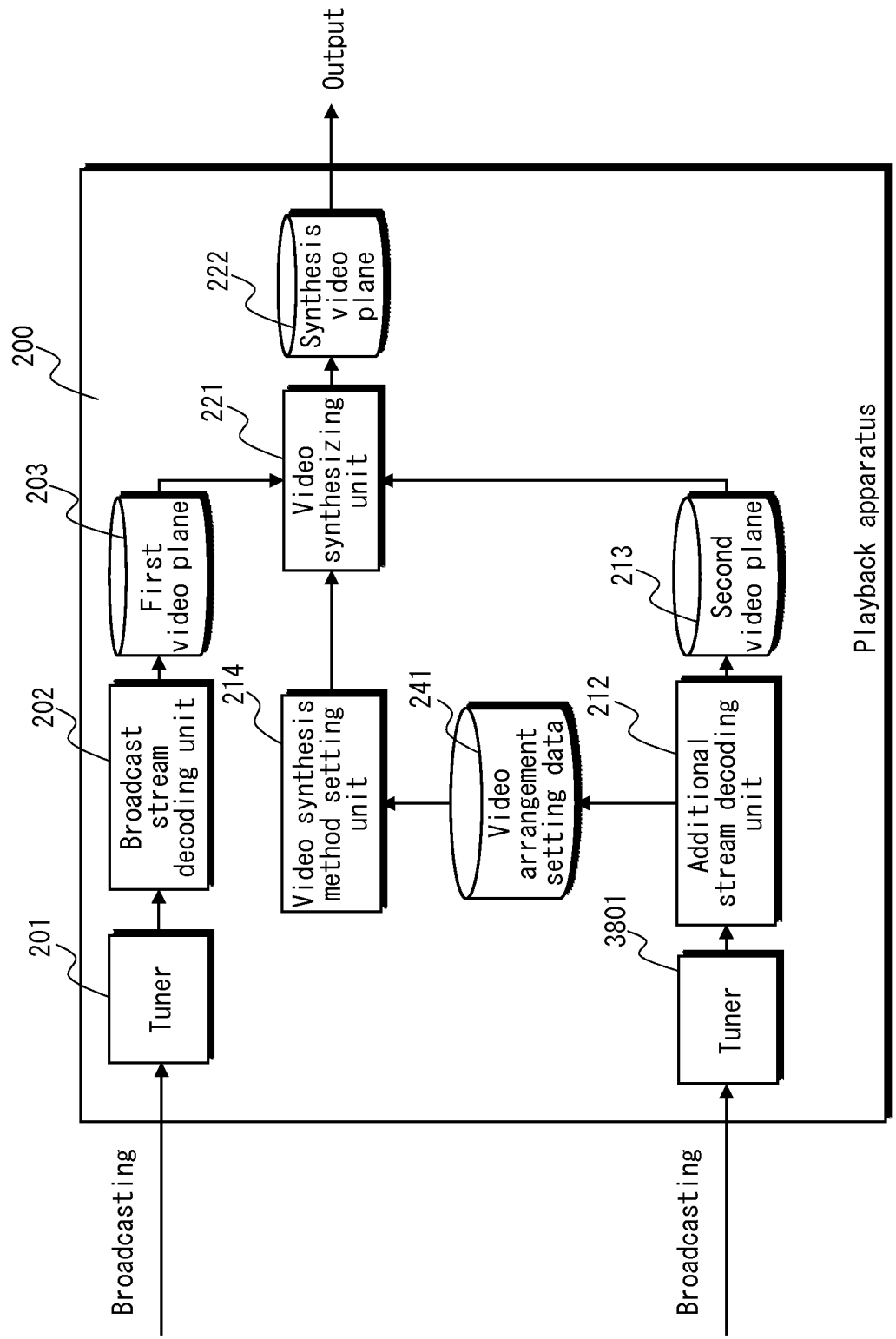
FIG. 38 is a block diagram showing the structure of a playback apparatus pertaining to Modification of the present invention.

FIG. 38 shows the structure of the playback system 200 pertaining to the present modification.

The playback apparatus 200 in FIG. 38 differs from the playback apparatus 200 described with reference to FIG. 34 in the following point.

The playback apparatus 200 in FIG. 38 includes a tuner 3801, and receives the additional stream via a broadcast wave by using the tuner 3801.

As described above, the additional stream can be transmitted from the broadcast system to the playback apparatus via a broadcast wave.

(17) In the system described in the above modification (14), the broadcast stream and the additional stream may be transmitted via a plurality of broadcast waves in the same manner as the above modification (16).

Figure 39:
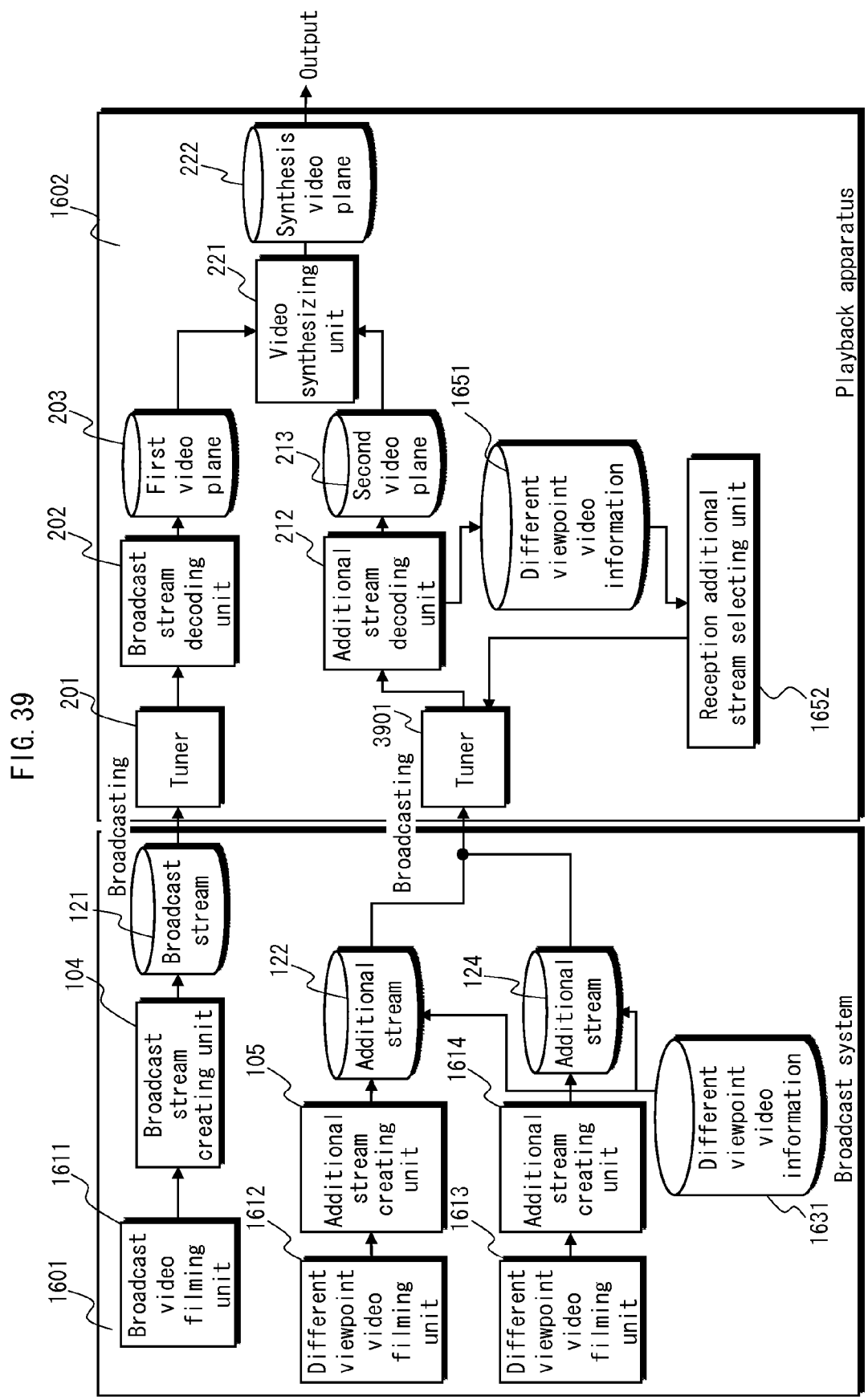
FIG. 39 is a block diagram showing the structure of a system pertaining to Modification of the present invention.

FIG. 39 is a block diagram showing the structure of a system pertaining to the present modification.

The system in FIG. 39 differs from the system described with reference to FIG. 35 in the following point.

The broadcast system 1601 in the FIG. 39 transmits, via a broadcast wave, a stream created by multiplexing the additional stream 122 and the additional stream 124.

The playback apparatus 1602 in FIG. 39 includes a tuner 3901 to receive a broadcast wave including the multiplexed additional streams.

The reception additional stream selecting unit 1652 requests the tuner 3901 to extract an additional stream in which a different viewpoint video selected by a user with a remote controller, etc.

The tuner 3901 extracts a TS packet pertaining to the requested additional stream (122 or 124). The tuner 3901 then outputs the TS packet pertaining to the additional stream to the additional stream decoding unit 212.

As described above, the broadcast stream and the additional stream can be transmitted via a plurality of broadcast waves.

(18) In the playback apparatus 200 described in the above modification (15), the broadcast stream and the additional stream may be transmitted via a plurality of broadcast waves in the same manner as the above modification (16).

Figure 40:
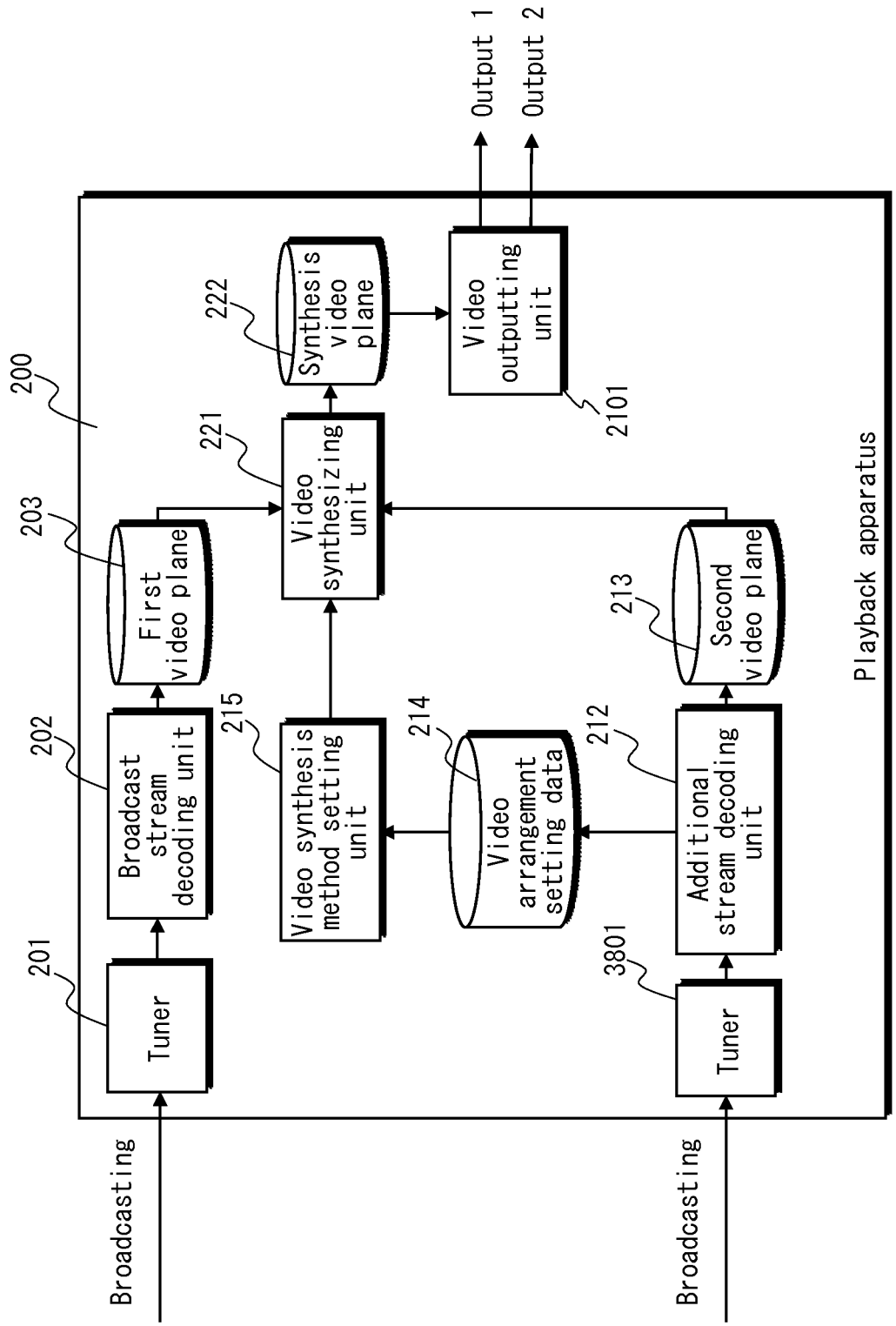
FIG. 40 is a block diagram showing the structure of a playback apparatus pertaining to Modification of the present invention.

FIG. 40 is a block diagram showing the structure of the playback system 200 pertaining to the present modification.

In this case, the playback apparatus 200 in FIG. 40 includes the tuner 3801 in the same manner as the playback apparatus 200 in the above modification (16), and receives an additional stream via a broadcast wave by using the tuner 3801.

As described above, the broadcast stream and the additional stream can be received via a plurality of broadcast waves.

(19) A control program composed of program code, in machine language or a high-level language, for causing a processor and circuits connected to the processor of the broadcast system 100 and the playback apparatus 200 to execute the video separating processing, the selection range acquiring processing performed by the broadcast system 100 and the synthesis instructing processing and the video synthesizing processing performed by the playback apparatus 200 and the like described in the above embodiment, may be recorded on recording media or circulated and distributed over a variety of communications channels or the like. Such recording media include IC cards, hard disks, optical discs, flexible disks, ROM, flash memory, and the like. The control program that is circulated and distributed is used by being stored on a processor-readable memory or the like. The functions indicated in the embodiment are achieved by the processor executing the control program. Note that instead of directly executing the control program, the processor may compile the control program before execution or execute the control program with an interpreter.

(20) The functional structural elements in the above embodiment (the wide video filming unit 101, the video separating unit 102, the video arranging unit 103, the broadcast stream creating unit 104 and the additional stream creating unit 105 of the broadcast system 100, the tuner 201, the broadcast stream decoding unit 202, the first video plane 203, the NIC 211, the additional stream decoding unit 212, the second video plane 213, the video synthesis method wetting unit 214, the video synthesizing unit 221, the synthesis video plane 222 and the like of the playback apparatus 200) may be implemented as circuits that perform the functions, or implemented by one or more processors executing a program.

Note that the above functional structural elements are typically implemented as an LSI, which is an integrated circuit. These functional structural elements may respectively be formed as discrete chips, or part or all may be integrated into one chip. Although referred to here as an LSI, depending on the degree of integration, the terms IC, system LSI, super LSI, and ultra LSI are also used. In addition, the method for assembling integrated circuits is not limited to LSI, and a dedicated communication circuit or a general-purpose processor may be used. A Field Programmable Gate Array (FPGA), which is programmable after the LSI is manufactured, or a reconfigurable processor, which allows reconfiguration of the connection and setting of circuit cells inside the LSI, may be used. Additionally, if technology for integrated circuits that replaces LSIs emerges, owing to advances in semiconductor technology or to another derivative technology, the integration of functional blocks may naturally be accomplished using such technology. The application of biotechnology or the like is possible.

(21) Any of the embodiment and modifications may be partially combined.

5. Supplement 1

The following is a supplementary explanation on the above embodiment.

<Multiplexing of Streams>

The following describes a digital stream in MPEG-2 transport stream format, which is a stream transmitted by a digital television broadcast wave, etc.

An MPEG-2 transport stream is a stream conforming to the standard specified by ISO/IEC13818-1 and ITU-T Recc. H222.0.

Figure 23:
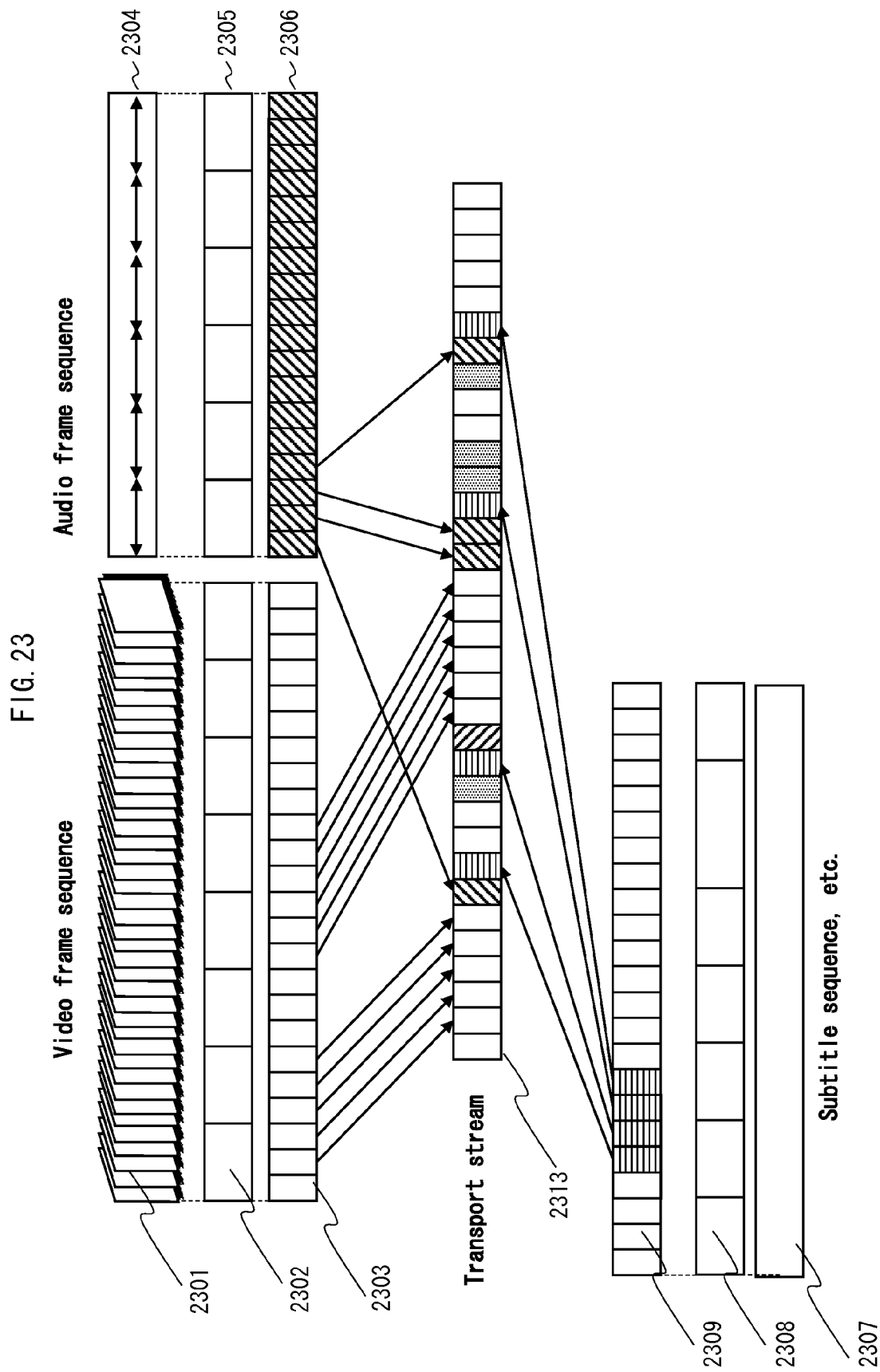
FIG. 23 shows the structure of a digital stream in the MPEG-2 transport stream format.

FIG. 23 shows the structure of a digital stream in the MPEG-2 transport stream format.

As shown in FIG. 23, a transport stream can be acquired by multiplexing a video stream composed of a video frame sequence, an audio stream composed of an audio frame sequence, a subtitle stream and the like.

The video stream is created by compressing and encoding the main video portion of a program with a format such as MPEG-2 and MPEG-4 AVC.

The audio stream is created by compressing and encoding the main voice track and sub-voice tracks of the program with a method such as Dolby AC-3, MPEG-2 AAC, MPEG-4 AAC, HE-AAC.

The subtitle stream stores subtitle information of the program.

The steps of the method of multiplexing a video are first to convert a video stream 2301 composed of a plurality of video frames to a PES packet sequence 2302 and subsequently to convert the PES packet sequence 2302 to TS packets 2303.

The steps of the method of multiplexing audio are first to convert an audio stream 2304 composed of a plurality of audio frames to a PES packet sequence 2305 and subsequently to convert the PES packet sequence 2305 to TS packets 2306.

The steps of the method of multiplexing subtitles are first to convert data of a subtitle stream 2307 to a PES packet sequence 2308 and subsequently to convert the PES packet sequence 2308 to TS packets 2309.

Then, the TS packets 2303, the TS packet 2306 and the TS packet 2309 are multiplexed into one stream as an MPEG-2 transport stream 2313.

Each of the streams included in the transport stream is identified by a stream ID called a PID. A playback apparatus extracts a target stream by extracting packets with the corresponding PID. The correspondence between PIDs and streams is stored in the descriptor of a PMT packet as described below.

Figure 24:
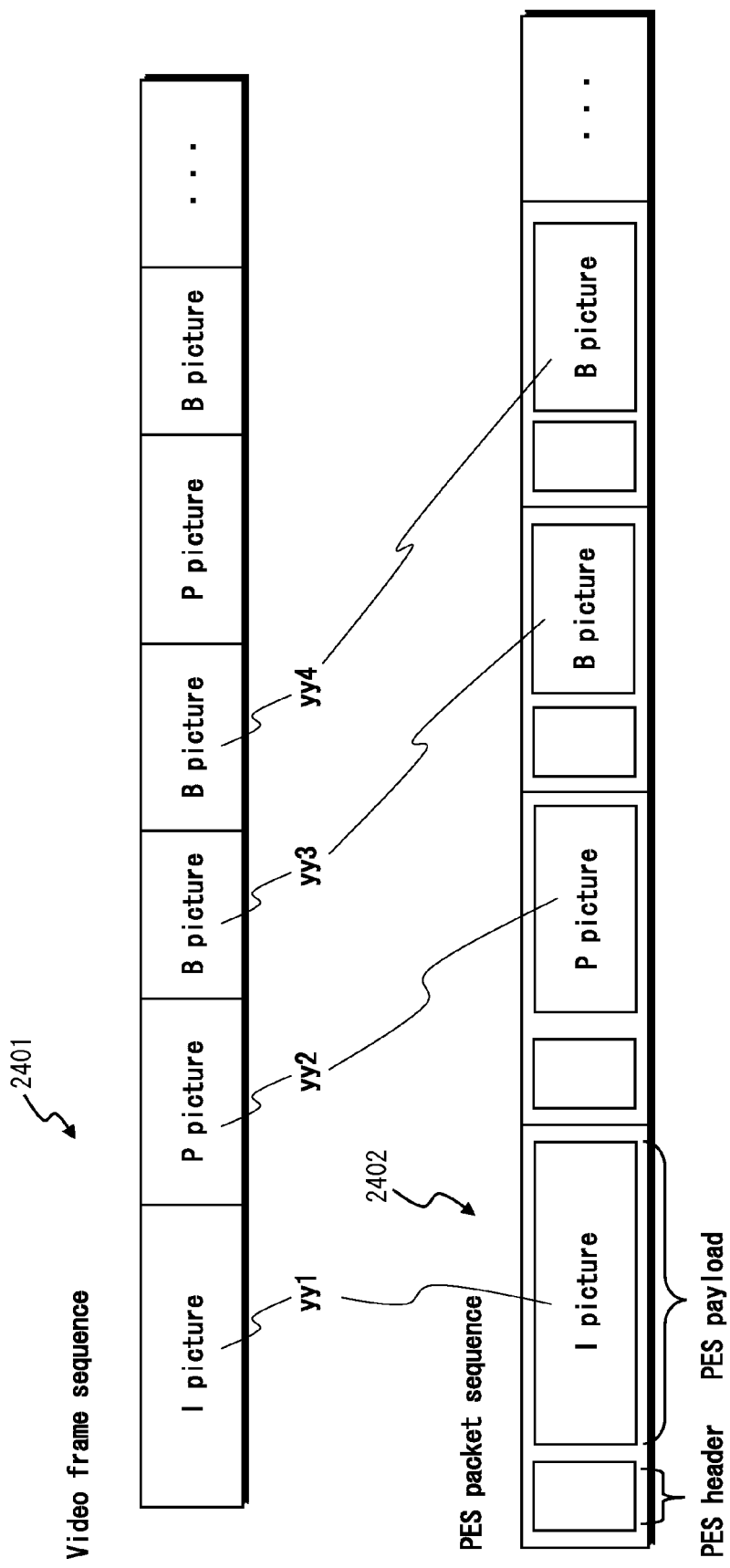
FIG. 24 shows the manner in which a video stream is contained within a PES packet sequence.

FIG. 24 shows how video streams are stored in a PES packet sequence.

A stream 2401 shows a video frame sequence in the video stream.

A PES packet sequence 2402 shows a PES packet sequence.

As shown by the arrows yy1, yy2, yy3, and yy4 in FIG. 24, the I picture, B pictures, and P pictures, which are a plurality of Video Presentation Units, are separated picture by picture and stored in the payload of a PES packet.

Each PES packet has a PES header storing a PTS (Presentation Time-Stamp), which is the presentation time of the picture, and a DTS (Decoding Time-Stamp), which is the decoding time of the picture.

<Compressing and Encoding of Video Stream>

The following describes compressing and encoding of a video stream.

In video compression and encoding such as MPEG-2, MPEG-4 AVC, and Society of Motion Picture Television Engineers VC-1 (SMPTE VC-1), data is compressed using spatial and temporal redundancy in moving images.

One method for using temporal redundancy is inter-picture prediction coding.

Here, a picture is a frame or a field with reduced redundancy.

In inter-picture prediction coding, when a certain picture is encoded, a picture earlier or later in presentation time is used as a reference picture so as to reduce temporal redundancy. The amount of motion as compared to the reference picture is detected, motion compensation is performed, and spatial redundancy is reduced by compressing and encoding the difference between the motion compensated picture and the picture that is to be encoded.

Figure 25:
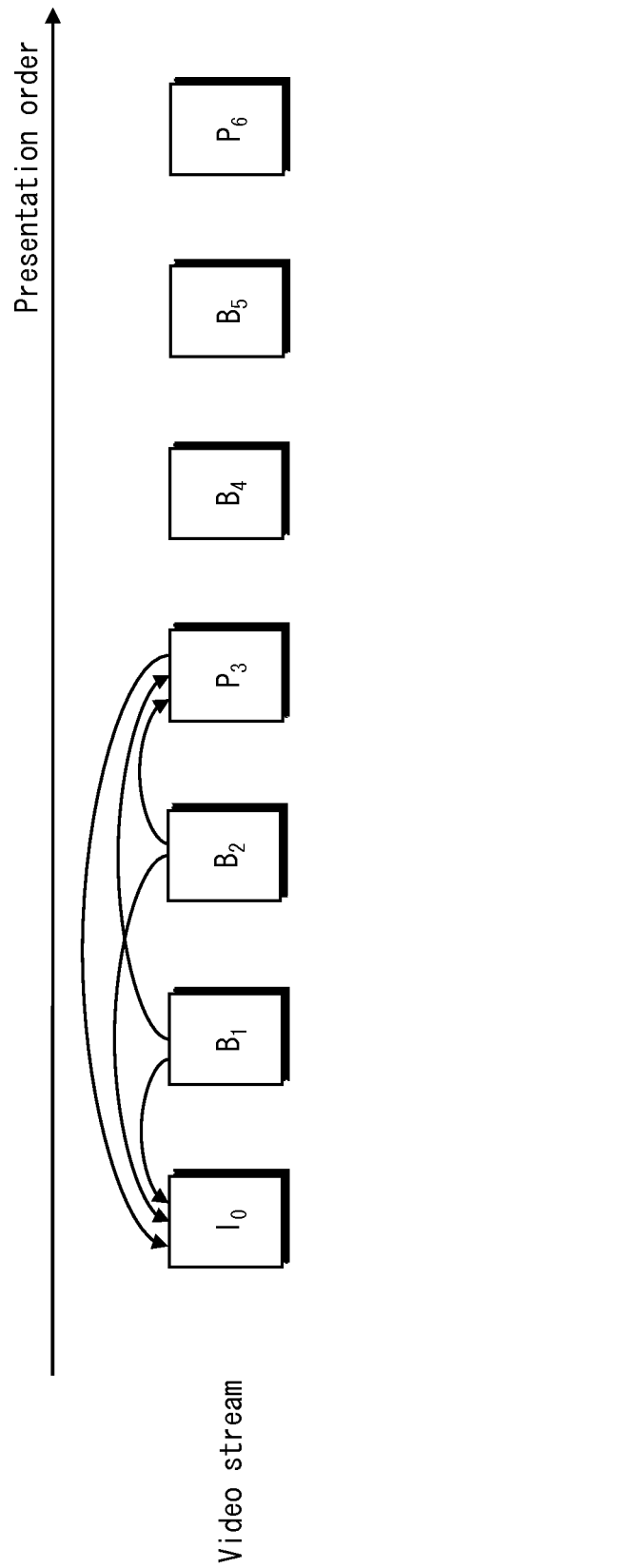
FIG. 25 shows the reference relationship for pictures in a video stream.

FIG. 25 shows the reference relationship for pictures in a typical video stream.

The arrows in FIG. 25 indicate how pictures are referenced.

Pictures are classified into I pictures, P pictures and B pictures according to the encoding method.

The I picture (such as $I_0$ in FIG. 25) is a picture created by inter-picture prediction coding with only pictures to be encoded without using a reference picture.

The P picture (such as $P_3$ and $P_6$ in FIG. 25) is a picture to which inter-picture coding is applied with reference to one previously-processed picture.

The B picture (such as $B_1$, $B_2$, $B_4$ and $B_5$) is a picture to which inter-picture coding is applied with reference to two previously-processed pictures at once. Further, a B-picture referenced by other pictures is called a Br picture.

Furthermore, the frames of frame structures (in the case where the video stream has frame structures) and the fields of field structures (in the case where the video stream has field structures) are here referred to as video access units.

<Hierarchical Structure of Video Stream>

Figure 26:
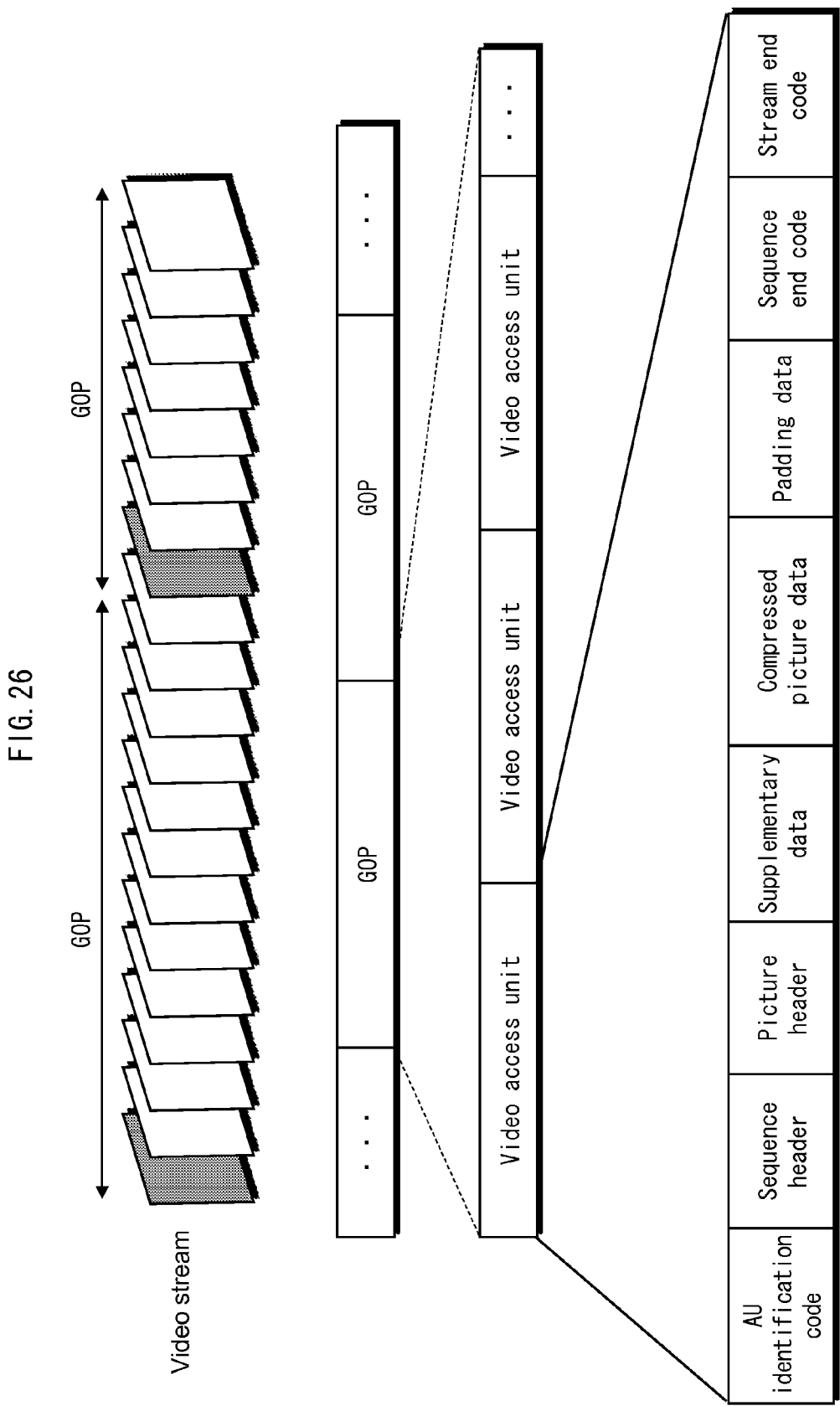
FIG. 26 shows the hierarchical structure of a video stream.

FIG. 26 explains the hierarchical structure of the video stream.

The video stream is made up of several GOPs. The GOPs are used as the basic unit of encoding. Motion picture editing and random access are performed in units of the GOP.

A GOP is made up of one or more video access units described above.

Each video access unit is made up of an AU identification code, a sequence header, a picture header, supplementary data, compressed picture data, padding data, a sequence end code, a stream end code, and so on. Under MPEG-4 AVC, all data is contained in units called NAL units.

The AU identification code is a start code indicating the start of the access unit.

The sequence header is a header containing information common to all of the video access units that make up the playback sequence, such as the resolution, frame rate, aspect ratio, bitrate, and so on.

The picture header is a header containing information for the entire picture, such as the encoding format and the like.

The supplementary data are additional data not required to decode the compressed data, such as closed-captioning text information that can be displayed on a television simultaneously with the video, information about the structure of the GOP, and so on.

The compressed picture data are the picture data in compression-coded form. The padding data includes meaningless data for arranging a format. For example, the padding data is used as stuffing data for maintaining a fixed bit rate. The sequence end code is data indicating an end of a playback sequence. The stream end code is data indicating the end of the bit stream.

The content of each of the AU identification code, the sequence header, the picture header, the supplementary data, the compressed picture data, the padding data, the sequence end code and the stream end code varies according to the video encoding format.

For example, when a video is encoded under MPEG-4 AVC, the AU identification code is an access unit delimiter (AU delimiter), the sequence header is an Sequence Parameter Set (SPS), the picture header is a Picture Parameter Set (PPS), the supplementary data are Supplemental Enhancement Information (SEI), the compressed picture data consist of several slices, the padding data are Filler Data, the sequence end code is End of Sequence, and the stream end code is End of Stream.

In contrast, when a video is encoded under MPEG-2, the sequence header is any of sequence_header, sequence_extension, and group_of_pictures_header, the picture header is any of picture_header and picture_coding_extension, the supplementary data is user_data, the compressed picture data consist of several data slices, and the sequence end code is sequence_end_code. Although the AU identification code does not exist, it is possible to detect a break of an access unit by using a start code of each header.

Here, some pieces of the above-described data may be omitted. For instance, the sequence header is only needed for the first video access unit of the GOP and may be omitted from other video access units.

Further, depending on the encoding format, a given picture header may simply reference the previous video access unit, without any picture headers being contained in the video access unit itself.

Figure 27:
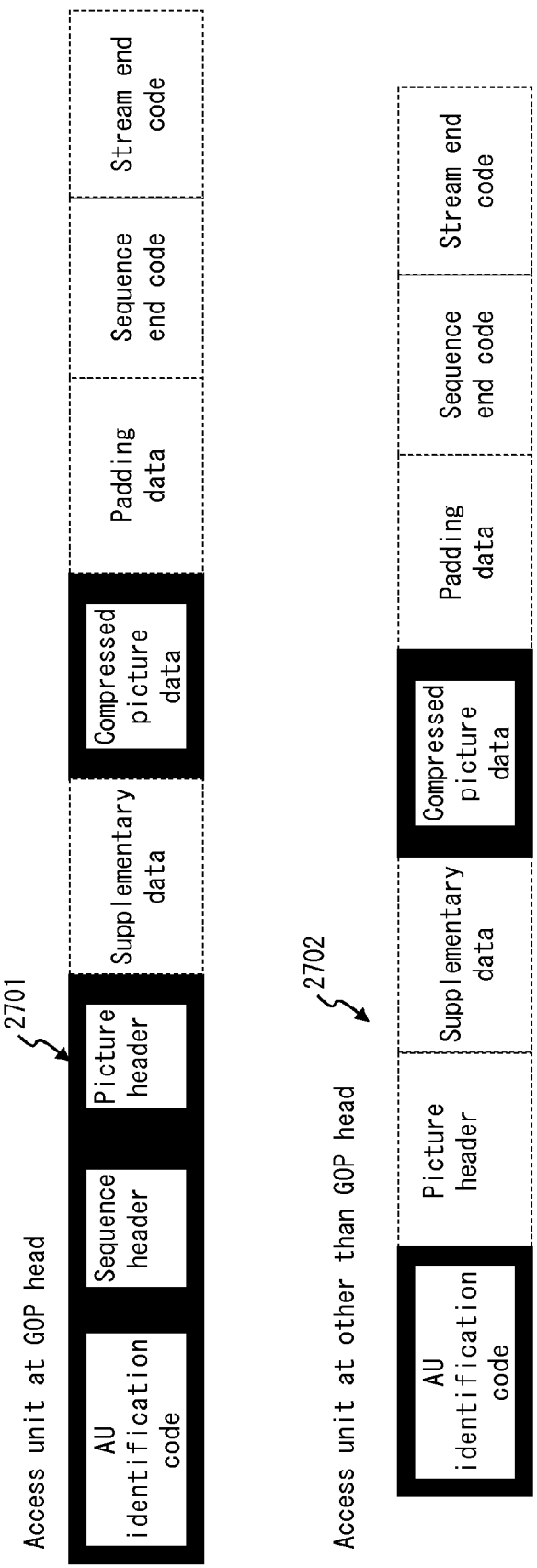
FIG. 27 shows the structure of a video access unit.

For example, as shown in FIG. 27, a video access unit (2701) at the head of each GOP stores I picture data as the compressed picture data. The video access unit at the head of a GOP stores the following without exception: an AU identification code; a sequence header; a picture header; and compressed picture data. Supplementary data, padding data, a sequence end code and a stream end code are stored as necessary.

In contrast, each video access unit (2702) except for the head of each GOP stores the following without exception: an AU identification code; and compressed picture data. Supplementary data, padding data, a sequence end code and a stream end code are stored as necessary.

<Cropping and Scaling>

Cropping is to extract a part of the encoded frame area. Scaling is to enlarge or downsize the extracted part.

Cropping and scaling allows for creating, from the encoded frame area, an area that is actually used for display.

Figure 28:
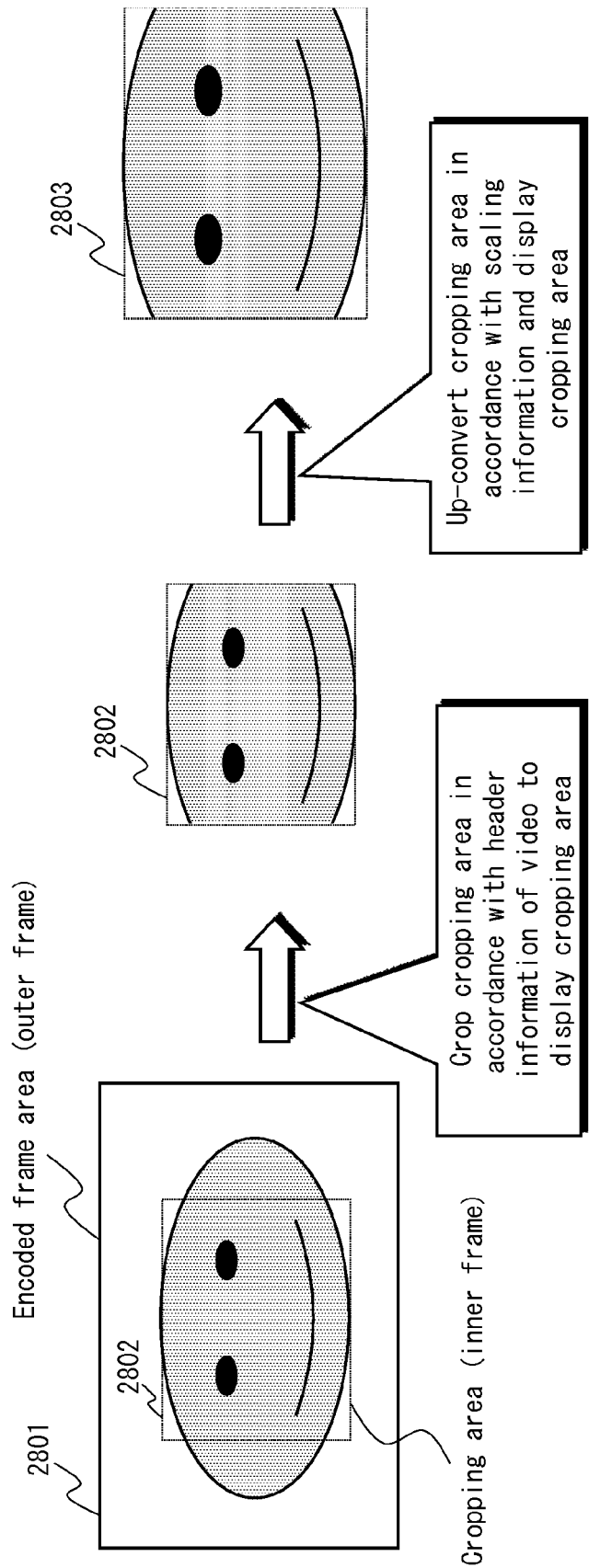
FIG. 28 is a view for illustrating a cropping area.

For example, as shown in FIG. 28, an area that is to be actually displayed is designated as "cropping area" (cropping area 2802, for example) from an encoded frame area 2801. Subsequently, an area (image) 2803 that is actually used for display is created by up-converting the cropping area 2802 according to the scaling information indicating a scaling method used when the cropping area 2802 is actually displayed on a television.

In the case of MPEG-4 AVC, it is possible to designate the cropping area by using frame_cropping information stored in the SPS.

Figure 29:
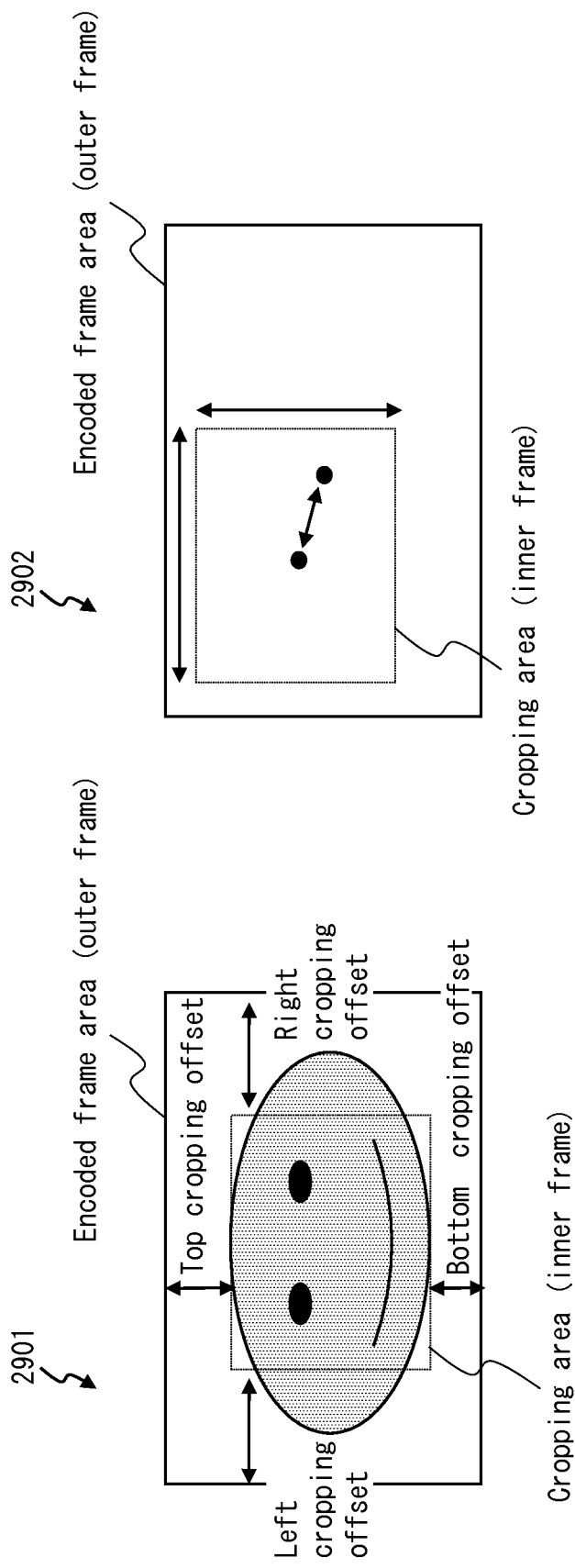
FIG. 29 is a view for illustrating a cropping area.

The frame_cropping information specifies a difference between each of top/bottom/left/right lines of the cropping area and a corresponding one of top/bottom/left/right lines of the encoded frame area as a top/bottom/left/right cropping amount, as illustrated as an explanation image 2901 shown in FIG. 29.

More precisely, to designate a cropping area, a flag ("frame_cropping_flag") is set to 1, and the upper, lower, left, and right areas to be cropped out are respectively indicated as the fields "frame_crop_top_offset", "frame_crop_bottom_offset", "frame_crop_left_offset", and "frame_crop_right_offset".

Under MPEG-2, the cropping area can be designated by using horizontal and vertical sizes (display_horizontal_size and display_vertical_size of sequence_display_extension) of the cropping area and difference information (frame_centre_horizontal_offset and frame_centre_vertical_offset of picture_display_extension) indicating a difference between a center of the encoded frame area and a center of the cropping area, as illustrated as an explanation image 2902 in FIG. 29.

The scaling information is, for example, set as an aspect ratio. The playback device up-converts the cropping area using information of the aspect ratio, and then performs display.

For example, under MPEG-4 AVC, the SPS contains aspect ratio information ("aspect_ratio_idc") as scaling information.

Under MPEG-4 AVC, to display a 1440×1080 cropping area expanded to 1920×1080, a 4:3 aspect ratio is designated. In this case, the cropping area is horizontally up-converted 4/3 times (1440×4/3=1920) and enlarged to 1920×1080.

In the case of the MPEG-2, information of the aspect ratio (aspect_ratio_information) is stored in sequence_header, in the same way.

<TS Packet>

Figure 30:
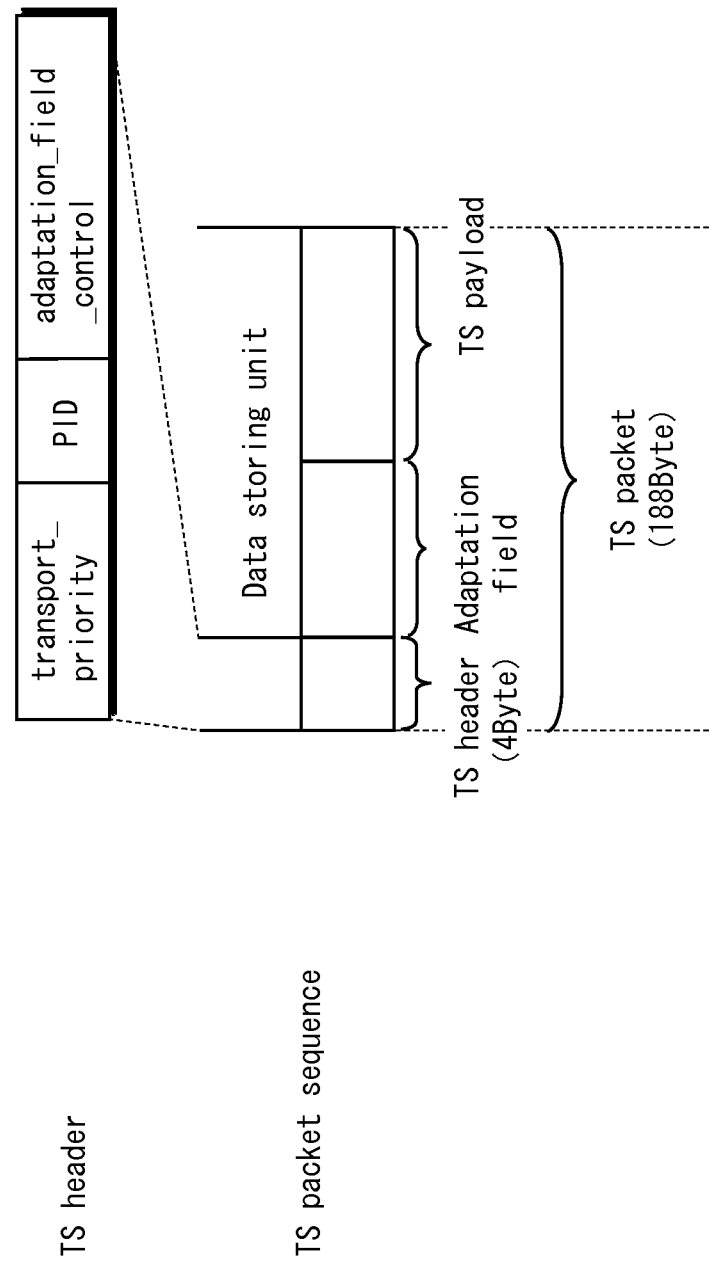
FIG. 30 shows a data structure of a TS packet.

FIG. 30 shows a data structure of a TS packet.

Each TS packet is a 188-byte fixed-length packet consisting of a 4-byte TS header, an adaptation field, and a TS payload.

The TS header is composed of information such as transport_priority, the PID, and adaptation_field_control.

As previously mentioned, a PID is an ID identifying a stream that is multiplexed within the transport stream. The transport_priority is information identifying different types of packets among the TS packets having the same PID. The adaptation_field_control is information for controlling the configuration of the adaptation field and of the TS payload. The adaptation_field_control indicates whether only one or both of the adaptation field and the TS payload are present, and if only one of the two is present, indicates which.

In specific, the adaptation_field_control is set to 1 to indicate the presence of the TS payload only, is set to 2 to indicate the presence of the adaptation field only, and set to 3 to indicate the presence of both the TS payload and the adaptation field.

The adaptation field is an area for storing PCR and similar information, as well as stuffing data used to pad out the TS packet to 188 bytes. The PES packets are split and contained in the TS payload.

In addition to video, audio, subtitle, and other streams, the TS packets included in the transport stream can also be for a Program Association Table (PAT), a Program Map Table (PMT), a Program Clock Reference (PCR) and the like. These packets are known as Program Specific Information (PSI).

The PAT indicates the PID of the PMD used within the transport stream. The PID of the PAT itself is 0.

The PMT includes the PIDs of each of the streams included in the transport stream, such as a video stream, an audio stream, and a subtitle stream, and also includes attribute information of each of the streams corresponding to the PIDs included therein. Further, the PMT also includes various descriptors pertaining to the transport stream.

For instance, copy control information indicating whether or not the audiovisual stream may be copied is included among such descriptors. The PCR has System Time Clock (STC) information corresponding to the time at which the PCR packet is to be transferred to the decoder. This information enables synchronization between the decoder arrival time of the TS packet and the STC, which serves as the chronological axis for the PTS and DTS.

Figure 31:
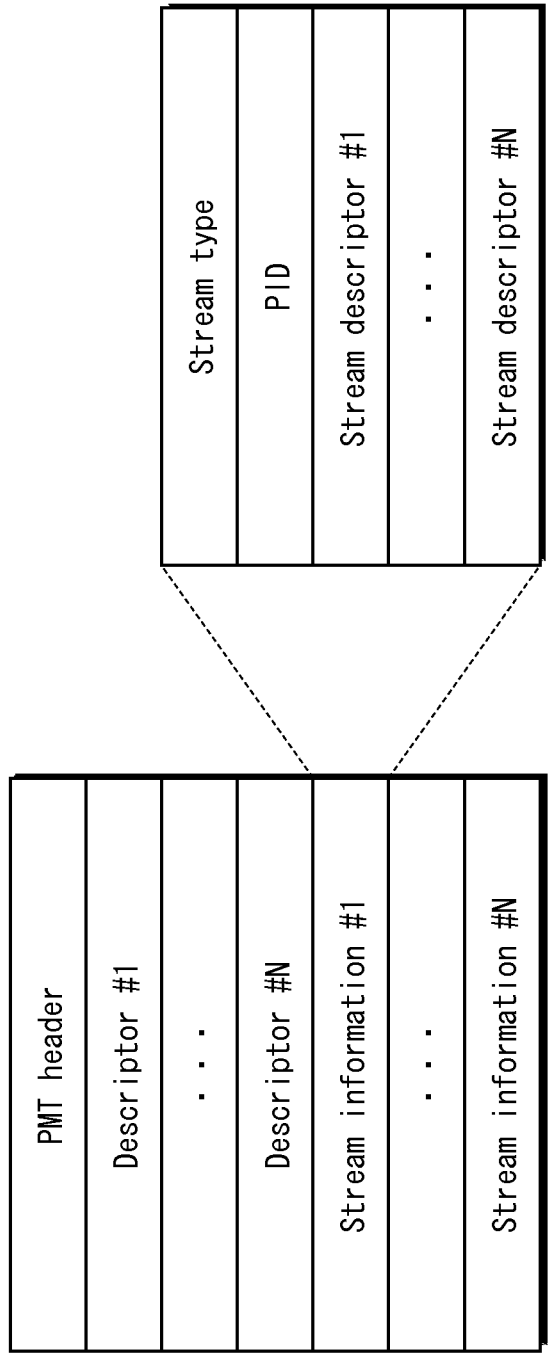
FIG. 31 shows a PMT data structure.

FIG. 31 shows the data structure of the PMT.

A PMT header containing such information as the length of the data included in the PMT is arranged at the head thereof. The PMT header is followed by several descriptors pertaining to the transport stream. The aforementioned copy control information and the like is written in such descriptors. The descriptors are followed by several pieces of stream information pertaining to each of the streams included in the transport stream. The stream information is composed of stream descriptors in which are written a stream type, which identifies the stream compression codec or the like, the stream PID, and stream attribute information (such as the frame rate, the aspect ratio and the like).

6. Supplement 2

The following describes the structure and advantages of the broadcast content receiving system according to the embodiment and modifications of the present invention.

(1) The playback apparatus according to the embodiment of the present invention is a playback apparatus for reproducing and playing back an original video, comprising: a first receiving unit that receives, via a broadcast wave, a broadcast video composed of a plurality of broadcast images, each broadcast image being a portion of a frame image among a plurality of frame images constituting the original video; a second receiving unit that receives an additional video composed of a plurality of remaining images, each remaining image being the remaining portion of the frame image; an arrangement information acquiring unit that acquires arrangement information indicating an arrangement of the broadcast image and the remaining image in the frame image; and a playback unit that reproduces and plays back the frame images by arranging the broadcast images and the remaining images based on the arrangement information.

With this structure, the playback apparatus according to the present invention is capable of reproducing and playing back the original video by using the broadcast video and the additional video that is not determined by a fixed position relative to the broadcast video.

(2) Each frame image may be divided into the broadcast image and a plurality of partial images, the plurality of partial images may constitute the remaining image, the arrangement information may include information indicating, for the remaining image, an arrangement of the plurality of partial images, and the playback unit may reproduce each frame image by separating the remaining image into the plurality of partial images and combining the separated partial images with the broadcast image based on the arrangement information.

With this structure, even when the frame image is separated into the broadcast image and the plurality of partial images that are not continuous, the frame image can be reproduced from the broadcast image and the plurality of partial images. Therefore, this allows the broadcast system to increase the flexibility in separating the frame images.

(3) Each of the frame images may be divided into a left partial image, the broadcast image and a right partial image in a horizontal direction of the frame images, the left partial image and the right partial image constituting the plurality of partial images, and the playback unit may reproduce each frame image by separating the remaining image into the left partial image and the right partial image and combining the left partial image and the right partial image with the broadcast image at a left edge and a right edge of the broadcast image, respectively, based on the arrangement information.

With this structure, an image wider than the broadcast image in the horizontal direction can be used as the original video.

(4) Each of the frame images may be divided into an upper partial image, the broadcast image and a lower partial image in a vertical direction of the frame images, the upper partial image and the lower partial image constituting the plurality of partial images, and the playback unit may reproduce each frame image by separating the remaining image into the upper partial image and the lower partial image and combining the upper partial image and the lower partial image with the broadcast image at an upper edge and a lower edge of the broadcast image, respectively, based on the arrangement information.

With this structure, an image with higher resolution than that of the broadcast image can be used as the original video.

(5) At least one of the plurality of partial images may be enlarged or downsized to be combined with another partial image, the arrangement information may include a magnification ratio for resizing the enlarged or downsized partial image to an original size thereof, and before combining the broadcast image with the plurality of partial images, the playback unit may perform processing for resizing the enlarged or downsized partial image to the original size based on the arrangement information.

At least one of the plurality of partial images may be rotated to be combined with another partial image, the arrangement information may include a rotational angle for rotating the rotated partial image back to an original orientation thereof, and before combining the broadcast image with the plurality of partial images, the playback unit may rotate the rotated partial image by the rotational angle included in the arrangement information.

With this structure, this allows the broadcast system to further increase the flexibility in separating the frame images.

(6) The second receiving unit may receive the remaining portion via a network.

With this structure, the original video can be separately received via a broadcast wave and communications at the same time.

(7) A piece of the arrangement information may be created for a predetermined subset of frame images in each of which the broadcast image corresponds to the same portion, and the playback unit may reproduce the frame images constituting the predetermined subset based on the piece of the arrangement information.

With this structure, an amount of arrangement information can be reduced compared to the case where a piece of arrangement information is created for each frame image. Therefore, congestion of communications networks is reduced.

(8) A playback method according to the embodiment of the present invention is a playback method executed by a playback apparatus for reproducing and playing back an original video, the method comprising the steps of: receiving, via a broadcast wave, a broadcast video composed of a plurality of broadcast images, each broadcast image being a portion of a frame image among a plurality of frame images constituting the original video; receiving an additional video composed of a plurality of remaining images, each remaining image being the remaining portion of the frame image; acquiring arrangement information indicating an arrangement of the broadcast image and the remaining image in the frame image; and reproducing and playing back the frame images by arranging the broadcast images and the remaining images based on the arrangement information.

An integrated circuit according to the embodiment of the present invention is an integrated circuit used in a playback apparatus for reproducing and playing back an original video, comprising: a first receiving unit that receives, via a broadcast wave, a broadcast video composed of a plurality of broadcast images, each broadcast image being a portion of a frame image among a plurality of frame images constituting the original video; a second receiving unit that receives an additional video composed of a plurality of remaining images, each remaining image being the remaining portion of the frame image; an arrangement information acquiring unit that acquires arrangement information indicating an arrangement of the broadcast image and the remaining image in the frame image; and a playback unit that reproduces and plays back the frame images by arranging the broadcast images and the remaining images based on the arrangement information.

With this structure, a playback apparatus according to the present invention is capable of reproducing and playing back the original video by using the broadcast video and any additional video that is not determined by a fixed position relative to the broadcast video.

(9) A broadcast system according to the embodiment of the present invention is a broadcast system for transmitting an original video comprising: a first transmitting unit that transmits, via a broadcast wave, a broadcast video composed of a plurality of broadcast images, each broadcast image being a portion of a frame image among a plurality of frame images constituting the original video; a second transmitting unit that transmits an additional video composed of a plurality of remaining images, each remaining image being the remaining portion of the frame image; and an arrangement information transmitting unit that creates and transmits arrangement information indicating an arrangement of the broadcast image and the remaining image in the frame image.

A broadcast method according to the embodiment of the present invention is a broadcast method executed by a broadcast system for transmitting an original video, comprising the steps of: transmitting, via a broadcast wave, a broadcast video composed of a plurality of broadcast images, each broadcast image being a portion of a frame image among a plurality of frame images constituting the original video; transmitting an additional video composed of a plurality of remaining images, each remaining image being the remaining portion of the frame image; and creating and transmitting arrangement information indicating an arrangement of the broadcast image and the remaining image in the frame image.

An integrated circuit according to the embodiment of the present invention is an integrated circuit used by a broadcast system for transmitting an original video, comprises: a first transmitting unit that transmits, via a broadcast wave, a broadcast video composed of a plurality of broadcast images, each broadcast image being a portion of a frame image among a plurality of frame images constituting the original video; a second transmitting unit that transmits an additional video composed of a plurality of remaining images, each remaining image being the remaining portion of the frame image; and an arrangement information transmitting unit that creates and transmits arrangement information indicating an arrangement of the broadcast image and the remaining image in the frame image.

With this structure, it is possible to transmit the original video to the playback apparatus by using the broadcast video and the additional video that is not determined by a fixed position relative to the broadcast video.

INDUSTRIAL APPLICABILITY

The playback apparatus pertaining to one embodiment of the present invention is capable of using a broadcast video and any additional video that is not determined by a fixed position relative to the broadcast video so as to reproduce and play back a combination video composed of the broadcast video and the additional video, and is useful for an apparatus that receives videos by both broadcasting and communications, combines the received videos with each other, and plays back the combined video, for example.

REFERENCE SIGNS LIST 100 broadcast system
101 wide video filming unit
102 video separating unit
103 video arranging unit
104 broadcast stream creating unit
105 additional stream creating unit
106 additional stream creating unit
200 playback apparatus
201 tuner
202 broadcast stream decoding unit
203 video plane
211 NIC
212 additional stream decoding unit
213 video plane
214 video synthesis method setting unit
215 video synthesis method setting unit
221 video synthesizing unit
222 synthesis video plane

The invention claimed is:

1. A playback apparatus for reproducing and playing back an original video, comprising:
a first receiving unit that receives, via a broadcast wave, a broadcast video composed of a plurality of broadcast images, each broadcast image being a portion of a frame image among a plurality of frame images constituting the original video;
a second receiving unit that receives an additional video composed of a plurality of remaining images, each remaining image being the remaining portion of the frame image;
an arrangement information acquiring unit that acquires arrangement information indicating an arrangement of the broadcast image and the remaining image in the frame image; and
a playback unit that reproduces and plays back the frame images by arranging the broadcast images and the remaining images based on the arrangement information.

2. The playback apparatus of claim 1, wherein
each frame image is divided into the broadcast image and a plurality of partial images,
the plurality of partial images constitute the remaining image,
the arrangement information includes information indicating, for the remaining image, an arrangement of the plurality of partial images, and
the playback unit reproduces each frame image by separating the remaining image into the plurality of partial images and combining the separated partial images with the broadcast image based on the arrangement information.

3. The playback apparatus of claim 2, wherein
each of the frame images is divided into a left partial image, the broadcast image and a right partial image in a horizontal direction of the frame images, the left partial image and the right partial image constituting the plurality of partial images, and
the playback unit reproduces each frame image by separating the remaining image into the left partial image and the right partial image and combining the left partial image and the right partial image with the broadcast image at a left edge and a right edge of the broadcast image, respectively, based on the arrangement information.

4. The playback apparatus of claim 2, wherein
each of the frame images is divided into an upper partial image, the broadcast image and a lower partial image in a vertical direction of the frame images, the upper partial image and the lower partial image constituting the plurality of partial images, and
the playback unit reproduces each frame image by separating the remaining image into the upper partial image and the lower partial image and combining the upper partial image and the lower partial image with the broadcast image at an upper edge and a lower edge of the broadcast image, respectively, based on the arrangement information.

5. The playback apparatus of claim 2, wherein
at least one of the plurality of partial images is enlarged or downsized to be combined with another partial image,
the arrangement information includes a magnification ratio for resizing the enlarged or downsized partial image to an original size thereof, and
before combining the broadcast image with the plurality of partial images, the playback unit performs processing for resizing the enlarged or downsized partial image to the original size based on the arrangement information.

6. The playback apparatus of claim 2, wherein
at least one of the plurality of partial images is rotated to be combined with another partial image,
the arrangement information includes a rotational angle for rotating the rotated partial image back to an original orientation thereof, and
before combining the broadcast image with the plurality of partial images, the playback unit rotates the rotated partial image by the rotational angle included in the arrangement information.

7. The playback apparatus of claim 1, wherein
the second receiving unit receives the remaining portion via a network.

8. The playback apparatus of claim 1, wherein
a piece of the arrangement information is created for a predetermined subset of frame images in each of which the broadcast image corresponds to the same portion, and the playback unit reproduces the frame images constituting the predetermined subset based on the piece of the arrangement information.

9. A playback method executed by a playback apparatus for reproducing and playing back an original video, the playback apparatus including: a first receiving unit; a second receiving unit; an arrangement information acquiring unit; and a playback unit, the method comprising the steps of:

the first receiving unit receiving, via a broadcast wave, a broadcast video composed of a plurality of broadcast images, each broadcast image being a portion of a frame image among a plurality of frame images constituting the original video;

the second receiving unit receiving an additional video composed of a plurality of remaining images, each remaining image being the remaining portion of the frame image;

the arrangement information acquiring unit acquiring arrangement information indicating an arrangement of the broadcast image and the remaining image in the frame image; and the playback unit reproducing and playing back the frame images by arranging the broadcast images and the remaining images based on the arrangement information.

10. An integrated circuit used in a playback apparatus for reproducing and playing back an original video, comprising:

a first receiving unit that receives, via a broadcast wave, a broadcast video composed of a plurality of broadcast images, each broadcast image being a portion of a frame image among a plurality of frame images constituting the original video;

a second receiving unit that receives an additional video composed of a plurality of remaining images, each remaining image being the remaining portion of the frame image;

an arrangement information acquiring unit that acquires arrangement information indicating an arrangement of the broadcast image and the remaining image in the frame image; and a playback unit that reproduces and plays back the frame images by arranging the broadcast images and the remaining images based on the arrangement information.

11. A broadcast system for transmitting an original video, comprising:

a first transmitting unit that transmits, via a broadcast wave, a broadcast video composed of a plurality of broadcast images, each broadcast image being a portion of a frame image among a plurality of frame images constituting the original video;

a second transmitting unit that transmits an additional video composed of a plurality of remaining images, each remaining image being the remaining portion of the frame image; and an arrangement information transmitting unit that creates and transmits arrangement information indicating an arrangement of the broadcast image and the remaining image in the frame image.

12. A broadcast method executed by a broadcast system for transmitting an original video, the broadcast system including: a first transmitting unit; a second transmitting unit; and an arrangement information transmitting unit, the method comprising the steps of:

the first transmitting unit transmitting, via a broadcast wave, a broadcast video composed of a plurality of broadcast images, each broadcast image being a portion of a frame image among a plurality of frame images constituting the original video;

the second transmitting unit transmitting an additional video composed of a plurality of remaining images, each remaining image being the remaining portion of the frame image; and the arrangement information transmitting unit creating and transmitting arrangement information indicating an arrangement of the broadcast image and the remaining image in the frame image.

13. An integrated circuit used by a broadcast system for transmitting an original video, comprising:

a first transmitting unit that transmits, via a broadcast wave, a broadcast video composed of a plurality of broadcast images, each broadcast image being a portion of a frame image among a plurality of frame images constituting the original video;

a second transmitting unit that transmits an additional video composed of a plurality of remaining images, each remaining image being the remaining portion of the frame image; and an arrangement information transmitting unit that creates and transmits arrangement information indicating an arrangement of the broadcast image and the remaining image in the frame image.

* * * * *